US012786030B2

(12) United States Patent
Elkotby et al.

(10) Patent No.: US 12,786,030 B2
(45) Date of Patent: Nov. 3, 2026

(54) DISCRETE FOURIER TRANSFORM PRE-CODED PHYSICAL DOWNLINK CONTROL CHANNEL WITH CODE DOMAIN MULTIPLEXING

(71) Applicant: InterDigital Patent Holdings, Inc., Wilmington, DE (US)

(72) Inventors: Hussain Elkotby, Conshohocken, PA (US); Sanjay Goyal, Deer Park, NY (US); Pascal Adjakple, Great Neck, NY (US); Umer Salim, Vallauris (FR); Ravikumar Pragada, Warrington, PA (US); Allan Yingming Tsai, Boonton, NJ (US); Javier Lorca Hernando, Madrid (ES)

(73) Assignee: InterDigital Patent Holdings, Inc., Wilmington, DE (US)

( * ) Notice: Subject to any disclaimer, the term of this patent is extended or adjusted under 35 U.S.C. 154(b) by 0 days.

(21) Appl. No.: 19/105,274

(22) PCT Filed: Aug. 21, 2023

(86) PCT No.: PCT/US2023/072560

§ 371 (c)(1),
(2) Date: Feb. 20, 2025

(87) PCT Pub. No.: WO2024/044533

PCT Pub. Date: Feb. 29, 2024

(65) Prior Publication Data

US 2026/0074939 A1 Mar. 12, 2026

Related U.S. Application Data

(60) Provisional application No. 63/399,813, filed on Aug. 22, 2022.

(51) Int. Cl.
*H04L 27/26* (2006.01)
*H04L 5/00* (2006.01)
(Continued)

(52) U.S. Cl.
CPC ........ *H04L 27/2636* (2013.01); *H04L 5/0053* (2013.01); *H04W 72/0453* (2013.01); *H04W 72/232* (2023.01)

(58) Field of Classification Search
CPC .......... H04L 27/2636; H04L 27/26524; H04L 5/0019; H04L 5/0053; H04L 27/26522;
(Continued)

(56) References Cited

U.S. PATENT DOCUMENTS

2022/0078765 A1* 3/2022 Kim ...................... H04W 72/23
2022/0085940 A1* 3/2022 Xiong ............... H04W 72/0453
(Continued)

FOREIGN PATENT DOCUMENTS

WO WO 2020/154380 A1 7/2020
WO WO 2021/040348 A1 3/2021
WO WO 2021/044074 A1 3/2021

OTHER PUBLICATIONS

3rd Generation Partnership Project (3GPP); "Technical Specification Group Radio Access Network; NR; Radio Resource Control (RRC) protocol specification (Release 16)", 3GPP TS 38.331 V16.7.0, Dec. 2021, 963 pages.
(Continued)

*Primary Examiner* — Aristocratis Fotakis
(74) *Attorney, Agent, or Firm* — Flaster Greenberg P.C.

(57) ABSTRACT

A wireless transmit/receive unit (WTRU) is configured to report to a network the WTRU capability for physical downlink control channel (PDCCH) decoding including supported number of discrete fourier transform (DFT) modules and sizes and receive from the network a PDCCH
(Continued)

configuration as a search space and control resource set (CORESET) configurations having a spreading factor or an orthogonal code length, a number of frequency resource groups (FRGs) and associated sizes, an indication of code domain multiplexing, and a CORESET format. The WTRU determines resource groups (RG) size and a number of RGs per control channel elements (CCE) based on configured spreading factor and FRG size, and determines an association between RGs and orthogonal cover codes (OCCs) per FRG and orthogonal frequency division multiplexing (OFDM) symbol based on, among other things, the configured spreading factor.

18 Claims, 33 Drawing Sheets

(51) Int. Cl.
*H04W 72/0453* (2023.01)
*H04W 72/232* (2023.01)

(58) Field of Classification Search
CPC ........ H04L 27/26526; H04W 72/0453; H04W 72/232
See application file for complete search history.

(56) References Cited

U.S. PATENT DOCUMENTS

2022/0287012 A1 9/2022 Kim et al.
2022/0377737 A1* 11/2022 Yoon .................. H04L 27/2636
2025/0274961 A1* 8/2025 Lim ..................... H04B 7/0628

OTHER PUBLICATIONS

3rd Generation Partnership Project (3GPP); "Technical Specification Group Radio Access Network; NR; NR and NG-RAN Overall Description; Stage 2 (Release 16)", 3GPP TS 38.300 V16.8.0, Dec. 2021, 152 pages.
3rd Generation Partnership Project (3GPP); "Technical Specification Group Radio Access Network; NR; Physical layer procedures for control (Release 17)", 3GPP TS 38.213 V17.0.0, Dec. 2021, 225 pages.
3rd Generation Partnership Project (3GPP); "Technical Specification Group Radio Access Network; Study on supporting NR from 52.6 GHz to 71 GHz (Release 17)", 3GPP TR 38.808 V17.0.0, Mar. 2021, 161 pages.
3rd Generation Partnership Project (3GPP); "Technical Specification Group Radio Access Network; NR; Physical channels and modulation (Release 15)", 3GPP TS 38.211 V15.10.0, Dec. 2021, 96 pages.
3rd Generation Partnership Project (3GPP); "Waveform Candidates", Qualcomm Incorporated, R1-162199, 3GPP TSG-RAN WG1 #84b, Apr. 11-15, 2016, Busan, Korea, 26 pages.
3rd Generation Partnership Project (3GPP); "Multiplexing of PDCCHs of Multiple UEs in E-UTRA Downlink", KDDI, NTT DoComo, R1-074236 (Original R1-073783), 3GPP TSG RAN WG1 Meeting #50, Shanghai, China, Oct. 8-12, 2007, 3 pages.
T. Iwai, A. Matsumoto, S. Takaoka, Y. Ogawa, A. Nishio and D. Imamura, "System Performance of Clustered DFT-S-OFDM Considering Maximum Allowable Transmit Power," 2011 IEEE International Conference on Communications (ICC), 2011, pp. 1-5, doi: 10.1109/icc.2011.5963492.
S. Ye, S. H. Wong and C. Worrall, "Enhanced physical downlink control channel in LTE advanced Release 11," in IEEE Communications Magazine, vol. 51, No. 2, pp. 82-89, Feb. 2013, doi: 10.1109/MCOM.2013.6461190.

* cited by examiner

100

| DCI Formats | Application |
|---|---|
| DCI 00 | PDSCH resources for uplink |
| DCI 01 | PDSCH resources for uplink |
| DCI 02 | PDSCH resources for uplink (compact, for URLLC) |
| DCI 10 | PDSCH resources for downlink |
| DCI 11 | PDSCH resources for downlink |
| DCI 12 | PDSCH resources for downlink (compact, for URLLC) |
| DCI 20 | Group Signaling - Slot format, COT duration, available RB set, search space set group switch, etc. |
| DCI 21 | Group Signaling - Pre-emption Indication |
| DCI 22 | Group Signaling - TPC command for UL |
| DCI 23 | Group Signaling - TPC command for SRS transmission |
| DCI 24 | Group Signaling - UL transmission cancellation indication |
| DCI 25 | IAB-MT - Soft Resources Indication |
| DCI 26 | Group Signaling -Wakeup indication |
| DCI 27 | Group Signaling - Paging early Ind and TRS availability Indication |
| DCI 30 | NR SL PSCCH and PSSCH resources Indication |
| DCI 31 | NR SL PSCCH and PSSCH resources Indication |
| DCI 40/41/42 | PDSCH Broadcast/Multicast |

FIG. 2

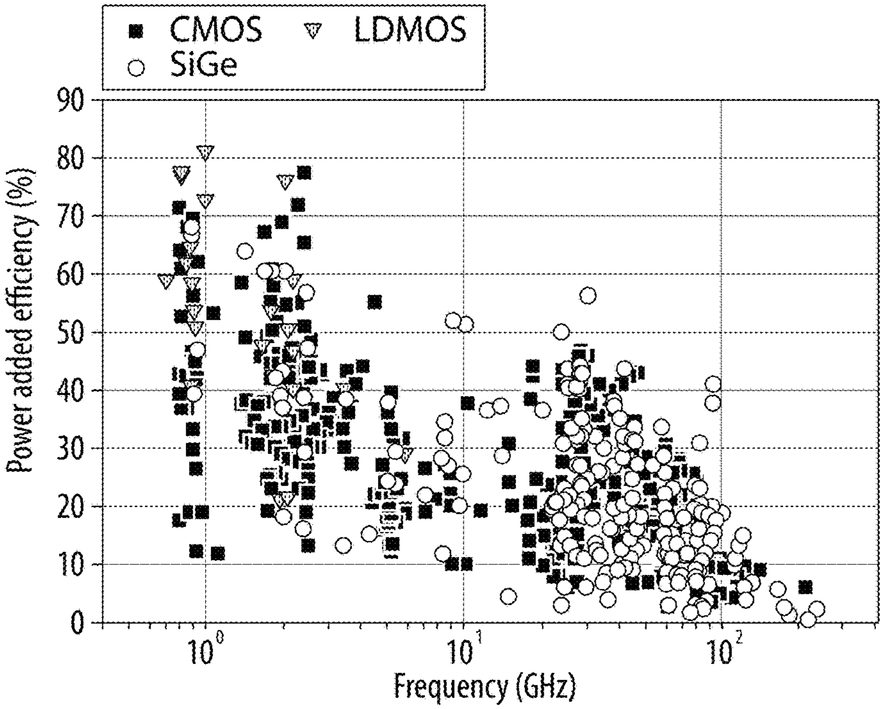
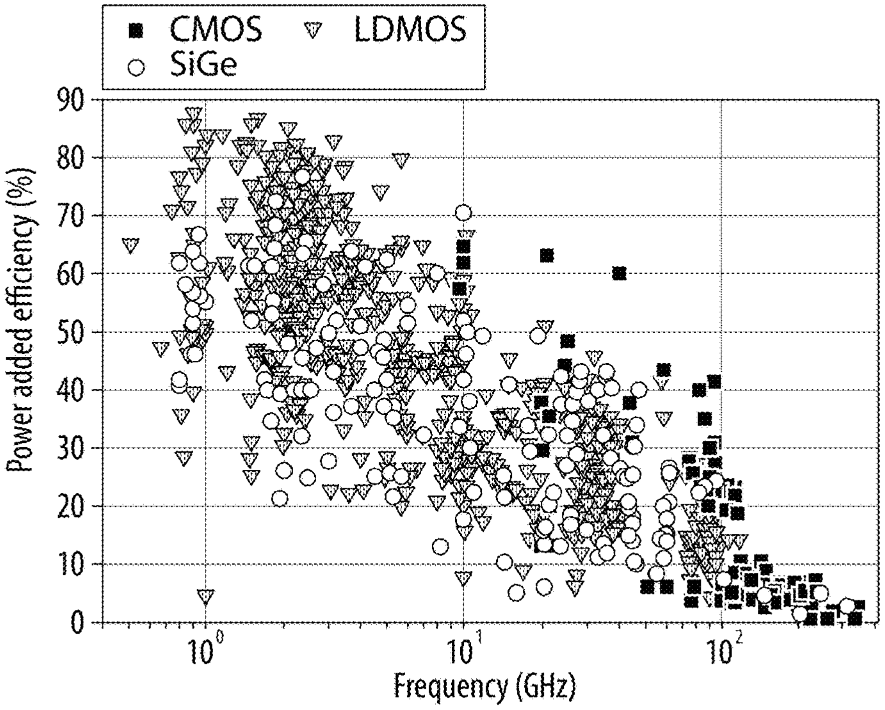
FIG. 3G

| PUCCH length | No additional DM-RS | | Additional DM-RS | |
|---|---|---|---|---|
| | No hopping | Hopping | No hopping | Hopping |
| 4 | 1 | 0, 2 | 1 | 0, 2 |
| 5 | 0, 3 | | 0, 3 | |
| 6 | 1, 4 | | 1, 4 | |
| 7 | 1, 4 | | 1, 4 | |
| 8 | 1, 5 | | 1, 5 | |
| 9 | 1, 6 | | 1, 6 | |
| 10 | 2, 7 | | 1, 3, 6, 8 | |
| 11 | 2, 7 | | 1, 3, 6, 9 | |
| 12 | 2, 8 | | 1, 4, 7, 10 | |
| 13 | 2, 9 | | 1, 4, 7, 11 | |
| 14 | 3, 10 | | 1, 4, 7, 12 | |

FIG. 4

DISCRETE FOURIER TRANSFORM PRE-CODED PHYSICAL DOWNLINK CONTROL CHANNEL WITH CODE DOMAIN MULTIPLEXING

CROSS-REFERENCE TO RELATED APPLICATIONS

This application is the 371 National Stage of International Application No. PCT/US2023/072560, filed Aug. 21, 2023, which claims the benefit of U.S. Provisional Application No. 63/399,813, filed on Aug. 22, 2022, the entire contents of which are incorporated herein by reference.

BACKGROUND

A power amplifier (PA) is considered to be one of the most power consuming units at wireless transmit/receive unit (WTRU). There is an inverse relationship between PA efficiency (e.g., power added efficiency (PAE) or power efficiency (PE)) and PA saturated power ($P_{sat}$) on the operating frequency. Operating at higher frequency bands, especially at carrier frequencies above 100 GHz and towards the THz regime, will correspond to lower PA efficiency and lower saturated power at the output of the PA. This problem is further aggravated for input signals exhibiting non-constant envelope characteristics, i.e., input signal with high peak to average power ratio (PAPR), due to the need for the PA to back-off from operating at the optimal point with highest efficiency at the maximum output power, i.e., PA saturated power.

Discrete Fourier Transform (DFT) spread orthogonal frequency division multiplexing (DFT-s-OFDM) is a waveform adopted by 3GPP for the uplink of 4G LTE and 5G NR due to its single-carrier nature, which may be characterized by a reduced PAPR compared to cyclic prefix (CP) OFDM (together, CP-OFDM), while maintaining its benefits of simple frequency-domain equalization and simple inter-symbol interference (ISI) mitigation. Adopting DFT-s-OFDM waveform for the downlink of beyond 5G NR with operation in frequency ranges higher than that of the current 5G NR frequency ranges may be desirable to address the challenges associated with coverage and energy/power efficiency at those frequency bands.

SUMMARY

A WTRU is defined by a configuration that reports to a network the WTRU capability for PDCCH decoding including supported number of discrete fourier transform (DFT) modules and sizes and receives from the network a physical downlink control channel (PDCCH) configuration as a search space and control resource set (CORESET) configurations having a spreading factor or an orthogonal code length, a number of frequency resource groups (FRGs) and associated sizes, an indication of code domain multiplexing, and a CORESET format. The WTRU is configured to determine resource groups (RG) size and a number of RGs per control channel elements (CCE) based on one or more of a configured spreading factor and FRG size; a determined association between RGs and orthogonal cover codes (OCCs) per FRG and orthogonal frequency division multiplexing (OFDM) symbol based on the configured spreading factor and preconfigured list of OCCs and a preconfigured mapping (e.g., for the RG size to the OOCs); and a determined RG allocation pattern, i.e., across OFDM symbols and FRGs, and CCE indices corresponding to each PDCCH candidate based on an aggregation level, the spreading factor, a CORESET format, and a pre-configured hash function.

The WTRU capability report may further include a maximum supported number of PDCCH candidates and maximum number of non-overlapped CCEs supported per slot per serving cell. The WTRU may be further configured to receive a CCE size and wherein the determination of the RG size is also based on the CCE size, and determine the RG size of a CCE as the ratio between the configured FRG size and the configured spreading factor. Still further, the WTRU may determines the number of RGs per CCE as the ratio between the configured CCE size and the determined RG size. The configuration may further determine a code domain multiplexing (CDM) RG set size and/or determine the aggregation level according to an indicated maximum aggregation level in the configured search space and a pre-configured hash function, wherein the pre-configured has function is determined based on the equation.

The WTRU configuration may further include a CORESET format indicating one or more of a number of OFDM symbols for DCI, a number of OFDM symbols for demodulation reference signal (DMRS), a total number of OFDM symbols for DCI and DMRS, OFDM symbol indices for DCI, and OFDM symbol indices for DMRS. The configuration may determine the CDM RG set size based on the configured spreading factor, CCE size, and FRG size, and the number of RGs per CCE. Further, the WTRU may determine a number of OCC-FRGs for each CDM RG set based on the RG size, spreading factor, FRG size, system bandwidth, and the subcarrier spacing, determine a number of time resource element (TRE) blocks, within each FRG, based on the number of CDM RG sets per FRG & OFDM symbol and a CORESET format; and determine the number of TREs associated with each CDM RG set in an FRG as the product of the RG size, spreading factor, and a ratio between an inverse fast fourier transform (IFFT) and DFT modules' size, where the DFT module size corresponds to the FRG size and the IFFT module size corresponds to a number of subcarriers in an OFDM system with a system bandwidth and a subcarrier spacing.

A method of operation of a WTRU or its configuration may be provided for reception, processing and decoding of DFT-s-OFDM based PDCCH, including a WTRU identifying an IDFT, CDM RGs of a PDCCH candidate and despreading the RGs, based on PDCCH processing parameters derived by the WTRU, according to network configuration. The method may further include a channel frequency-selective diversity processing of the PDCCH through DFT de-spreading, code domain de-spreading, and/or frequency domain de-interleaving.

A method of operation of a WTRU or its configuration may further be provided for determining a configuration for proper decoding of PDCCH candidates considering code domain multiplexing for given CCE size, spreading factor, number of DFTs and associated sizes, time domain configuration for DCI and DMRSs, frequency domain configuration, time/frequency domain interleaving configuration. The WTRU may further include use of the number of resource groups per CCE, number of DFTs and associated sizes, time domain configuration for DCI and DMRSs, frequency domain configuration, time/frequency domain interleaving configuration.

A wireless transmit/receive unit (WTRU) may be configured to perform a method of operation where it receives a first configuration information indicating a control channel element (CCE) size, a spreading factor, and an indication of code domain multiplexing (CDM). The WTRU determines a second configuration information based on the received first configuration information. The second configuration information may include a resource group (RG) size and a correspondence between the RG size for a CDM RG set and one or more orthogonal cover codes (OCCs). The WTRU may determines a CDM RG set allocation pattern across one or more orthogonal frequency division multiplexing (OFDM) symbols, such as discrete Fourier transform (DFT) spread OFDM (DFT-s-OFDM) symbols, and one or more frequency resource groups (FRGs) based on the second configuration information. The WTRU may receive a PDCCH transmission and perform an inverse discrete Fourier transform (IDFT) on a plurality of FRGs and the OFDM/DFT-s-OFDM symbols associated with the PDCCH transmission. The IDFT may be based on the CDM RG set allocation pattern and/or other parameters. The WTRU de-spreads a set of RGs corresponding to the PDCCH transmission, The de-spreading process may be based on the correspondence of RGs per CDM RG set to OCCs and/or other parameters. The WTRU further decodes a downlink control information (DCI) in the PDCCH transmission based on the de-spread set of RGs. The first configuration information is contemplated to be static, or at least semi-static. The second configuration information may include dynamic adaptation of configuration for decoding of the DCI in the PDCCH transmission.

The WTRU may be further configured to demodulate the OFDM/DFT-s-OFDM symbols received over one or more RGs associated with the PDCCH transmission to determine DL resource scheduling information. The WTRU may further receive a physical downlink shared channel (PDSCH) transmission based on the DL resource scheduling information. The first configuration information may include a search space configuration or a control resource set (CORESET) format. The first configuration information may include a number and size of one or more frequency resource groups (FRGs). The one or more FRGs may be associated with a single DFT module. The second configuration information may include a number of RGs per control channel elements (CCE) and a plurality of CDM RG sets. The WTRU may further determine the second configuration information based on correspondence of the RGs per CDM RG set to OCCs, a preconfigured list of OCCs, and a preconfigured mapping for the RG size to the OOCs. The RGs per CDM RG set may be associated with a DFT-s-OFDM symbol spanning an FRG.

The WTRU may be further configured to determine CCE indices for each PDCCH candidate of the PDCCH transmission based on an aggregation level and a pre-configured hash function. The WTRU may also perform the IDFT on the plurality of FRGs and the OFDM/DFT-s-OFDM symbols associated with the PDCCH transmission based on determined CCE indices, a number of RGs per CCE, and the CDM RG set allocation pattern. The WTRU may also be configured to demodulate the OFDM/DFT-s-OFDM symbols received over all RGs associated with the PDCCH transmission, detect a DCI format associated with the PDCCH transmission and decode the DCI based on the detected DCI format.

BRIEF DESCRIPTION OF THE DRAWINGS

FIG. 2 is a table showing a listing of DCI formats that are supported in NR.

FIG. 3G shows an example of 3G Peak power added efficiency versus frequency for power amplifiers using Silicon transistors (top) and GaN and GaAs transistors (bottom).

FIG. 4 is a table showing DM-RS positions for PUCCH format 3 and 4.

FIG. 5O shows examples of RG mapping with code domain multiplexing with both time and frequency domain interleaving configuration.

DETAILED DESCRIPTION

Figure 1A:
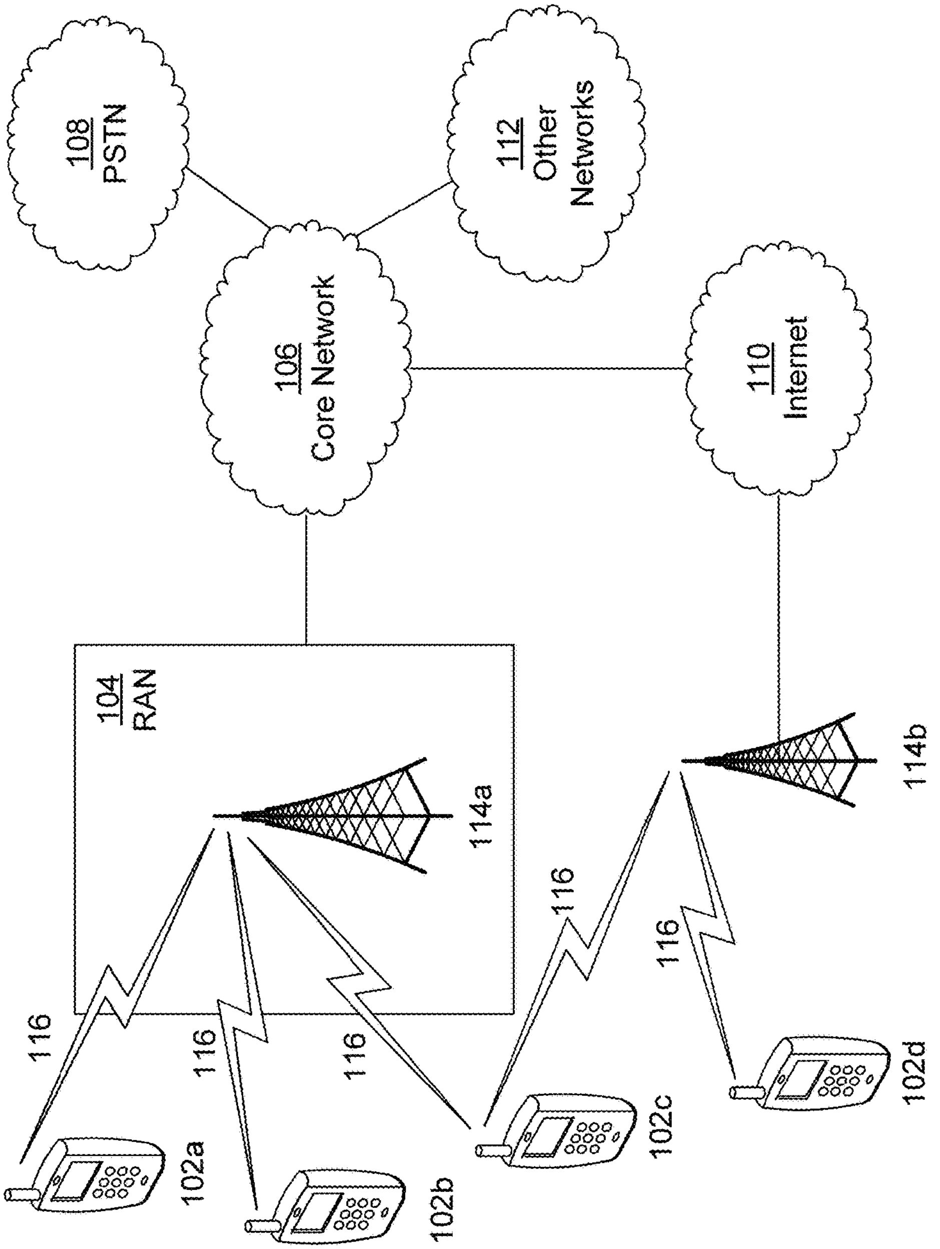
FIG. 1A is a system diagram illustrating an example communications system in which one or more disclosed embodiments may be implemented.

FIG. 1A is a diagram illustrating an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), zero-tail unique-word DFT-Spread OFDM (ZT UW DTS-s OFDM), unique word OFDM (UW-OFDM), resource block-filtered OFDM, filter bank multicarrier (FBMC), and the like.

As shown in FIG. 1A, the communications system 100 may include wireless transmit/receive units (WTRUs) 102*a*, 102*b*, 102*c*, 102*d*, a RAN 104/113, a CN 106/115, a public switched telephone network (PSTN) 108, the Internet 110, and other networks 112, though it will be appreciated that the disclosed embodiments contemplate any number of WTRUs, base stations, networks, and/or network elements. Each of the WTRUs 102*a*, 102*b*, 102*c*, 102*d* may be any type of device configured to operate and/or communicate in a wireless environment. By way of example, the WTRUs 102*a*, 102*b*, 102*c*, 102*d*, any of which may be referred to as a "station" and/or a "STA", may be configured to transmit and/or receive wireless signals and may include a user equipment (UE), a mobile station, a fixed or mobile subscriber unit, a subscription-based unit, a pager, a cellular telephone, a personal digital assistant (PDA), a smartphone, a laptop, a netbook, a personal computer, a wireless sensor, a hotspot or Mi-Fi device, an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. Any of the WTRUs 102*a*, 102*b*, 102*c* and 102*d* may be interchangeably referred to as a UE.

The communications systems 100 may also include a base station 114*a* and/or a base station 114*b*. Each of the base stations 114*a*, 114*b* may be any type of device configured to wirelessly interface with at least one of the WTRUs 102*a*, 102*b*, 102*c*, 102*d* to facilitate access to one or more communication networks, such as the CN 106/115, the Internet 110, and/or the other networks 112. Byway of example, the base stations 114*a*, 114*b* may be a base transceiver station (BTS), a Node-B, an eNode B, a Home Node B, a Home eNode B, a gNB, a NR NodeB, a site controller, an access point (AP), a wireless router, and the like. While the base stations 114*a*, 114*b* are each depicted as a single element, it will be appreciated that the base stations 114*a*, 114*b* may include any number of interconnected base stations and/or network elements.

The base station 114*a* may be part of the RAN 104/113, which may also include other base stations and/or network elements (not shown), such as a base station controller (BSC), a radio network controller (RNC), relay nodes, etc. The base station 114*a* and/or the base station 114*b* may be configured to transmit and/or receive wireless signals on one or more carrier frequencies, which may be referred to as a cell (not shown). These frequencies may be in licensed spectrum, unlicensed spectrum, or a combination of licensed and unlicensed spectrum. A cell may provide coverage for a wireless service to a specific geographical area that may be relatively fixed or that may change over time. The cell may further be divided into cell sectors. For example, the cell associated with the base station 114*a* may be divided into three sectors. Thus, in one embodiment, the base station 114*a* may include three transceivers, i.e., one for each sector of the cell. In an embodiment, the base station 114*a* may employ multiple-input multiple output (MIMO) technology and may utilize multiple transceivers for each sector of the cell. For example, beamforming may be used to transmit and/or receive signals in desired spatial directions.

The base stations 114*a*, 114*b* may communicate with one or more of the WTRUs 102*a*, 102*b*, 102*c*, 102*d* over an air interface 116, which may be any suitable wireless communication link (e.g., radio frequency (RF), microwave, centimeter wave, micrometer wave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114*a* in the RAN 104/113 and the WTRUs 102*a*, 102*b*, 102*c* may implement a radio technology such as Universal Mobile Telecommunications System (UMTS) Terrestrial Radio Access (UTRA), which may establish the air interface 115/116/117 using wideband CDMA (WCDMA). WCDMA may include communication protocols such as High-Speed Packet Access (HSPA) and/or Evolved HSPA (HSPA+). HSPA may include High-Speed Downlink (DL) Packet Access (HSDPA) and/or High-Speed UL Packet Access (HSUPA).

In an embodiment, the base station 114*a* and the WTRUs 102*a*, 102*b*, 102*c* may implement a radio technology such as Evolved UMTS Terrestrial Radio Access (E-UTRA), which may establish the air interface 116 using Long Term Evolution (LTE) and/or LTE-Advanced (LTE-A) and/or LTE-Advanced Pro (LTE-A Pro).

In an embodiment, the base station 114*a* and the WTRUs 102*a*, 102*b*, 102*c* may implement a radio technology such as NR Radio Access, which may establish the air interface 116 using New Radio (NR).

In an embodiment, the base station 114*a* and the WTRUs 102*a*, 102*b*, 102*c* may implement multiple radio access technologies. For example, the base station 114*a* and the WTRUs 102*a*, 102*b*, 102*c* may implement LTE radio access and NR radio access together, for instance using dual connectivity (DC) principles. Thus, the air interface utilized by WTRUs 102*a*, 102*b*, 102*c* may be characterized by multiple types of radio access technologies and/or transmissions sent to/from multiple types of base stations (e.g., an eNB and a gNB).

In other embodiments, the base station 114*a* and the WTRUs 102*a*, 102*b*, 102*c* may implement radio technologies such as IEEE 802.11 (i.e., Wireless Fidelity (WiFi), IEEE 802.16 (i.e., Worldwide Interoperability for Microwave Access (WiMAX)), CDMA2000, CDMA2000 1×, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114*b* in FIG. 1A may be a wireless router, Home Node B, Home eNode B, or access point, for example, and may utilize any suitable RAT for facilitating wireless connectivity in a localized area, such as a place of business, a home, a vehicle, a campus, an industrial facility, an air corridor (e.g., for use by drones), a roadway, and the like. In one embodiment, the base station 114*b* and the WTRUs 102*c*, 102*d* may implement a radio technology such as IEEE 802.11 to establish a wireless local area network (WLAN). In an embodiment, the base station 114*b* and the WTRUs 102*c*, 102*d* may implement a radio technology such as IEEE 802.15 to establish a wireless personal area network (WPAN). In yet another embodiment, the base station 114*b* and the WTRUs 102*c*, 102*d* may utilize a cellular-based RAT (e.g., WCDMA, CDMA2000, GSM, LTE, LTE-A, LTE-A Pro, NR etc.) to establish a picocell or femtocell. As shown in FIG. 1A, the base station 114*b* may have a direct connection to the Internet 110. Thus, the base station 114*b* may not be required to access the Internet 110 via the CN 106/115.

The RAN 104/113 may be in communication with the CN 106/115, which may be any type of network configured to provide voice, data, applications, and/or voice over internet protocol (VoIP) services to one or more of the WTRUs 102*a*, 102*b*, 102*c*, 102*d*. The data may have varying quality of service (QoS) requirements, such as differing throughput requirements, latency requirements, error tolerance requirements, reliability requirements, data throughput requirements, mobility requirements, and the like. The CN 106/115 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104/113 and/or the CN 106/115 may be in direct or indirect communication with other RANs that employ the same RAT as the RAN 104/113 or a different RAT. For example, in addition to being connected to the RAN 104/113, which may be utilizing a NR radio technology, the CN 106/115 may also be in communication with another RAN (not shown) employing a GSM, UMTS, CDMA 2000, WiMAX, E-UTRA, or WiFi radio technology.

The CN 106/115 may also serve as a gateway for the WTRUs 102*a*, 102*b*, 102*c*, 102*d* to access the PSTN 108, the Internet 110, and/or the other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and/or the internet protocol (IP) in the TCP/IP internet protocol suite. The networks 112 may include wired and/or wireless communications networks owned and/or operated by other service providers. For example, the networks 112 may include another CN connected to one or more RANs, which may employ the same RAT as the RAN 104/113 or a different RAT.

Some or all of the WTRUs 102*a*, 102*b*, 102*c*, 102*d* in the communications system 100 may include multi-mode capabilities (e.g., the WTRUs 102*a*, 102*b*, 102*c*, 102*d* may include multiple transceivers for communicating with different wireless networks over different wireless links). For example, the WTRU 102*c* shown in FIG. 1A may be configured to communicate with the base station 114*a*, which may employ a cellular-based radio technology, and with the base station 114*b*, which may employ an IEEE 802 radio technology.

Figure 1B:
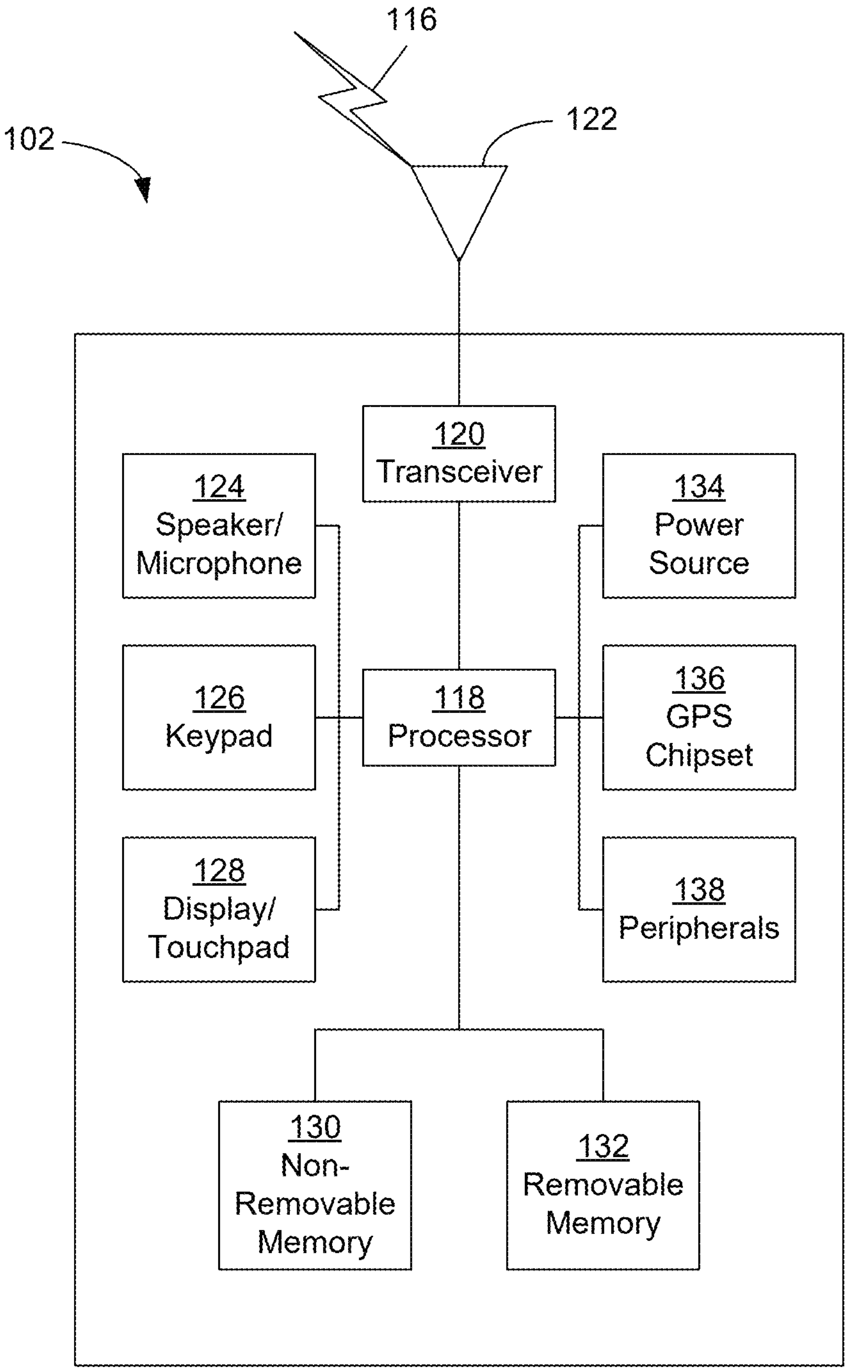
FIG. 1B is a system diagram illustrating an example wireless transmit/receive unit (WTRU) that may be used within the communications system illustrated in FIG. 1A according to an embodiment.

FIG. 1B is a system diagram illustrating an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and/or other peripherals 138, among others. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114*a*) over the air interface 116. For example, in one embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In yet another embodiment, the transmit/receive element 122 may be configured to transmit and/or receive both RF and light signals. It will be appreciated that the transmit/receive element 122 may be configured to transmit and/or receive any combination of wireless signals.

Although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as NR and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114*a*, 114*b*) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs and/or video), a universal serial bus (USB) port, a vibration device, a television transceiver, a hands free headset, a Bluetooth® module, a frequency modulated (FM) radio unit, a digital music player, a media player, a video game player module, an Internet browser, a Virtual Reality and/or Augmented Reality (VR/AR) device, an activity tracker, and the like. The peripherals 138 may include one or more sensors, the sensors may be one or more of a gyroscope, an accelerometer, a hall effect sensor, a magnetometer, an orientation sensor, a proximity sensor, a temperature sensor, a time sensor; a geolocation sensor; an altimeter, a light sensor, a touch sensor, a magnetometer, a barometer, a gesture sensor, a biometric sensor, and/or a humidity sensor.

The WTRU 102 may include a full duplex radio for which transmission and reception of some or all of the signals (e.g., associated with particular subframes for both the UL (e.g., for transmission) and downlink (e.g., for reception) may be concurrent and/or simultaneous. The full duplex radio may include an interference management unit 139 to reduce and or substantially eliminate self-interference via either hardware (e.g., a choke) or signal processing via a processor (e.g., a separate processor (not shown) or via processor 118). In an embodiment, the WTRU 102 may include a half-duplex radio for which transmission and reception of some or all of the signals (e.g., associated with particular subframes for either the UL (e.g., for transmission) or the downlink (e.g., for reception)).

Figure 1C:
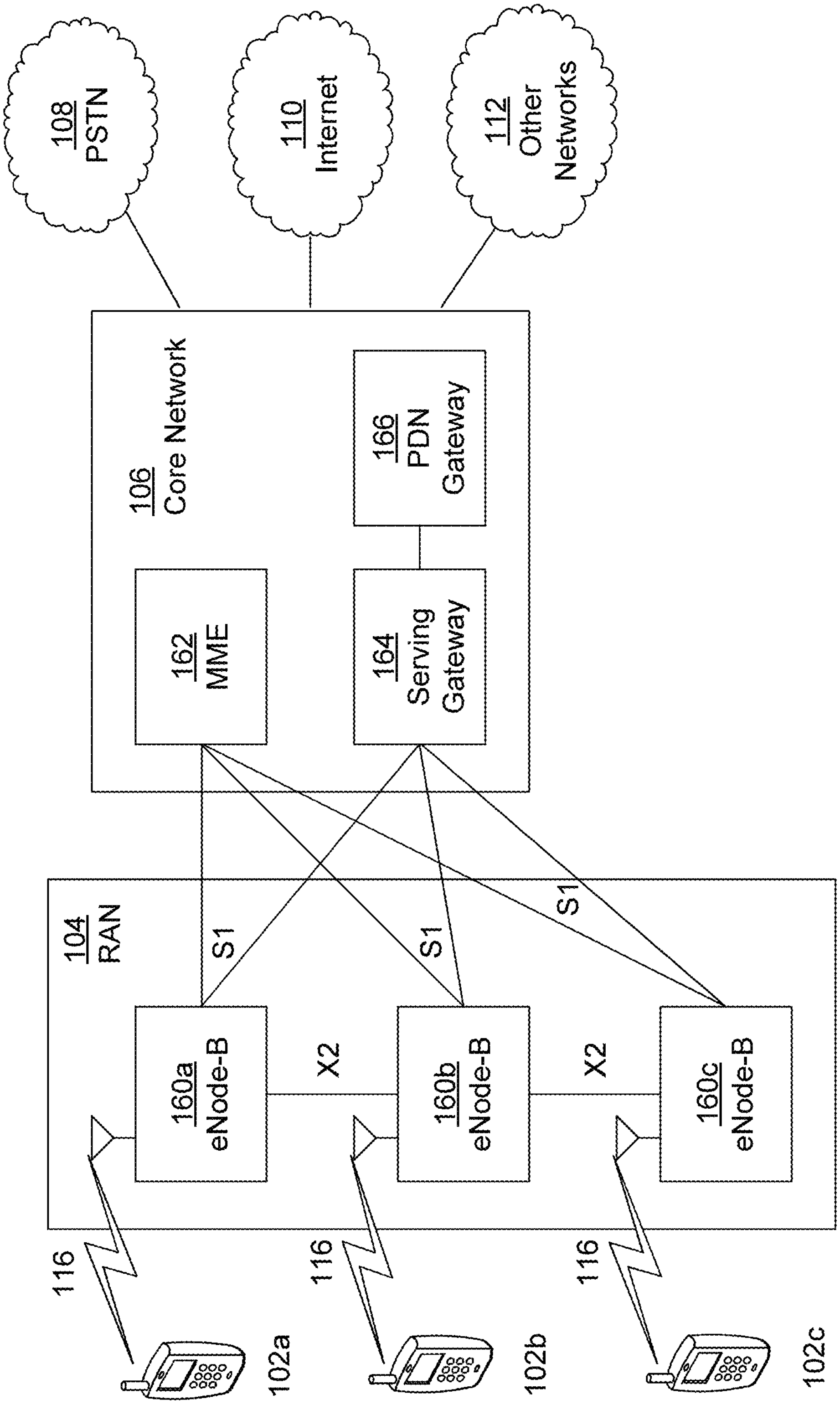
FIG. 1C is a system diagram illustrating an example radio access network (RAN) and an example core network (CN) that may be used within the communications system illustrated in FIG. 1A according to an embodiment.

FIG. 1C is a system diagram illustrating the RAN 104 and the CN 106 according to an embodiment. As noted above, the RAN 104 may employ an E-UTRA radio technology to communicate with the WTRUs 102*a*, 102*b*, 102*c* over the air interface 116. The RAN 104 may also be in communication with the CN 106.

The RAN 104 may include eNode-Bs 160*a*, 160*b*, 160*c*, though it will be appreciated that the RAN 104 may include any number of eNode-Bs while remaining consistent with an embodiment. The eNode-Bs 160*a*, 160*b*, 160*c* may each include one or more transceivers for communicating with the WTRUs 102*a*, 102*b*, 102*c* over the air interface 116. In one embodiment, the eNode-Bs 160*a*, 160*b*, 160*c* may implement MIMO technology. Thus, the eNode-B 160*a*, for example, may use multiple antennas to transmit wireless signals to, and/or receive wireless signals from, the WTRU 102*a*.

Each of the eNode-Bs 160*a*, 160*b*, 160*c* may be associated with a particular cell (not shown) and may be configured to handle radio resource management decisions, handover decisions, scheduling of users in the UL and/or DL, and the like. As shown in FIG. 1C, the eNode-Bs 160*a*, 160*b*, 160*c* may communicate with one another over an X2 interface.

The CN 106 shown in FIG. 1C may include a mobility management entity (MME) 162, a serving gateway (SGW) 164, and a packet data network (PDN) gateway (or PGW) 166. While each of the foregoing elements are depicted as part of the CN 106, it will be appreciated that any of these elements may be owned and/or operated by an entity other than the CN operator.

The MME 162 may be connected to each of the eNode-Bs 162*a*, 162*b*, 162*c* in the RAN 104 via an S1 interface and may serve as a control node. For example, the MME 162 may be responsible for authenticating users of the WTRUs 102*a*, 102*b*, 102*c*, bearer activation/deactivation, selecting a particular serving gateway during an initial attach of the WTRUs 102*a*, 102*b*, 102*c*, and the like. The MME 162 may provide a control plane function for switching between the RAN 104 and other RANs (not shown) that employ other radio technologies, such as GSM and/or WCDMA.

The SGW 164 may be connected to each of the eNode Bs 160*a*, 160*b*, 160*c* in the RAN 104 via the S1 interface. The SGW 164 may generally route and forward user data packets to/from the WTRUs 102*a*, 102*b*, 102*c*. The SGW 164 may perform other functions, such as anchoring user planes during inter-eNode B handovers, triggering paging when DL data is available for the WTRUs 102*a*, 102*b*, 102*c*, managing and storing contexts of the WTRUs 102*a*, 102*b*, 102*c*, and the like.

The SGW 164 may be connected to the PGW 166, which may provide the WTRUs 102*a*, 102*b*, 102*c* with access to packet-switched networks, such as the Internet 110, to facilitate communications between the WTRUs 102*a*, 102*b*, 102*c* and IP-enabled devices.

The CN 106 may facilitate communications with other networks. For example, the CN 106 may provide the WTRUs 102*a*, 102*b*, 102*c* with access to circuit-switched networks, such as the PSTN 108, to facilitate communications between the WTRUs 102*a*, 102*b*, 102*c* and traditional land-line communications devices. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102*a*, 102*b*, 102*c* with access to the other networks 112, which may include other wired and/or wireless networks that are owned and/or operated by other service providers.

Although the WTRU is described in FIGS. 1A-1D as a wireless terminal, it is contemplated that in certain representative embodiments that such a terminal may use (e.g., temporarily or permanently) wired communication interfaces with the communication network.

In representative embodiments, the other network 112 may be a WLAN.

A WLAN in Infrastructure Basic Service Set (BSS) mode may have an Access Point (AP) for the BSS and one or more stations (STAs) associated with the AP. The AP may have an access or an interface to a Distribution System (DS) or another type of wired/wireless network that carries traffic in to and/or out of the BSS. Traffic to STAs that originates from outside the BSS may arrive through the AP and may be delivered to the STAs. Traffic originating from STAs to destinations outside the BSS may be sent to the AP to be delivered to respective destinations. Traffic between STAs within the BSS may be sent through the AP, for example, where the source STA may send traffic to the AP and the AP may deliver the traffic to the destination STA. The traffic between STAs within a BSS may be considered and/or referred to as peer-to-peer traffic. The peer-to-peer traffic may be sent between (e.g., directly between) the source and destination STAs with a direct link setup (DLS). In certain representative embodiments, the DLS may use an 802.11e DLS or an 802.11z tunneled DLS (TDLS). A WLAN using an Independent BSS (IBSS) mode may not have an AP, and the STAs (e.g., all of the STAs) within or using the IBSS may communicate directly with each other. The IBSS mode of communication may sometimes be referred to herein as an "ad-hoc" mode of communication.

When using the 802.11ac infrastructure mode of operation or a similar mode of operations, the AP may transmit a beacon on a fixed channel, such as a primary channel. The primary channel may be a fixed width (e.g., 20 MHz wide bandwidth) or a dynamically set width via signaling. The primary channel may be the operating channel of the BSS and may be used by the STAs to establish a connection with the AP. In certain representative embodiments, Carrier Sense Multiple Access with Collision Avoidance (CSMA/CA) may be implemented, for example in in 802.11 systems. For CSMA/CA, the STAs (e.g., every STA), including the AP, may sense the primary channel. If the primary channel is sensed/detected and/or determined to be busy by a particular STA, the particular STA may back off. One STA (e.g., only one station) may transmit at any given time in a given BSS.

High Throughput (HT) STAs may use a 40 MHz wide channel for communication, for example, via a combination of the primary 20 MHz channel with an adjacent or nonadjacent 20 MHz channel to form a 40 MHz wide channel.

Very High Throughput (VHT) STAs may support 20 MHz, 40 MHz, 80 MHz, and/or 160 MHz wide channels. The 40 MHz, and/or 80 MHz, channels may be formed by combining contiguous 20 MHz channels. A 160 MHz channel may be formed by combining 8 contiguous 20 MHz channels, or by combining two non-contiguous 80 MHz channels, which may be referred to as an 80+80 configuration. For the 80+80 configuration, the data, after channel encoding, may be passed through a segment parser that may divide the data into two streams. Inverse Fast Fourier Transform (IFFT) processing, and time domain processing, may be done on each stream separately. The streams may be mapped on to the two 80 MHz channels, and the data may be transmitted by a transmitting STA. At the receiver of the receiving STA, the above described operation for the 80+80 configuration may be reversed, and the combined data may be sent to the Medium Access Control (MAC).

Sub 1 GHz modes of operation are supported by 802.11af and 802.11ah. The channel operating bandwidths, and carriers, are reduced in 802.11af and 802.11ah relative to those used in 802.11n, and 802.11ac. 802.11af supports 5 MHz, 10 MHz and 20 MHz bandwidths in the TV White Space (TVWS) spectrum, and 802.11ah supports 1 MHz, 2 MHz, 4 MHz, 8 MHz, and 16 MHz bandwidths using non-TVWS spectrum. According to a representative embodiment, 802.11ah may support Meter Type Control/Machine-Type Communications, such as MTC devices in a macro coverage area. MTC devices may have certain capabilities, for example, limited capabilities including support for (e.g., only support for) certain and/or limited bandwidths. The MTC devices may include a battery with a battery life above a threshold (e.g., to maintain a very long battery life).

WLAN systems, which may support multiple channels, and channel bandwidths, such as 802.11n, 802.11ac, 802.11af, and 802.11ah, include a channel which may be designated as the primary channel. The primary channel may have a bandwidth equal to the largest common operating bandwidth supported by all STAs in the BSS. The bandwidth of the primary channel may be set and/or limited by a STA, from among all STAs in operating in a BSS, which supports the smallest bandwidth operating mode. In the example of 802.11ah, the primary channel may be 1 MHz wide for STAs (e.g., MTC type devices) that support (e.g., only support) a 1 MHz mode, even if the AP, and other STAs in the BSS support 2 MHz, 4 MHz, 8 MHz, 16 MHz, and/or other channel bandwidth operating modes. Carrier sensing and/or Network Allocation Vector (NAV) settings may depend on the status of the primary channel. If the primary channel is busy, for example, due to a STA (which supports only a 1 MHz operating mode), transmitting to the AP, the entire available frequency bands may be considered busy even though a majority of the frequency bands remains idle and may be available.

In the United States, the available frequency bands, which may be used by 802.11ah, are from 902 MHz to 928 MHz. In Korea, the available frequency bands are from 917.5 MHz to 923.5 MHz. In Japan, the available frequency bands are from 916.5 MHz to 927.5 MHz. The total bandwidth available for 802.11ah is 6 MHz to 26 MHz depending on the country code.

Figure 1D:
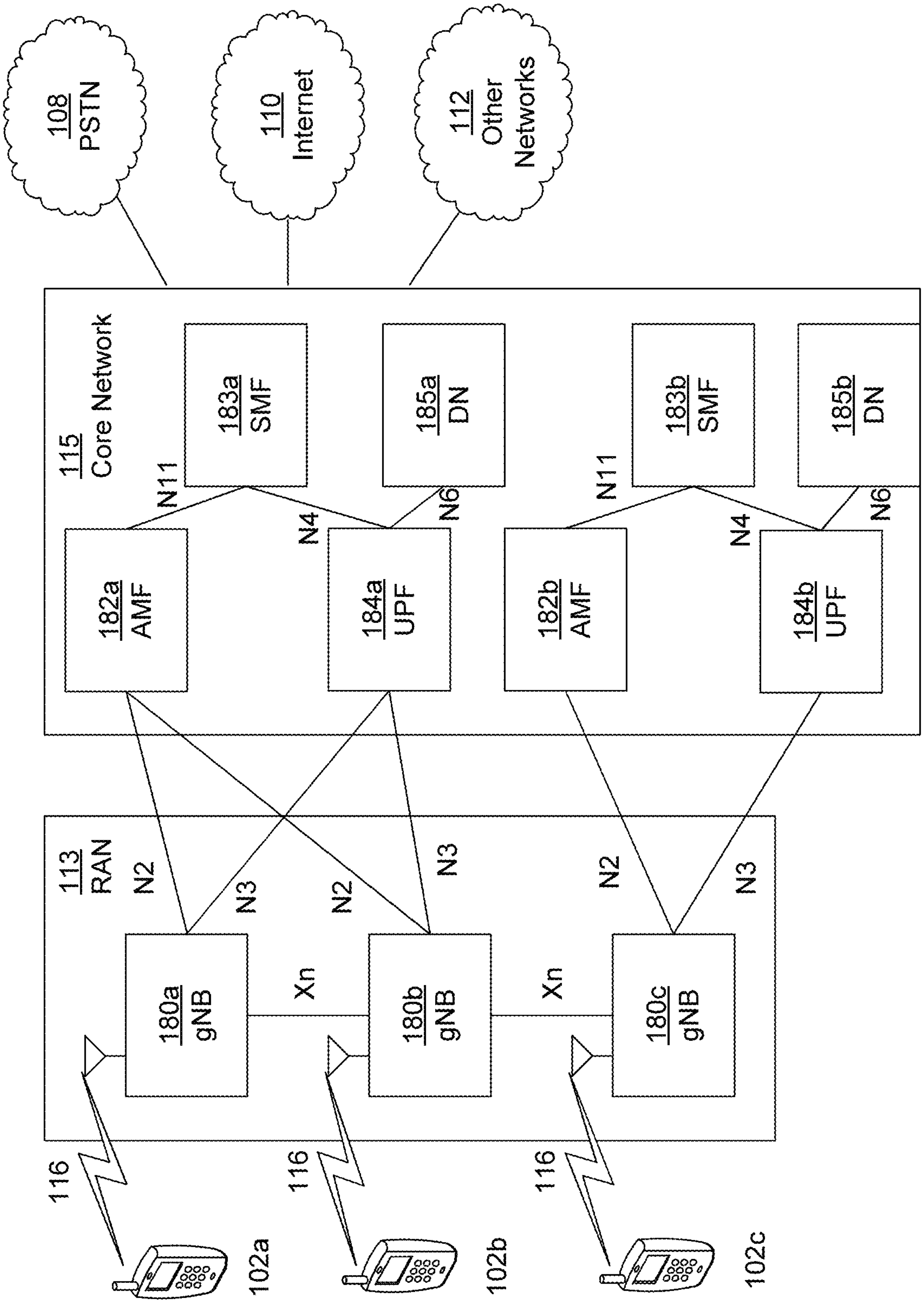
FIG. 1D is a system diagram illustrating a further example RAN and a further example CN that may be used within the communications system illustrated in FIG. 1A according to an embodiment.

FIG. 1D is a system diagram illustrating the RAN 113 and the CN 115 according to an embodiment. As noted above, the RAN 113 may employ an NR radio technology to communicate with the WTRUs 102*a*, 102*b*, 102*c* over the air interface 116. The RAN 113 may also be in communication with the CN 115.

The RAN 113 may include gNBs 180*a*, 180*b*, 180*c*, though it will be appreciated that the RAN 113 may include any number of gNBs while remaining consistent with an embodiment. The gNBs 180*a*, 180*b*, 180*c* may each include one or more transceivers for communicating with the WTRUs 102*a*, 102*b*, 102*c* over the air interface 116. In one embodiment, the gNBs 180*a*, 180*b*, 180*c* may implement MIMO technology. For example, gNBs 180*a*, 108*b* may utilize beamforming to transmit signals to and/or receive signals from the gNBs 180*a*, 180*b*, 180*c*. Thus, the gNB 180*a*, for example, may use multiple antennas to transmit wireless signals to, and/or receive wireless signals from, the WTRU 102*a*. In an embodiment, the gNBs 180*a*, 180*b*, 180*c* may implement carrier aggregation technology. For example, the gNB 180*a* may transmit multiple component carriers to the WTRU 102*a* (not shown). A subset of these component carriers may be on unlicensed spectrum while the remaining component carriers may be on licensed spectrum. In an embodiment, the gNBs 180*a*, 180*b*, 180*c* may implement Coordinated Multi-Point (CoMP) technology. For example, WTRU 102*a* may receive coordinated transmissions from gNB 180*a* and gNB 180*b* (and/or gNB 180*c*).

The WTRUs 102*a*, 102*b*, 102*c* may communicate with gNBs 180*a*, 180*b*, 180*c* using transmissions associated with a scalable numerology. For example, the OFDM symbol spacing and/or OFDM subcarrier spacing may vary for different transmissions, different cells, and/or different portions of the wireless transmission spectrum. The WTRUs 102*a*, 102*b*, 102*c* may communicate with gNBs 180*a*, 180*b*, 180*c* using subframe or transmission time intervals (TTIs) of various or scalable lengths (e.g., containing varying number of OFDM symbols and/or lasting varying lengths of absolute time).

The gNBs 180*a*, 180*b*, 180*c* may be configured to communicate with the WTRUs 102*a*, 102*b*, 102*c* in a standalone configuration and/or a non-standalone configuration. In the standalone configuration, WTRUs 102*a*, 102*b*, 102*c* may communicate with gNBs 180*a*, 180*b*, 180*c* without also accessing other RANs (e.g., such as eNode-Bs 160*a*, 160*b*, 160*c*). In the standalone configuration, WTRUs 102*a*, 102*b*, 102*c* may utilize one or more of gNBs 180*a*, 180*b*, 180*c* as a mobility anchor point. In the standalone configuration, WTRUs 102*a*, 102*b*, 102*c* may communicate with gNBs 180*a*, 180*b*, 180*c* using signals in an unlicensed band. In a non-standalone configuration WTRUs 102*a*, 102*b*, 102*c* may communicate with/connect to gNBs 180*a*, 180*b*, 180*c* while also communicating with/connecting to another RAN such as eNode-Bs 160*a*, 160*b*, 160*c*. For example, WTRUs 102*a*, 102*b*, 102*c* may implement DC principles to communicate with one or more gNBs 180*a*, 180*b*, 180*c* and one or more eNode-Bs 160*a*, 160*b*, 160*c* substantially simultaneously. In the non-standalone configuration, eNode-Bs 160*a*, 160*b*, 160*c* may serve as a mobility anchor for WTRUs 102*a*, 102*b*, 102*c* and gNBs 180*a*, 180*b*, 180*c* may provide additional coverage and/or throughput for servicing WTRUs 102*a*, 102*b*, 102*c*.

Each of the gNBs 180*a*, 180*b*, 180*c* may be associated with a particular cell (not shown) and may be configured to handle radio resource management decisions, handover decisions, scheduling of users in the UL and/or DL, support of network slicing, dual connectivity, interworking between NR and E-UTRA, routing of user plane data towards User Plane Function (UPF) 184*a*, 184*b*, routing of control plane information towards Access and Mobility Management Function (AMF) 182*a*, 182*b* and the like. As shown in FIG. 1D, the gNBs 180*a*, 180*b*, 180*c* may communicate with one another over an Xn interface.

The CN 115 shown in FIG. 1D may include at least one AMF 182*a*, 182*b*, at least one UPF 184*a*, 184*b*, at least one Session Management Function (SMF) 183*a*, 183*b*, and possibly a Data Network (DN) 185*a*, 185*b*. While each of the foregoing elements are depicted as part of the CN 115, it will be appreciated that any of these elements may be owned and/or operated by an entity other than the CN operator.

The AMF 182*a*, 182*b* may be connected to one or more of the gNBs 180*a*, 180*b*, 180*c* in the RAN 113 via an N2 interface and may serve as a control node. For example, the AMF 182*a*, 182*b* may be responsible for authenticating users of the WTRUs 102*a*, 102*b*, 102*c*, support for network slicing (e.g., handling of different PDU sessions with different requirements), selecting a particular SMF 183*a*, 183*b*, management of the registration area, termination of non-access stratum (NAS) signaling, mobility management, and the like. Network slicing may be used by the AMF 182*a*, 182*b* in order to customize CN support for WTRUs 102*a*, 102*b*, 102*c* based on the types of services being utilized WTRUs 102*a*, 102*b*, 102*c*. For example, different network slices may be established for different use cases such as services relying on ultra-reliable low latency (URLLC) access, services relying on enhanced massive mobile broadband (eMBB) access, services for machine type communication (MTC) access, and/or the like. The AMF 162 may provide a control plane function for switching between the RAN 113 and other RANs (not shown) that employ other radio technologies, such as LTE, LTE-A, LTE-A Pro, and/or non-3GPP access technologies such as WiFi.

The SMF 183*a*, 183*b* may be connected to an AMF 182*a*, 182*b* in the CN 115 via an N11 interface. The SMF 183*a*, 183*b* may also be connected to a UPF 184*a*, 184*b* in the CN 115 via an N4 interface. The SMF 183*a*, 183*b* may select and control the UPF 184*a*, 184*b* and configure the routing of traffic through the UPF 184*a*, 184*b*. The SMF 183*a*, 183*b* may perform other functions, such as managing and allocating UE IP address, managing PDU sessions, controlling policy enforcement and QoS, providing downlink data notifications, and the like. A PDU session type may be IP-based, non-IP based, Ethernet-based, and the like.

The UPF 184*a*, 184*b* may be connected to one or more of the gNBs 180*a*, 180*b*, 180*c* in the RAN 113 via an N3 interface, which may provide the WTRUs 102*a*, 102*b*, 102*c* with access to packet-switched networks, such as the Internet 110, to facilitate communications between the WTRUs 102*a*, 102*b*, 102*c* and IP-enabled devices. The UPF 184, 184*b* may perform other functions, such as routing and forwarding packets, enforcing user plane policies, supporting multi-homed PDU sessions, handling user plane QoS, buffering downlink packets, providing mobility anchoring, and the like.

The CN 115 may facilitate communications with other networks. For example, the CN 115 may include, or may communicate with, an IP gateway (e.g., an IP multimedia subsystem (IMS) server) that serves as an interface between the CN 115 and the PSTN 108. In addition, the CN 115 may provide the WTRUs 102*a*, 102*b*, 102*c* with access to the other networks 112, which may include other wired and/or wireless networks that are owned and/or operated by other service providers. In one embodiment, the WTRUs 102*a*, 102*b*, 102*c* may be connected to a local Data Network (DN) 185*a*, 185*b* through the UPF 184*a*, 184*b* via the N3 interface to the UPF 184*a*, 184*b* and an N6 interface between the UPF 184*a*, 184*b* and the DN 185*a*, 185*b*.

In view of FIGS. 1A-1D, and the corresponding description of FIGS. 1A-1D, one or more, or all, of the functions described herein with regard to one or more of: WTRU 102*a-d*, Base Station 114*a-b*, eNode-B 160*a-c*, MME 162, SGW 164, PGW 166, gNB 180*a-c*, AMF 182*a-b*, UPF 184*a-b*, SMF 183*a-b*, DN 185*a-b*, and/or any other device(s) described herein, may be performed by one or more emulation devices (not shown). The emulation devices may be one or more devices configured to emulate one or more, or all, of the functions described herein. For example, the emulation devices may be used to test other devices and/or to simulate network and/or WTRU functions.

The emulation devices may be designed to implement one or more tests of other devices in a lab environment and/or in an operator network environment. For example, the one or more emulation devices may perform the one or more, or all, functions while being fully or partially implemented and/or deployed as part of a wired and/or wireless communication network in order to test other devices within the communication network. The one or more emulation devices may perform the one or more, or all, functions while being temporarily implemented/deployed as part of a wired and/or wireless communication network. The emulation device may be directly coupled to another device for purposes of testing and/or may performing testing using over-the-air wireless communications.

The one or more emulation devices may perform the one or more, including all, functions while not being implemented/deployed as part of a wired and/or wireless communication network. For example, the emulation devices may be utilized in a testing scenario in a testing laboratory and/or a non-deployed (e.g., testing) wired and/or wireless communication network in order to implement testing of one or more components. The one or more emulation devices may be test equipment. Direct RF coupling and/or wireless communications via RF circuitry (e.g., which may include one or more antennas) may be used by the emulation devices to transmit and/or receive data.

Downlink control information (DCI) in 3GPP NR for a WTRU may be carried over physical downlink control channel (PDCCH). This corresponds to physical layer signaling from layer 1. Multiple DCIs with different formats may be configured for different purposes. A listing of DCI formats that are supported in new radio (NR) is shown in FIG. 2.

A PDCCH carrying DCI for a WTRU may be transmitted using resource elements belonging to a control resource set (CORESET). A CORESET defines a time-frequency region within the WTRU's active bandwidth part where WTRU may expect to receive its DCI. A WTRU may be configured with one or more CORESETs over its active bandwidth part. A CORESET may be a set of contiguous or non-contiguous physical resource blocks (PRB) configured using 6-PRB granularity within which the WTRU attempts to blindly decode its DCI. In time domain, a CORESET spans 1, 2, or 3 contiguous OFDM symbols, and the exact duration may be configured to the WTRU by higher layer signaling, such as SI or WTRU-specific RRC depending on whether it may be common CORESET or WTRU-specific CORESET. Compared to LTE PDCCH, the configurability of CORESETs enables efficient resource sharing between DL control and shared channels, thereby allowing for efficient Layer 1 signaling overhead management.

A PDCCH's resource elements may be defined in terms of control channel elements (CCE). A CCE may be equivalent to 6 resource element groups (REG) which may be equivalent to 72 resource elements. A PDCCH may use one or more CCEs. The number of CCEs allocated to a PDCCH may be defined by aggregation level. WTRU which experiences poor coverage are normally allocated higher aggregation levels to allow increased channel coding gain, i.e., higher quantities of redundancy.

Figure 3A:
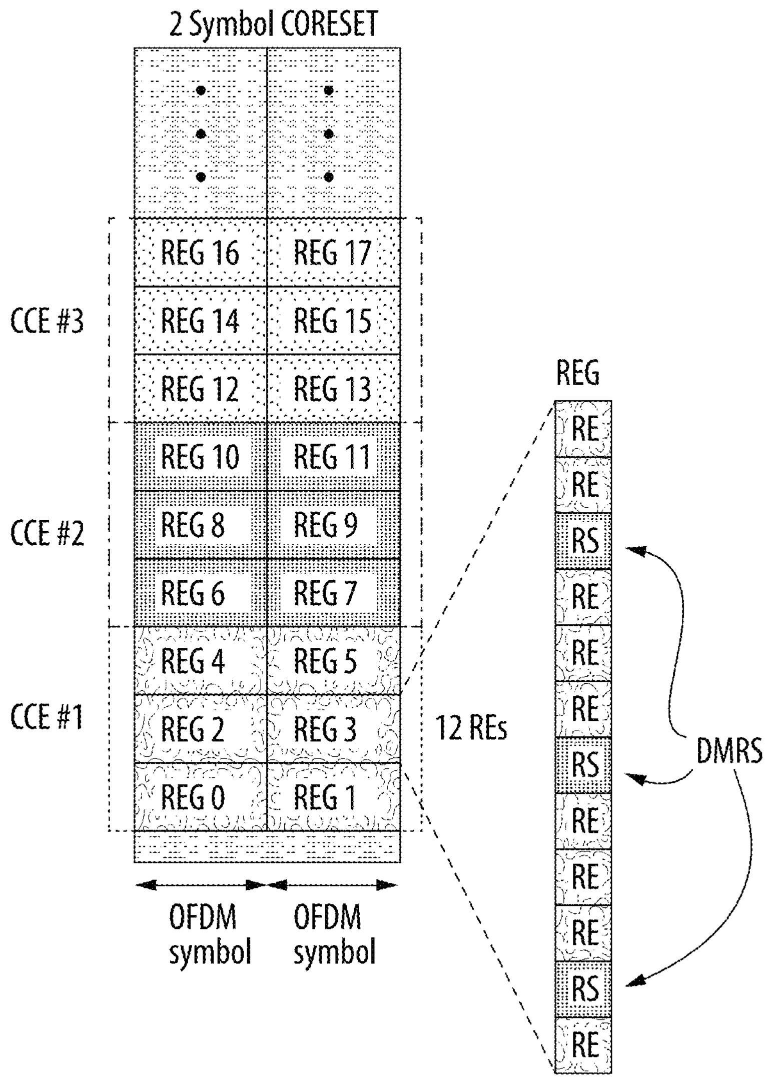
FIG. 3A shows an example of 2 symbol CORESET with CCEs and REGs.

The resource elements belonging to a CORESET may be organized into REGs. 6 REGs may be used to generate a CCE. Within each REG, 3 REs may be allocated to DMRSs. An example of a CORESET format of 2 symbols with CCE and REG allocation is shown in FIG. 3A.

Figure 3B:
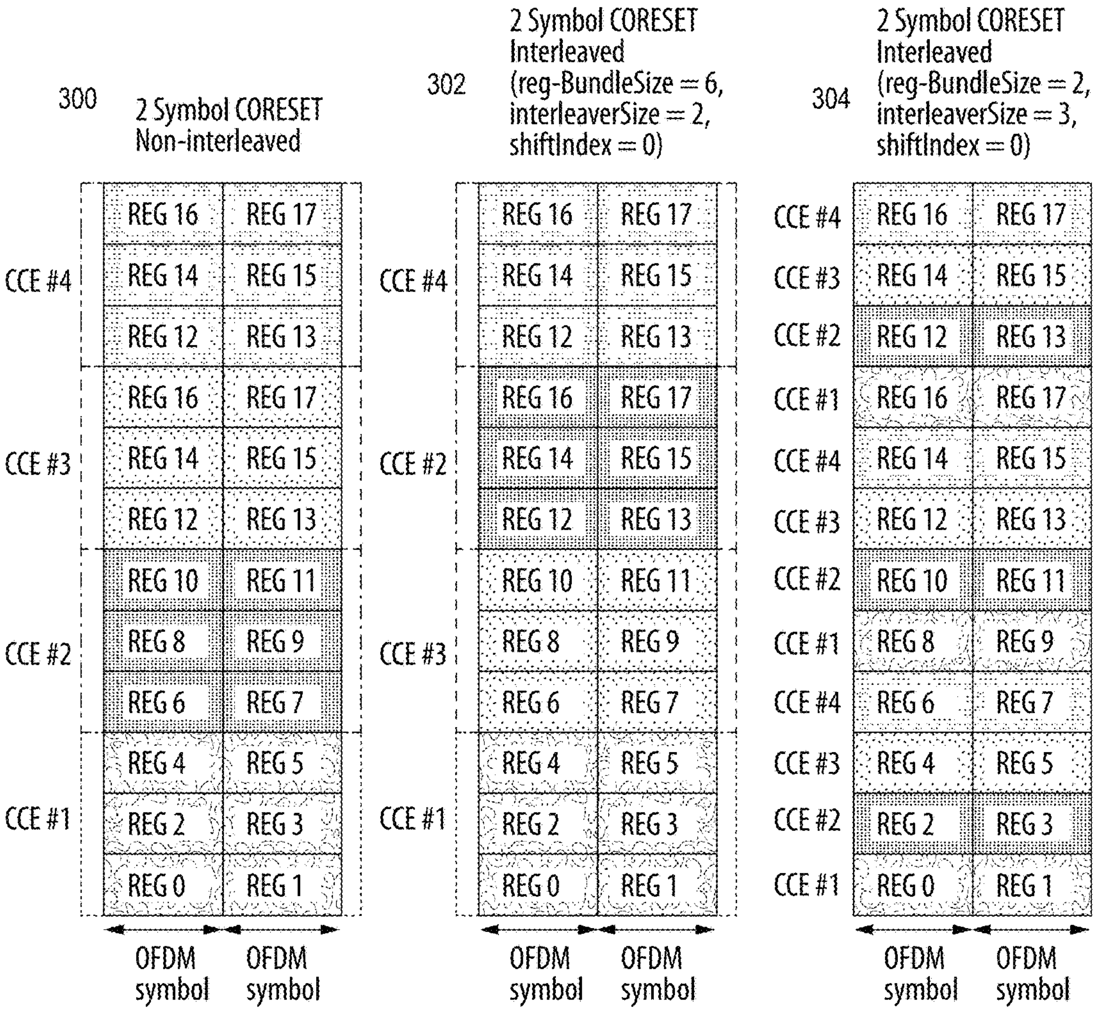
FIG. 3B shows examples of non-interleaving and interleaving REG-to-CCE mappings.

REGs within a CORESET may be numbered in increasing order in a time-first manner, starting with 0 for the first OFDM symbol and the lowest-numbered resource block in the CORESET. PDCCH may be mapped contiguously or non-contiguously in frequency to the CORESET resources, by means of interleaved mapping of REGs to a CCE, in addition to having one or more frequency-contiguous segments for the CORESET configuration itself. Both non-interleaved (localized) and interleaved (distributed) CCE-to-REG mappings may be possible. Each CORESET may be associated with one CCE-to-REG mapping. The interleaved or non-interleaved CCE-to-REG mapping for a CORESET may be configured by higher-layer signaling, with the interleaving being in units of REG bundles. Examples of non-interleaving and interleaving mapping are shown in FIG. 3B. In non-interleaving mapping 300, a CCE may be generated from bundles of 6 consecutively numbered REGs. The interleaved examples 302, 304 may provide frequency diversity because the allocated REGs of a CCE may be distributed across the CORESET. When using the interleaved mapping, REG bundles (specified by reg-BundleSize) may be generated from 2, 3, or 6 REGs. REG bundle sizes of 2 and 6 may be permitted for 1 or 2 symbols CORESET formats, and REG bundle sizes of 3 and 6 may be permitted with 3 symbols CORESET formats. CCE may be generated by grouping the REG bundles. An interleaver depth (specified by interleaverSize) may be configured to determine the number of sections that the CORESET bandwidth may be divided into when applying the interleaving. The shift index (specified by shiftIndex) information element may be used to apply cyclic shift to the interleaving pattern. The cyclic shift moves the CCE pattern upwards, with wraparound from the top to the bottom.

PDCCH and DMRS may be transmitted using a single antenna port (p=2000). The WTRU may use the DMRS to estimate the composite impact of both the precoding and the propagation channel. Depending on higher-layer configuration for each CORESET, the WTRU may assume the same precoding in the frequency domain being used within a REG bundle (e.g., when precoderGranularity equals sameAsREG-bundle), or across all REGs within the set of contiguous resource blocks (e.g., when precoderGranularity equals allContiguousRBs) in the CORESET.

In order to receive DCI, the WTRU needs to perform blind decoding as it may be not aware of the exact position of the PDCCH candidate used by the network. PDCCH candidates which need to be monitored by WTRUs may be configured using search space (SS) sets with each SS being associated with one CORESET. In NR, there may be two types of search spaces: 1) common search space (CSS) set, used to send DCI commonly monitored by a group of WTRUs, and 2) WTRU-specific search space, such as a user-specific search space (USS), used to send DCI monitored by a specific WTRU.

Figure 3C:
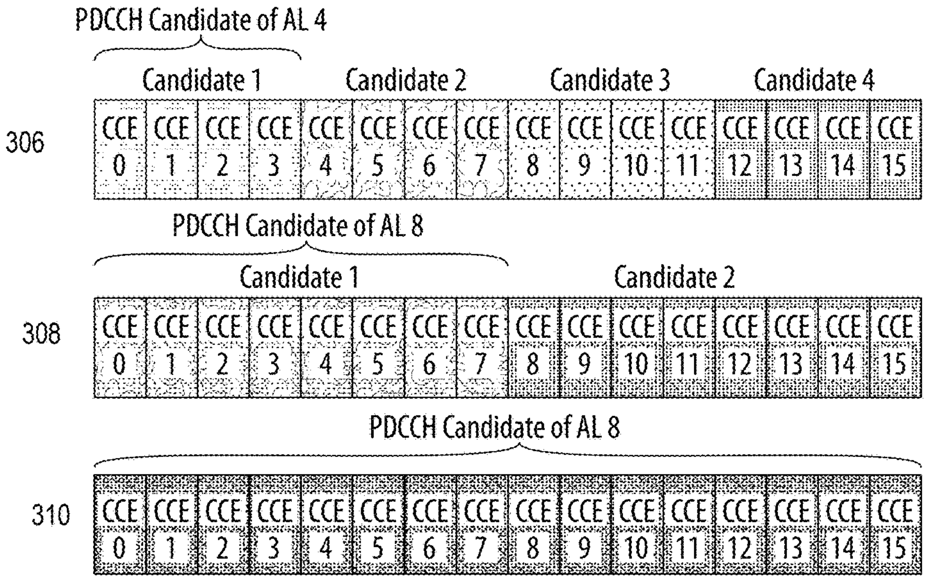
FIG. 3C shows an example of PDCCH candidates with aggregation levels (ALs) 4, 8, and 16 in a CORESET of 16 CCEs for a non-interleaved configuration.

A search space configuration indicates the WTRU time indices in terms of symbols/slots to monitor to receive its DCI. Each search space may be configured with supported aggregation levels, and number of candidates PDCCH transmissions for each supported aggregation level. An example of PDCCH candidates with ALs 4 (306), ALs 8 (308), and ALs 16 (310) in a CORESET composing of 16 CCEs (for non-interleaved configurations) is shown in FIG. 3C.

To decode DCI, a WTRU performs blind decoding as it does not have explicit information about DCI size, AL, and the PDCCH candidate. The number of blind decodes (BDs) may be a function of number of ALs, number of PDCCH candidates that need to be monitored for each AL, etc.

For a search space set s associated with CORESET p, the CCE indexes for aggregation level L corresponding to PDCCH candidate $$m^{(L)}_{s,n_{CI}}$$

of the search space set in slot $$n^{\mu}_{s,f}$$

for an active DL BWP of a serving cell corresponding to carrier indicator field value $n_{CI}$ are given by:

$$L \times \left\{\left(Y_{p,n^{\mu}_{s,f}} + \left\lfloor \frac{m^{(L)}_{s,n_{CI}} \times N_{CCE,p}}{L \times M^{(L)}_{s,max}} \right\rfloor + n_{CI}\right) \bmod \lfloor N_{CCE,p}/L \rfloor \right\} + i \qquad \text{Equation (A)}$$

For any common search space (CSS), $$Y_{p,n^{\mu}_{s,f}} = 0.$$

For a USS, $$Y_{p,n^{\mu}_{s,f}} = \left(A_p \times Y_{p,n^{\mu}_{s,f}-1}\right) \bmod D,$$

$Y_{p,-1} = n_{RNTI} \neq 0$, $A_p = 39827$ for p mod 3=0, $A_p = 39829$ for p mod 3=1, $A_p = 39839$ for p mod 3=2, and D=65537. i=0, . . . , L−1. $N_{CCE,p}$ may be the number of CCEs, numbered from 0 to $N_{CCE,p}-1$, in CORESET p. $n_{CI}$ may be the carrier indicator field value if the WTRU is configured with a carrier indicator field by CrossCarrierSchedulingConfig for the serving cell on which PDCCH is monitored; otherwise, including for any CSS, $$n_{CI} = 0 \cdot m^{(L)}_{s,n_{CI}} = 0, \ldots, M^{(L)}_{s,n_{CI}} - 1, \text{ where } M^{(L)}_{s,n_{CI}}$$

may be the number of PDCCH candidates the WTRU is configured to monitor for aggregation level L of a search space set s for a serving cell corresponding to $n_{CI}$. For any CSS, $$M^{(L)}_{s,max} = M^{(L)}_{s,0}.$$

For a USS, $$M^{(L)}_{s,max}$$

may be the maximum of $$M^{(L)}_{s,n_{CI}}$$

over all configured $n_{CI}$ values for a CCE aggregation level L of search space set s. The RNTI value used for $n_{RNTI}$ may be the C-RNTI.

To limit WTRU complexity and power consumption, there may be limits on the maximum number of PDCCH candidates per slot and per serving cell and the maximum CCE requiring channel estimations per slot and per serving cell. These restrictions may be defined as a function of the subcarrier spacing.

The WTRU may be assigned/configured with different RNTIs. These RNTIs may be used to scramble the CRC bits which may be attached to the DCI payload during physical layer processing. For example, SI-RNTI may be used/configured for DCIs containing information about system information (re–)acquisition, P-RNTI may be used for DCIs containing (e.g., scheduling) information about paging messages (e.g., reception), C-RNTI may be used for DCIs containing (e.g., scheduling) information for WTRU-specific DL and UL data transmissions, etc. The WTRU may use configured RNTIs to de-scramble the CRC bits of a DCI to determine if the DCI may be intended for the WTRU.

Figure 3D:
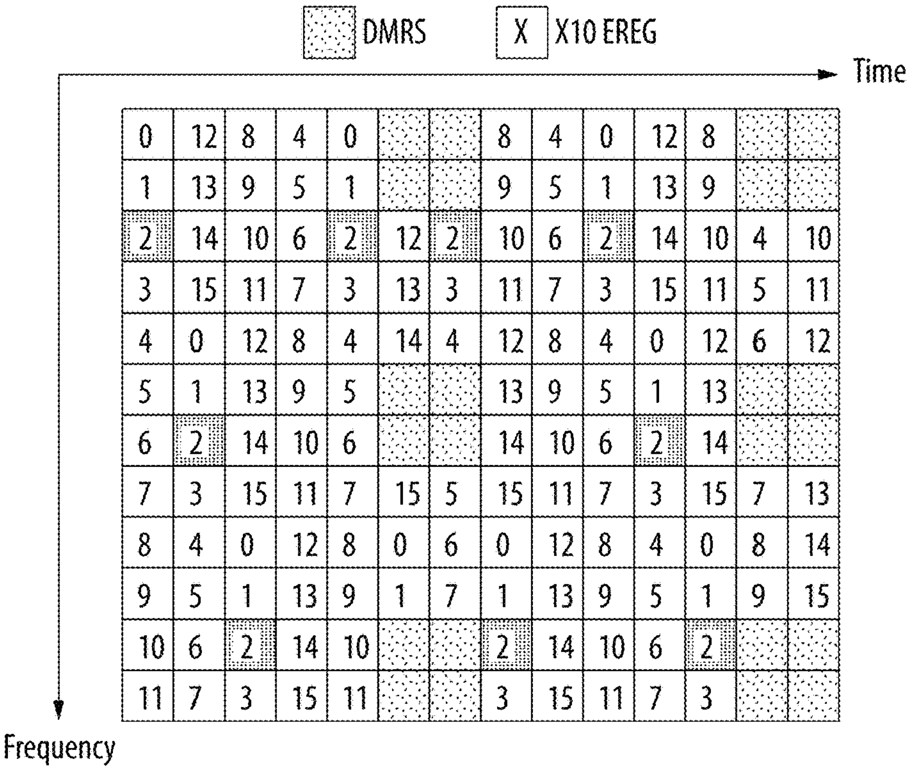
FIG. 3D shows an EREG to RE mapping for the case of the normal cyclic prefix length for a frequency-division duplex (FDD) system.

In 3GPP LTE Release 11, an enhanced physical downlink control channel (EPDCCH) design may be considered to improve the capacity of the control channel through utilization of frequency-selective channel diversity, beamforming, and spatial reuse transmission techniques. An EPDCCH may be transmitted using one or more enhanced CCEs (ECCEs) where an ECCE consists of four or eight enhanced REGs (EREGs). A PRB pair may carry 16 EREGs each consisting of nine REs. The 16 EREGs may be mapped sequentially to REs in frequency first followed by time manner within a PRB pair, ignoring REs allocated to DMRS. An EREG may be then formed as the REs corresponding to the index of this EREG as shown in FIG. 3D. This mapping allows the resources of an EREG to be spread evenly across the time and frequency resources of the PRB pair. The same or different sets of PRB pairs may be allocated to the EPDCCHs for different WTRU devices, so the network may flexibly allocate the total amount of EPDCCH resources based on the loading [9]. The PRB pair locations in the frequency domain for EPDCCH may be configured WTRU-specifically via RRC signaling. Since the EPDCCH resources occupy a subset of the PDSCH resources, the network may exploit the same CSI in scheduling an EPDCCH and choose favorable Sub-bands and favorable precoders to achieve the frequency-selective and beamforming gains.

Generally, EPDCCH multiplexing may be based on a form of either frequency or spatial domain multiplexing. Further, EPDCCH has to span the total time duration of a subframe. Frequency-selective channel diversity may be achieved in EPDCCH either through channel state aware selection of PRB pairs via a localized transmission or through distributed transmission of the EREGs constituting the ECCEs of an EPDCCH.

In NR uplink control channel, both CP-OFDM and DFT-s-OFDM waveforms may be used. CP-OFDM may be considered for downlink (DL) transmissions whereas both waveforms may be considered for uplink (UL) transmissions to provide the flexibility for the WTRU to improve its coverage in limited coverage scenarios.

DFT-s-OFDM waveform may be generated in NR by enabling Transform Precoding (e.g., DFT based precoding) of a set of data and/or reference symbols x(n), $$n \in \{0, 1, \ldots, M_{sc}^{pc} - 1\},$$

for each OFDM symbol, to generate a set of complex-valued symbols y(m), $$m \in \{0, 1, \ldots, M_{sc}^{pc} - 1\}$$

which may be then transmitted using the CP-OFDM waveform, where $$M_{sc}^{pc}$$

represents the number of subcarriers allocated for the transmission of the set of data and/or reference symbols in a given OFDM symbol for the physical channel specified by pc. The transform precoding operation may be defined as:

$$y(m) = \frac{1}{\sqrt{M_{sc}^{pc}}} \sum_{n=0}^{M_{sc}^{pc}-1} x(n) e^{-j\frac{2\pi mn}{M_{sc}^{pc}}} \quad \text{Equation (B)}$$

$$\text{and } M_{sc}^{pc} = M_{RB}^{pc} M_{sc}^{RB}$$

may be defined in terms of the number of resource blocks (RBs)

$$M_{RB}^{pc}$$

and number of subcarriers per RB $$M_{sc}^{RB}$$

where the number of RBs allocated for any uplink transmission using transform precoding shall fulfill the following constraint:

$$M_{RB}^{pc} = 2^{\alpha_2} \cdot 3^{\alpha_3} \cdot 5^{\alpha_5} \quad \text{Equation (C)}$$

and $\alpha_2$, $\alpha_3$, $\alpha_5$ is a set of non-negative integers.

In NR, uplink control information (UCI) may be carried over a physical uplink control channel (PUCCH) which may use any of CP-OFDM and DFT-s-OFDM waveforms based on the UCI format. For example, UCI formats 0 and 1 may be carded over PUCCHs considering the CP-OFDM waveform and may have a payload size of 1 or 2 bits, whereas UCI formats 3 and 4 may be carried over PUCCHs considering the DFT-s-OFDM waveform and may have a payload size of more than 2 bits. UCI format 2 may be carried over CP-OFDM waveform and may have a payload size of more than 2 bits.

UCI types reported in a PUCCH may include HARQ-ACK information, scheduling request (SR), and channel state information (CSI). A WTRU may transmit one or two PUCCHs on a serving cell in different symbols within a slot. A WTRU may have dedicated PUCCH resource configuration, provided by PUCCH-ResourceSet in PUCCH-Config, or common PUCCH resource configuration provided through an index to a table of pre-configured resource sets by pucch-ResourceCommon. PUCCH format 3 and 4 may be transmitted over one or more PUCCH resources provided to the WTRU by higher layers via dedicated PUCCH resource configuration. A PUCCH resource may include any combination of the following parameters. A PUCCH resource may include a PUCCH resource index provided by pucch-ResourceId. A PUCCH resource may include an index of the first PRB prior to frequency hopping or for no frequency hopping by starting PRB (e.g., if a WTRU is not provided useInterlace PUCCH-PUSCH in BWP-UplinkDedicated). A PUCCH resource may include an index of the first PRB after frequency hopping by secondHopPRB (e.g., if a WTRU is not provided useInterlacePUCCH-PUSCH in BWP-UplinkDedicated). A PUCCH resource may include an indication for intra-slot frequency hopping by intraSlotFrequencyHopping (e.g., if a WTRU is not provided useInterlacePUCCH-PUSCH in BWP-UplinkDedicated). A PUCCH resource may include an index of a first interlace by interlace0 (e.g., if a WTRU is provided useInterlacePUCCH-PUSCH in BWP-UplinkDedicated). A PUCCH resource may include an index of a second interlace by interlace1 (e.g., if a WTRU is provided useInterlace-PUCCH-PUSCH in BWP-UplinkDedicated). A PUCCH resource may include an index of an RB set by rb-SetIndex (e.g., if a WTRU is provided useInterlacePUCCH-PUSCH in BWP-UplinkDedicated). A PUCCH resource may include a configuration for a PUCCH format provided by format.

For PUCCH format 3, the PUCCH resource also includes a number of PRBs provided by nrofPRBs, a number of symbols for a PUCCH transmission provided by nrofSymbols, and a first symbol for the PUCCH transmission provided by startingSymbolIndex. If a WTRU is provided by useInterlacePUCCH-PUSCH in BWP-UplinkDedicated and PUCCH-ResourceExt is provided, the PUCCH resource also includes an index of a second interlace by interlace1, if provided; otherwise, if interlace1 is not provided, the PUCCH resource also includes, if provided, an orthogonal cover code length by occ-Length and an orthogonal cover code index by occ-Index.

For PUCCH format 4, the PUCCH resource also includes a number of symbols for a PUCCH transmission provided by nrofSymbols, an orthogonal cover code length by occ-Length, an orthogonal cover code index by occ-Index, and a first symbol for the PUCCH transmission provided by startingSymbolIndex. For PUCCH transmission in FR2-2, the PUCCH resource may also include a number of PRBs $$M_{RB}^{PUCCH,4}$$

provided by nrofPRBs; otherwise, $$M_{RB}^{PUCCH,4} = 1.$$

Given the PUCCH resource configuration, PUCCH format 3 and format 4 have long transmission duration that may span 4 to 14 OFDM symbols. PUCCH format 3 may support the transmission of the maximum PUCCH payload size of 1706 bits and may be configured by 1 to 16 RBs or 20 RBs if a WTRU is provided by useInterlacePUCCH-PUSCH and two interlaces may be configured. PUCCH format 4 may be configured with multiple RBs only in FR2-2, otherwise only a single RB may be configured. Block-wise spreading using a spreading factor $\in\{1, 2, 4\}$, determined by the higher layer parameter occ-Length, shall be applied for PUCCH format 3 if interlaced mapping is configured and only a single interlace is configured. Block-wise spreading using a spreading factor $\in\{2, 4\}$, determined by the higher layer parameter occ-Length, shall always be applied for PUCCH format 4.

Figure 3E:
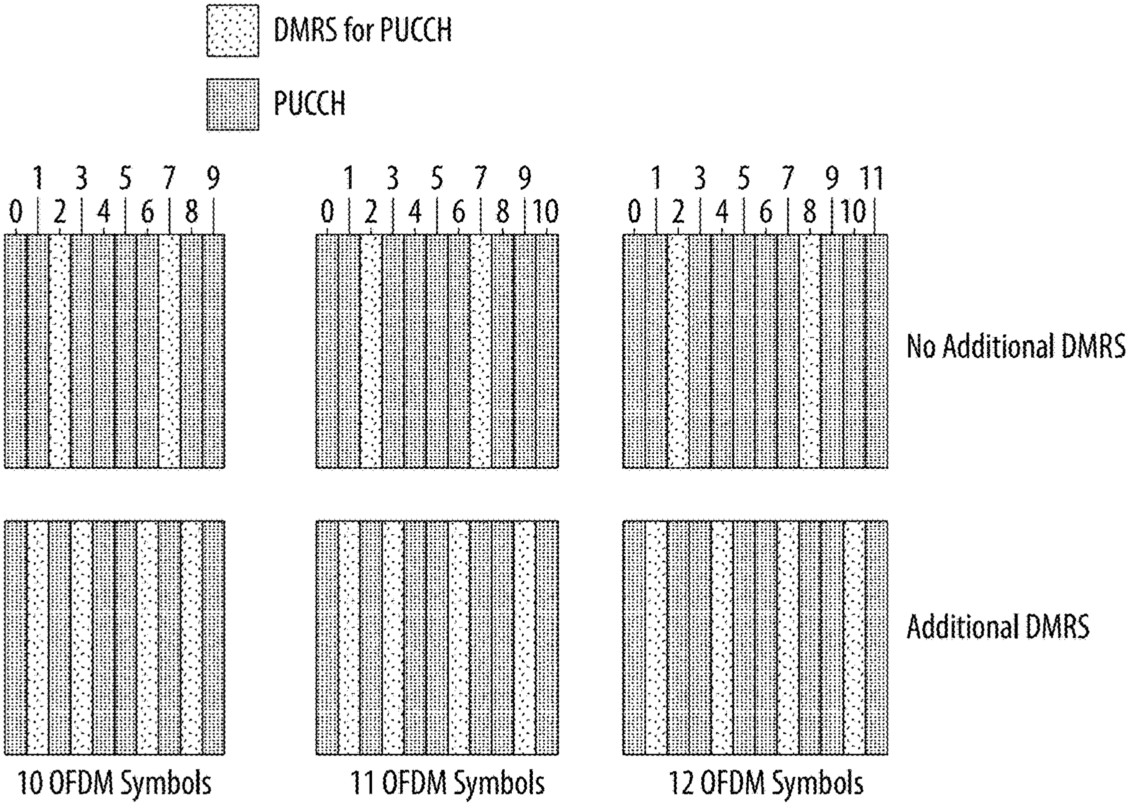
FIG. 3E shows examples of symbols allocated to the DMRS for PUCCH format 3 and 4 for the allocated symbols $\in\{10, 11, 12\}$.
Figure 3F:
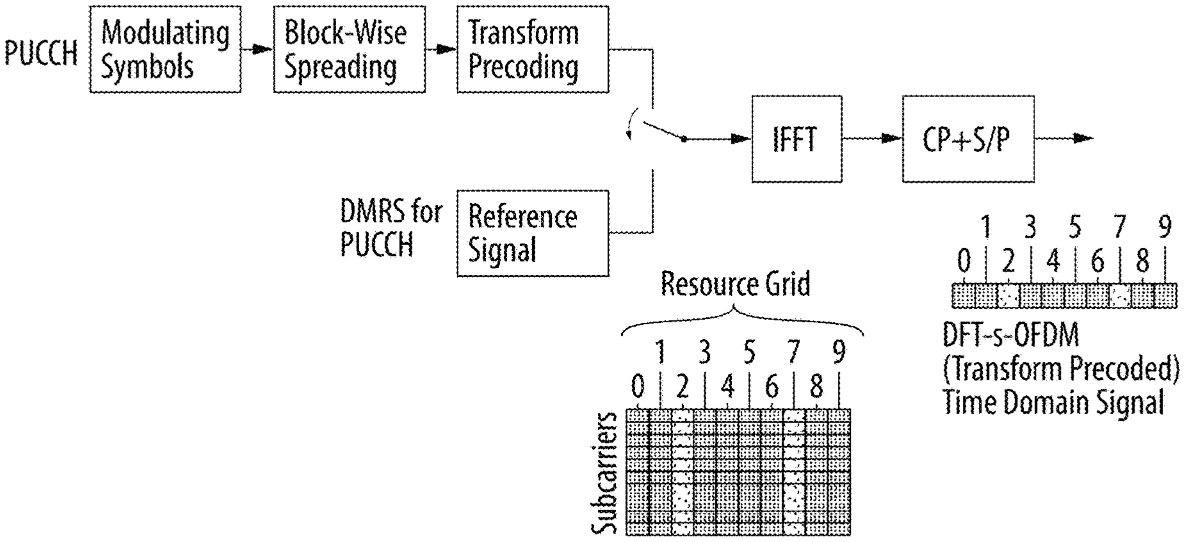
FIG. 3F shows an example of an architecture for the generation of PUCCH format 3 and 4.

Both PUCCH format 3 and format 4 carry UCI symbols and demodulation reference signal (DMRS), to assist in the demodulation of the UCI symbols, and may be transmitted on antenna port p=2000. DMRS may be allocated dedicated OFDM symbols and DMRS mapping/positions for PUCCH format 3 and 4 is shown in FIG. 4 for the case with and without intra-slot frequency hopping and with and without additional DM-RS. An example allocation of resources for PUCCH and DMRS for PUCCH is shown in FIG. 3E for PUCCH format 3 and 4 with a number of allocated OFDM symbols $\in\{10, 11, 12\}$. For additional improvement of coverage and reliability, both PUCCH format 3 and format 4 may support repetitions of orders {2, 4, 8} across slots. An illustrative architecture for the generation of PUCCH Format 3 or 4 is shown in FIG. 3F.

A power amplifier (PA) is generally considered the most power consuming unit at the transmitter. Therefore, PA efficiency may be an important metric which is illustrated in FIG. 3G as power added efficiency (PAE) versus operating frequency for PAs made using Silicon transistors (e.g., SiGe) and semiconductor transistors (GaAs and GaN) [4]. It may be shown that the efficiency is dependent on the operating frequency and that there may be a downward trend in efficiency as function of operating frequency, i.e., the higher the frequency, the lower the PA efficiency. The PAE may be defined as:

$$PAE = \frac{P_{out} - P_{in}}{P_{dc}} \qquad \text{Equation (D)}$$

where $P_{out}$ represents the output power delivered by the amplifier, $P_{in}$ represents the input power that may be handled by the amplifier (the maximum input power that may be handled by a PA may be determined by the PA's saturated output power), and $P_{dc}$ represents the DC power supplied to the amplifier. The PA output power may be much higher than the input power, i.e., very high PA gain, PAE may simply be reduced to power efficiency (PE) defined as:

$$PE = \frac{P_{out}}{P_{dc}} \qquad \text{Equation (E)}$$

Figure 3H:
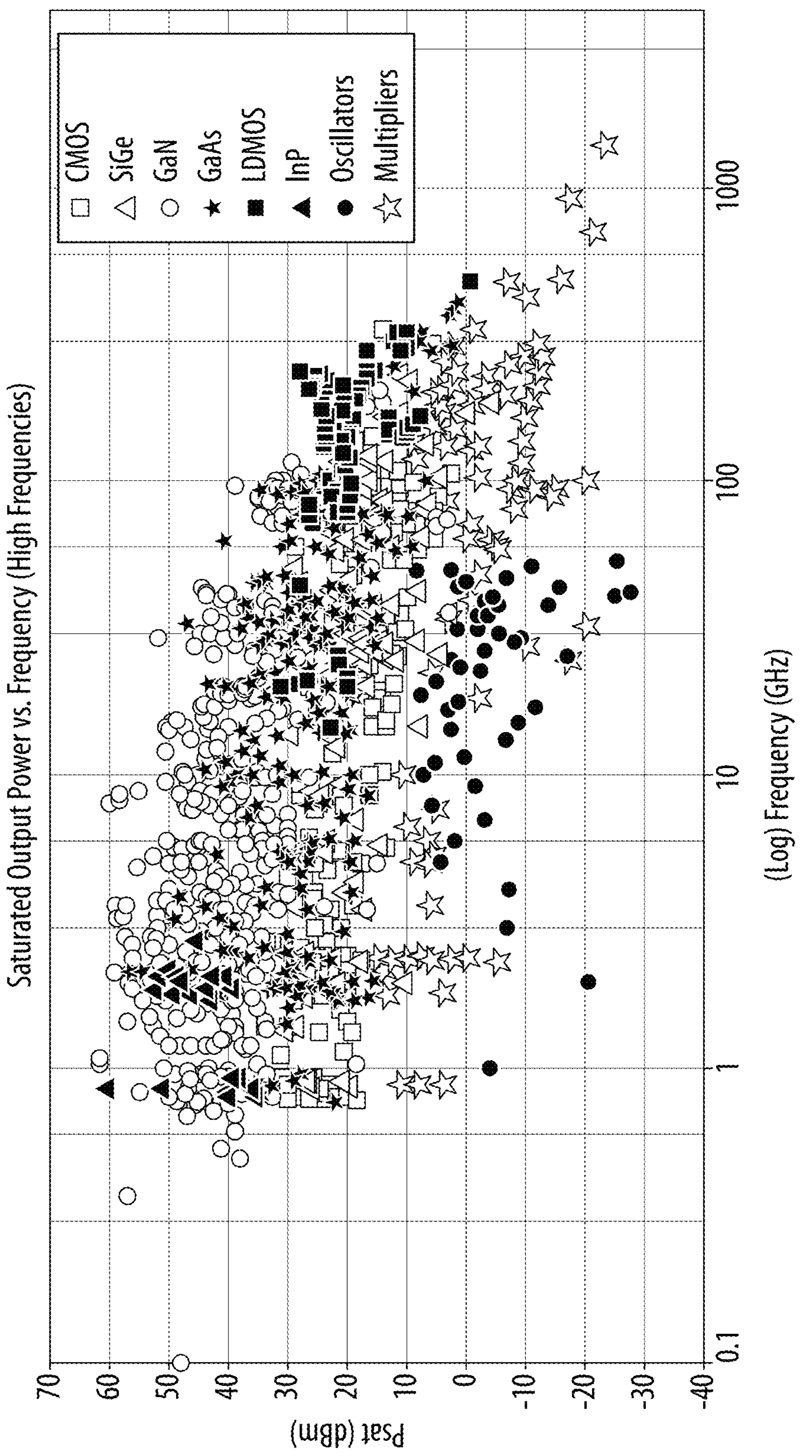
FIG. 3H shows an example of saturated output power versus frequency.

Form Equations (D) and (E) above, to maximize the average PA efficiency, the PA should be driven at the maximum output power, i.e., saturated power $P_{sat}$. However, this may be dependent on the characteristic of the driving input signal where signals of (near) constant envelope would be preferred. For signals that do not exhibit constant envelope characteristics, the PA operating point (e.g., the input signal's average power) should be backed-off, or (e.g., for a target average output power) the PA should be selected to have a saturated power ($P_{sat}$) that may be higher than the input signal's average power, by a value that may be relative to input signal's PAPR. However, in FIG. 3H, which shows the PA's saturated power as a function of frequency for different technologies, there may be an inverse relationship between $P_{sat}$ and operating frequency, i.e., increasing operating frequency results in a decrease in the PA's supported saturated power. Hence, operating at higher frequency bands corresponds to a decrease in the PA's saturated power and, subsequently, a reduction in the PA's average output power which may be further aggravated by the input signal's PAPR.

PAPR may be defined for discrete (e.g., OFDM) signals as the ratio of maximum instantaneous (e.g., peak) power of a time-domain sequence s(n) and its average power as follows:

$$PAPR = \frac{\max\{|s(n)|^2\}}{\mathbb{E}\{|s(n)|^2\}} \qquad \text{Equation (F)}$$

where $\mathbb{E}\{\cdot\}$ denotes the expectation or mean of the signal sequence. As discussed above, PAPR of a signal waveform may be an important metric for which a smaller value implies a more efficient operation of the power amplifier used to transmit the signal. Signals that exhibit PAPR of 0 dB may be optimal in that sense which may be a characteristic of constant-envelope signals. Further, this metric may be particularly important at high frequency bands where the power amplifier efficiency and saturated power may be critical as discussed.

DFT-s-OFDM may be a single-carrier waveform adopted by 3GPP for the uplink of 4G LTE and 5G NR wireless cellular standards. Due to its single-carrier nature, DFT-s-OFDM may be characterized by a reduced peak-to-average power ratio (PAPR) compared to multicarrier waveforms such as CP-OFDM, which may be adopted for the downlink of 4G LTE and 5G NR wireless cellular standards. DFT-s-OFDM still maintains the benefits of CP-OFDM such as simple frequency-domain equalization and simple inter-symbol interference (ISI) mitigation. Adopting DFT-s-OFDM waveform for the downlink of beyond 5G NR at high frequencies may increase the complexity of the WTRU but may be necessary to address the challenges associated with coverage and energy/power efficiency at those frequency bands. Furthermore, at high frequencies where the BS coverage may be expected to be limited, and therefore high density of BS deployment may be expected, the design complexity and cost requirements of BSs and WTRUs may be comparable.

The efficiency of a power amplifier (PA) and the saturated power at the output of the PA may be considered. The PA is, again, considered one of the most power consuming units at the transmitter and there is a high dependency of PA efficiency (e.g., power added efficiency (PAE) or power efficiency (PE)) and PA saturated power ($P_{sat}$) on the operating frequency. Because there may be a downward trend, i.e., inverse relationship, between PAE/PE/$P_{sat}$ and the operating frequency, operating at higher frequency bands will likely result in lower PA efficiency and lower saturated power at the output of the PA. This problem may be further aggravated for input signals exhibiting non-constant envelope characteristics, i.e., input signal with high peak to PAPR, due to the need for the PA to back-off from operating at the optimal point with highest efficiency at the maximum output power, i.e., PA saturated power.

DFT-s-OFDM is a waveform adopted by 3GPP for the uplink of 4G LTE and 5G NR due to its single-carrier nature, which may be characterized by a reduced PAPR compared to CP-OFDM while maintaining its benefits of simple frequency-domain equalization and simple inter-symbol interference (ISI) mitigation. Adopting DFT-s-OFDM waveform for the downlink of beyond 5G NR with operation in frequency ranges higher than that of the current 5G NR frequency ranges may be necessary to address potential challenges associated with coverage and energy/power efficiency at those frequency bands.

DFT-s-OFDM (e.g., transform precoding) may result in a single-carrier waveform characteristics, i.e., in the time domain, only if subcarriers may be mapped to contiguous frequency positions, which limits the flexibility of DFT-s-OFDM to multiplex control and data information in the frequency domain. For this reason, control and data channels in 5G NR may not be multiplexed in frequency but allocated different DFT-s-OFDM symbols so that the single-carrier nature may be preserved. This may be also applicable to some 5G NR Reference Signals (RSs), like DMRS, which does not allow multiplexing of data information in the same symbol.

CP-OFDM based downlink control channel design has been used for 4G LTE and 5G NR systems and has provided mechanisms for delivery of control using a multitude of features, namely aggregation level, interleaving, time-frequency diversity exploitation, simultaneous transmission of DMRS and control over same T-F resources at the resolution of PRB and OFDM symbol etc. The shift to higher frequencies has spurred the data and control transmission research towards single carrier waveforms.

A DFT-s-OFDM waveform-based downlink control channel may have a similar benefit as a single-carrier waveform, for example, in terms of PA efficiency, and the flexibility provided by the CP-OFDM based-downlink control channel in terms of frequency diversity, coverage, blocking probability, precoding, etc. In this regard, KPI requirements projected for "beyond 5G NR" (e.g., in terms of spectrum efficiency, network energy efficiency, and device power consumption) may also be considered.

For the purpose of the embodiments discussed herein, the following acronyms may be defined as follows. DFT pre-coded DL control channel design, DFT-s-OFDM based DL control channel design, DFT-s-OFDM waveform based DL control channel design, and DFT spread DL control channel design may be used interchangeably herein. DFT precoding, transform precoding may be used interchangeably herein. DFT, DFT module, and DFT precoder may be used interchangeably herein. gNB, eNB, network, and BS may be used interchangeably herein. PRB and RB may be used interchangeably. Modulated symbol and modulated data symbol may be used interchangeably herein. Symbol and OFDM symbol may be used interchangeably herein.

To maintain the single carrier nature of DFT-s-OFDM signals with reduced PAPR characteristics compared to CP-OFDM, frequency-domain multiplexing of multiple signals is preferably avoided or, at least, minimized. Therefore, in the DFT pre-coded DL control channel design, it may be desired to transmit Demodulation Reference Signals (DMRSs) using resource elements on dedicated OFDM symbols. For example, REs containing the DMRS of a PDCCH may be present in OFDM symbols that may be different than the OFDM symbol containing the associated DL control information (DCI). Further, a multi-symbol (e.g., more than 1 OFDM symbol) CORESET format may contain one or more symbols dedicated for DMRS transmission. For a CORESET, different types of DMRS mapping may be configured where the locations of the OFDM symbols containing the DMRS symbols may be different (e.g., for the same number of allocated OFDM symbols for PDCCH and DMRS). Further, one or more DMRS symbols may be allocated in the front before the symbols containing the control data (e.g., front loaded DMRS symbols) to facilitate the early start of the channel estimation.

Figure 5A:
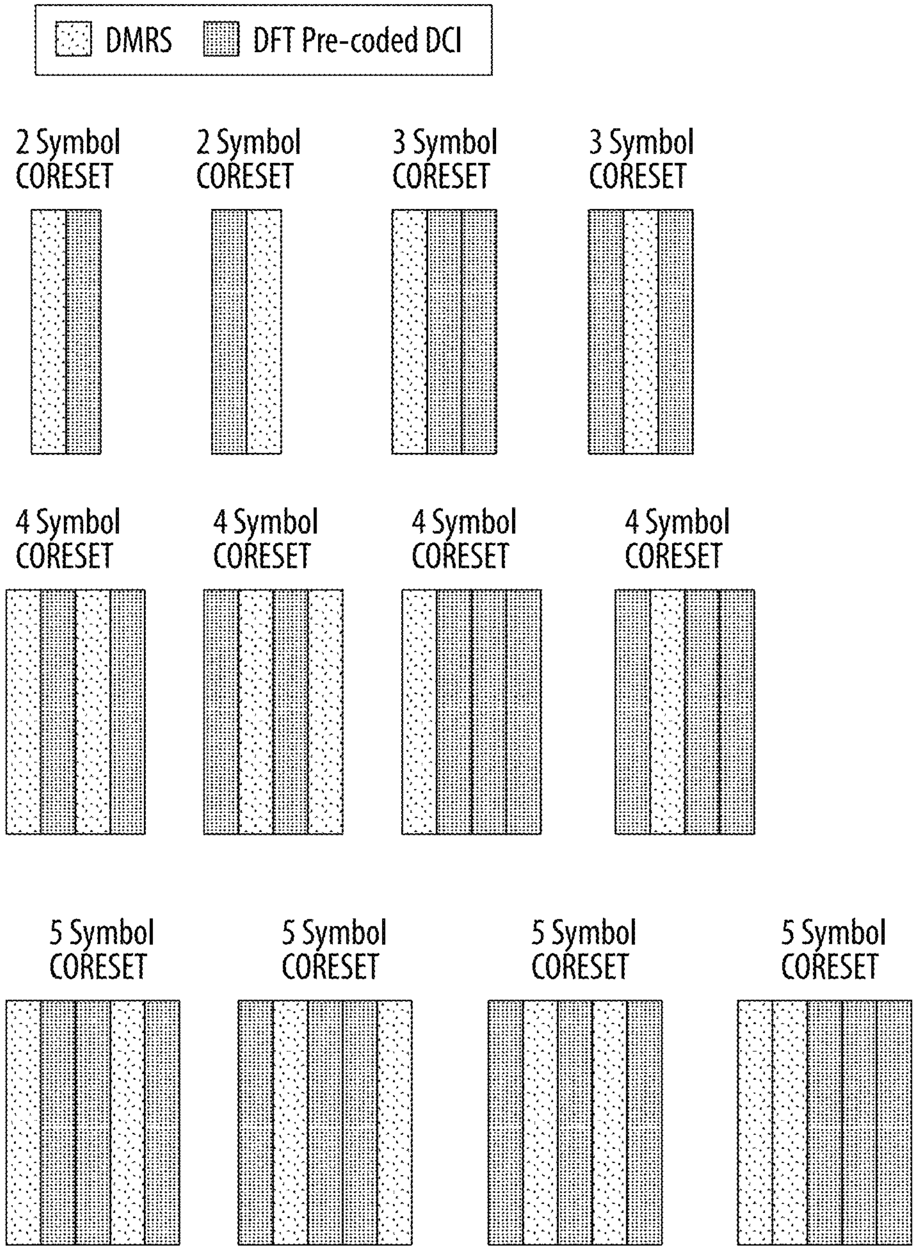
FIG. 5A shows examples of CORESETs with dedicated DMRS symbols.

Some examples of DMRS mapping with associated DFT pre-coded DCI on different OFDM symbols are given in FIG. 5A. For, common search spaces, any of the patterns/examples shown in FIG. 5B may be used. Variants thereof may be repeated one or more times over a consecutive duration of one or more OFDM symbols, slots, or subframes. Each of the pattern/example instances may be associated with a different set of transmit beams/directions, wherein a set constitutes one or more beams/directions. Further the pattern/example instances may be separated by one or more OFDM symbols, e.g., to allow time for beam switching. This approach may also be applicable to overlapping dedicated search spaces for one or more WTRUs/Devices.

Figure 5B:
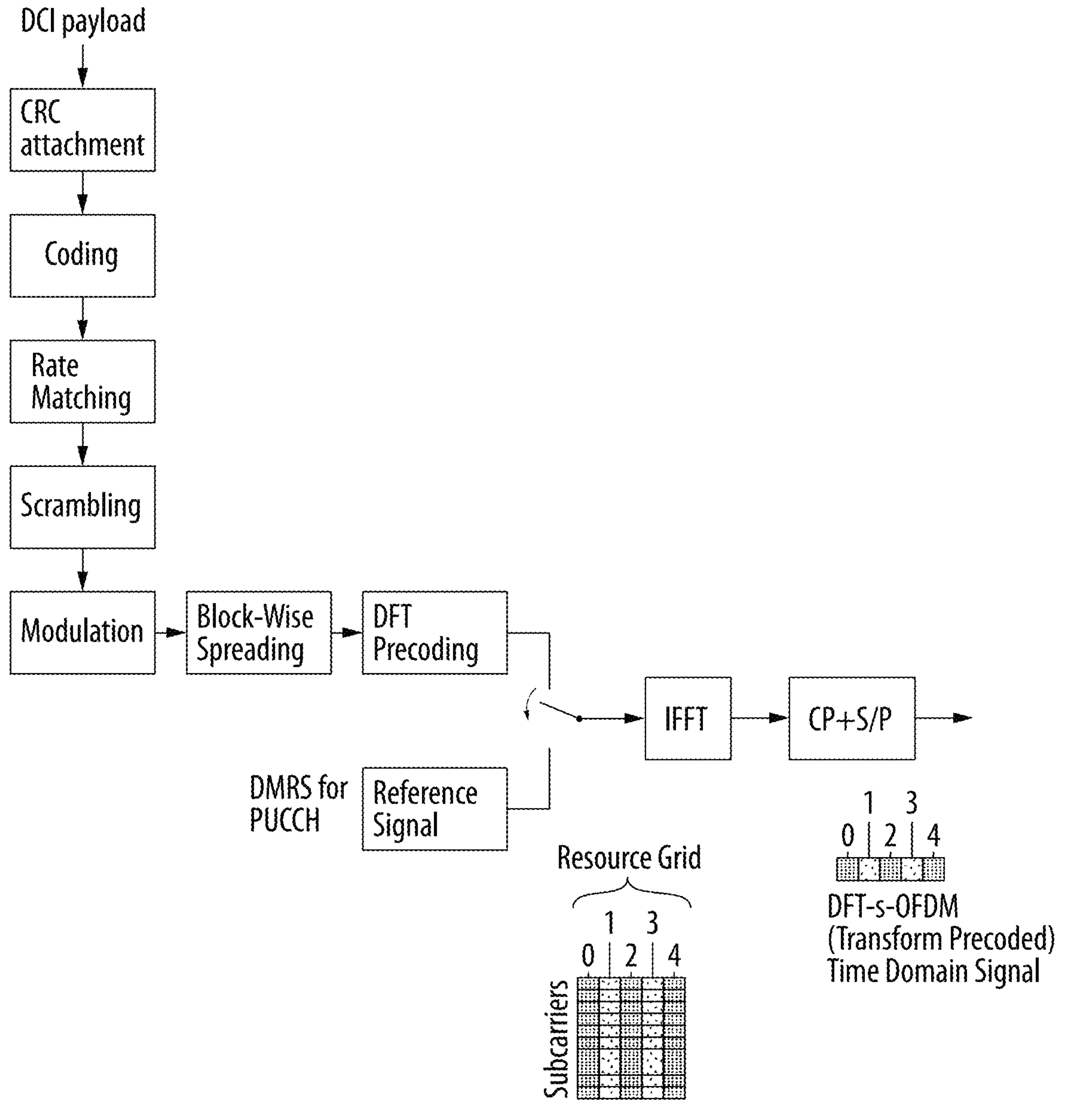
FIG. 5B shows an example of physical layer processing for the DFT pre-coded PDCCH with dedicated DMRS symbols.

An illustrative architecture for the generation of DFT pre-coded PDCCH with dedicated DMRS symbols is shown in FIG. 5B. In this architecture, the WTRU alternates between PDCCH and DMRS for PDCCH transmission over consecutive DFT-s-OFDM symbols based on the CORESET configuration. The example shown is for a 5-symbol CORESET and 2 DFT-s-OFDM symbols dedicated to DMRS.

For a CORESET configuration, the WTRU may be configured with DMRS configuration containing one or more parameters. For example, time-domain allocation parameters which may be used to derive the locations of the DMRS OFDM symbols within the CORESET. A CORESET may include one or more OFDM symbols containing DMRSs. One or more allocation mappings may be configured considering the number of OFDM symbols and/or respective locations of DMRS symbols in the CORESET. The DM-RS configuration for a CORESET may vary with number of symbols allocated for the PDCCH. The configuration parameters may include for example, symbol indices of the symbols containing the DMRSs where a symbol index may be with respect to the starting symbol of the slot containing the associated CORESET or with respect to the starting symbol of the associated CORESET within the slot.

Alternatively, symbol index of the first symbol containing the DMRS with number of additional positions (e.g., OFDM symbols) where the location of the additional symbols with respect to the first symbol may be pre-configured to the WTRU. Length in terms of number of consecutive symbols (e.g., 2/3/etc. symbols) containing the DMRSs may be configured.

Another parameter for a CORESET configuration may include frequency-domain allocation parameters which may be used to derive the locations of the DMRS REs in the frequency domain on the configured OFDM symbols containing the DMRSs. One or more allocation mappings may be configured based on the number of REs/PRBs (e.g., density) and their locations in the allocated bandwidth (e.g., PRBs) of the CORESET. The configuration parameters may include for example, RE indices, PRB indices in one or more OFDM symbols containing the DMRSs. The same or different frequency domain mappings may be configured for different OFDM symbols within a CORESET. All of the REs of each PRB associated with the allocated bandwidth of the CORESET may be used for DMRS mapping. A subset of REs of each PRB associated with the allocated bandwidth of the CORESET may be used for DMRS mapping. In such case, other REs which may not be used for DMRSs may be used for other purpose (e.g., data or control information). In one example, RE indices containing the DMRSs may be given in the configuration. Alternatively, different configuration mappings may be pre-configured with different fixed set of REs in each PRB allocated for DMRSs for a given CORESET configuration. For example, configuration type 1 may be with 6 REs using every other RE in each PRB allocated to the CORESET; configuration type 2 may be with 4 REs (e.g., RE 0, RE 1, RE 5, RE 9 or RE 0, RE 3, RE 6, RE 9) in each PRB allocated to the CORESET; configuration type 3 may be with all REs in each PRB allocated to the CORESET. Other configuration with different number of REs and locations may be configured. A subset of PRBs within the bandwidth of CORESET may be configured for DM-RS. In such case, PRB indices may be given in the configuration. In case of multiple symbols allocated for DM-RS, same frequency domain mapping pattern may be configured for all the symbols. Different types of frequency domain mapping patterns may be configured over different symbols. In this case the DM-RS configuration may include the frequency domain mapping configuration applied to each DM-RS symbol.

A further parameter for a CORESET configuration may include DMRS sequence design parameters including any of a sequence type, an initializing seed, a cyclic shift, a base sequence number, etc. Some of the parameters may be explicitly signaled or implicitly determined based on any of an OFDM symbol number, a slot number, number of allocated frequency resources, a configured spreading sequence for the PDCCH, etc.

Other parameters for a CORESET configuration may include modulation type, a spreading factor and a corresponding orthogonal sequence index, precoding configuration, number of DFT modules per CORESET, etc.

Figure 5C:
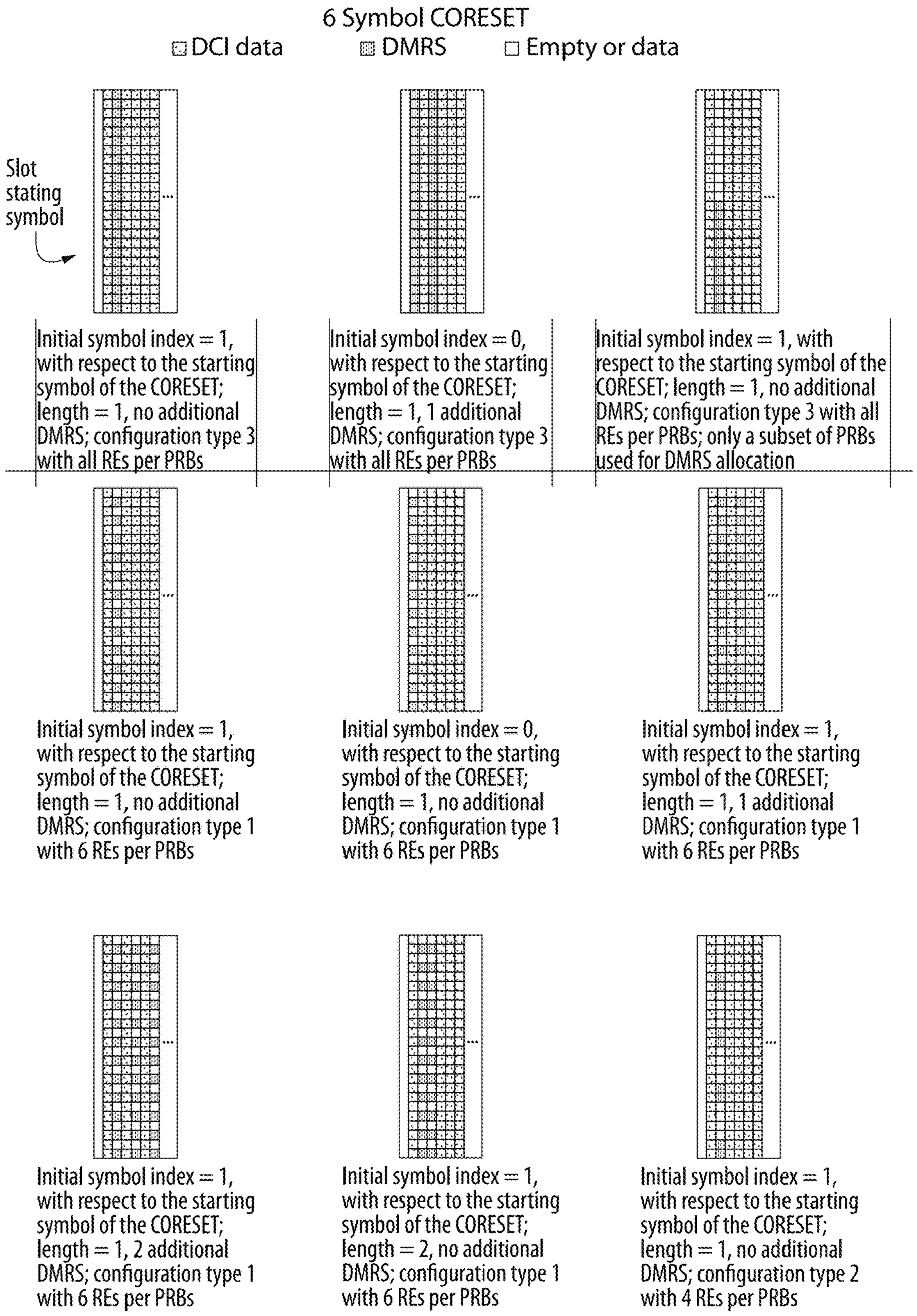
FIG. 5C shows examples for DMRS mappings in a 6-symbol CORESET with different starting symbol, length in terms of number of consecutive DMRS symbols, number of additional DMRS symbols, and frequency domain allocation configurations.

A few illustrative examples for DMRS mappings in a 6-symbol CORESET with different starting symbol, length in terms of number of consecutive DMRS symbols, number of additional DMRS symbols, and frequency domain allocation configurations are shown in FIG. 5C. The DMRS configuration may be given to the WTRU within the CORESET configuration (e.g., part of ControlResourceSet or/and ControlResourceSetzero) using higher layer signaling, e.g., RRC or system information (e.g., MIB, SIB 1).

The CCE Size may impact DMRS mapping on dedicated OFDM symbols. The time-frequency resources of a CORESET may be organized into one or more CCEs containing the DCI/DCIs. In NR, with OFDM based DL control channel design, a CCE may consist of 6 REGs (e.g., one REG may be equivalent to 12 REs, e.g., total 72 REs for a CCEs) where in each REG, 3 REs may be allocated DMRSs, leaving 54 REs for DCI data. Regarding DFT-s-OFDM based DL control channel design with DMRS allocated on dedicated OFDM symbols, one or more of the following may be used for number of REs/PRBs allocated to a CCE. A new term/definition may be used to replace CCE to differentiate it with the 3GPP Release 15 CCE containing DMRSs in the frequency domain. The same term CCE may be used herein, but other terms may also be used. The desired number of modulated symbols carried by a DFT-s-OFDM based CCE may be different than the number of modulated symbols carried by the existing OFDM based CCE. Based on these potential differences, it may be appropriate to maintain the number of REs, and corresponding number of modulated symbols, per CCE (e.g., a CCE consists of 54 REs). Further, it may be applicable to reduce the number of REs, and corresponding number of modulated symbols, per CCE (e.g., a CCE consists of 48 REs, equivalent to 4 RBs). Also, it may be possible to increase in the number of REs, and corresponding number of modulated symbols, per CCE (e.g., a CCE consists of 60 REs, equivalent to 5 RBs).

The embodiments above for the determination of the number of REs per CCE may be dependent on multiple factors as discussed below including any constraint on the number of modulated symbols that should be conveyed via PDCCH, the reliability of PDCCH, and PDCCH multiplexing capability within any CORESET.

In the first option to maintain the number of REs, and corresponding number of modulated symbols, per CCE, a fractional number of RBs, e.g., equivalent to 4.5 RBs, may be required for a single CCE. Therefore, CCE multiplexing may be considered as part of the determination of the number of REs. For example, multiple CCEs (e.g., 2 aggregated/multiplexed CCEs) may occupy a number of frequency resources and OFDM symbols (e.g., 108 REs) that may be equivalent to an integer number of RBs (e.g., 9 RBs), which corresponds to an effective fractional (e.g., 9/2=4.5 RBs) number of RBs per CCE. The actual number of RBs may be dependent on the pattern of allocated symbols to PDCCH and the number of multiplexed CCEs. For example, an allocation of 3 RBs and 4 OFDM symbols (e.g., including one OFDM symbol dedicated to DMRS for PDCCH) may be considered to multiplex 2 CCEs.

The second option to reduce the number of REs, and corresponding number of modulated symbols, per CCE, such may correspond to a lower PDCCH capacity, i.e., reduction in the number of unique information bits that may be conveyed over the PDCCH, or a lower reliability, e.g., by considering a higher code rate or availability of less resources for rate matching. The exact impact on the PDCCH capacity and/or reliability may be dependent on the level of reduction in the allocated REs and the impact may be mitigated through other techniques such as CCE aggregation.

The third option to increase in the number of REs, and corresponding number of modulated symbols, per CCE, such may correspond to a higher PDCCH capacity, i.e., increase in the number of unique information bits that may be conveyed over the PDCCH, or a higher reliability, e.g., by considering a lower code rate or availability of more resources for rate matching. However, this may come at the expense of higher resource utilization and/or lower PDCCH multiplexing capability, which may be acceptable for the case where narrow beams at high frequencies may be expected to serve a limited number of, e.g., one or more, WTRUs per beam at any point in time. Therefore, the pattern of allocated symbols for PDCCH may need to be repeated in time in support of beam switching, e.g., for common search space, as discussed in the section herein regarding Demodulation Reference Signals (DMRS) Multiplexing. At high frequencies, the subcarrier spacing may be expected to be larger than currently supported values, resulting in a smaller OFDM symbol duration, and subsequently a limited impact on the PDCCH decoding latency.

Another design consideration that may take into account the dedication of symbols to DMRS for PDCCH may be the pattern of allocated symbols to PDCCH and DMRS for PDCCH, as again discussed regarding DMRS Multiplexing. The allocation pattern may be categorized into either a short allocation pattern or a long allocation pattern. A short allocation pattern may be where a small number of OFDM symbols (e.g., 2 OFDM symbols) may be allocated to PDCCH and DMRS for PDCCH. This option may correspond to a high DMRS overhead (e.g., 50% overhead for the 2 OFDM symbol case). A long allocation pattern may be where relatively large number of OFDM symbols (e.g., 3 or more OFDM symbols) may be allocated to PDCCH and DMRS for PDCCH. This option may correspond to a low or high DMRS overhead based on the configuration of additional DMRS (e.g., ~33% overhead for the 3 OFDM symbol case with a single OFDM symbol dedicated to DMRS).

In one example, same (e.g., fixed) value of CCE size or/and allocation pattern may be used across all the CORESETs for a WTRU. The WTRU may be pre-configured with the CCE size. Different values of the CCE sizes or/and allocation patterns may be configured for different CORESETs. The WTRU may be configured with associated CCE size and allocation pattern in each of the CORESET configuration given to the WTRU via, e.g., RRC or SI signaling.

Figure 5D:
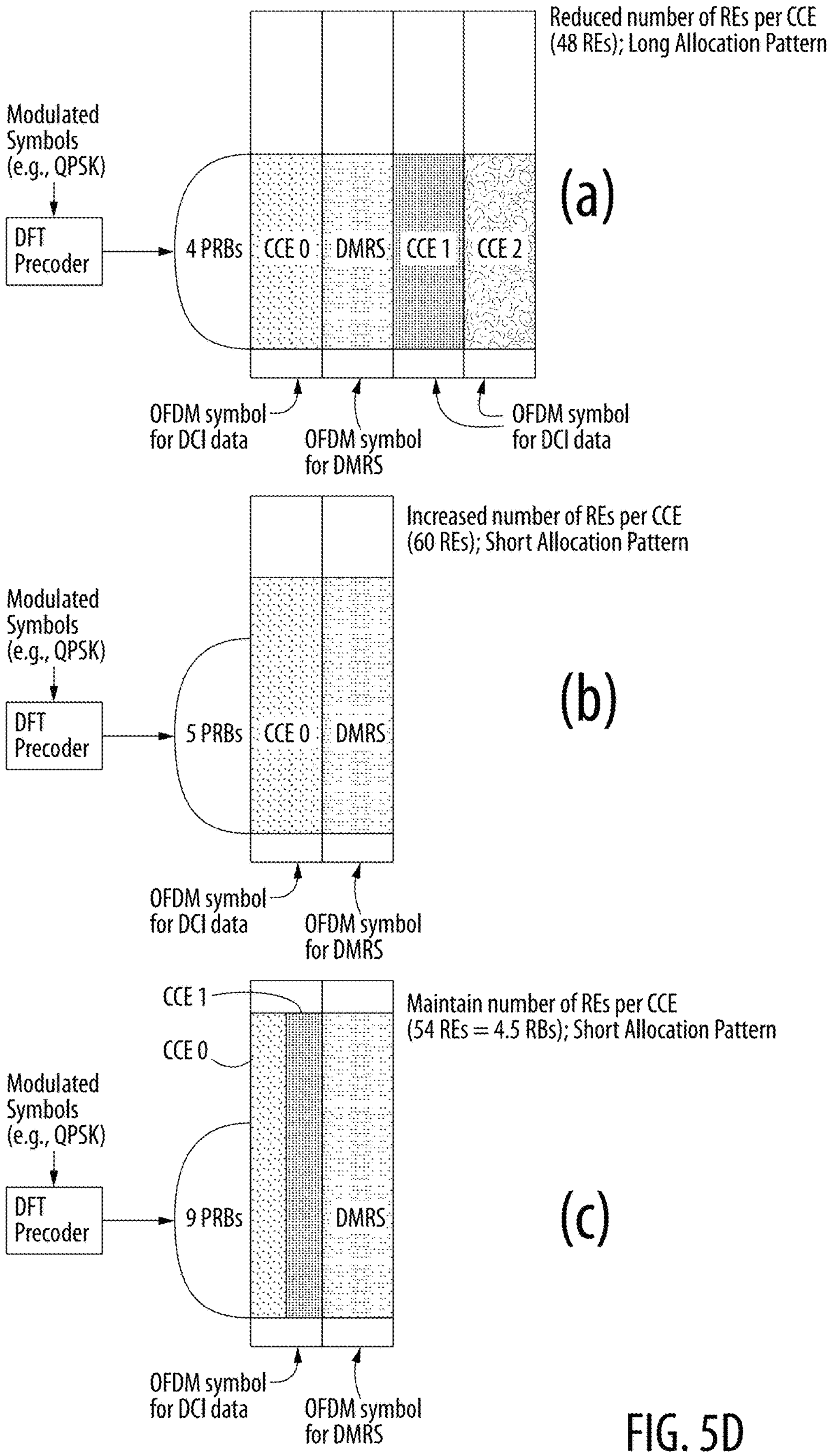
FIG. 5D shows example of configurations with different CCEs sizes and allocation patterns (short/long).

A few examples with different configurations in terms of CCE size and short/long allocation pattern are shown in FIG. 5D. FIG. 5D, part (a), shows an example of long allocation pattern where 3 OFDM symbols are allocated for a CORESET with one symbol ($2^{nd}$ symbol) dedicated to DMRS. In FIG. 5D, part (a), 3 CCEs are multiplexed in the time domain (e.g., over different OFDM symbols) with each CCE of size 4 PRBs (48 REs) which may be an example of reduced number of REs per CCE compared to existing OFDM based CCE design. FIG. 5D, part (b), shows an example of short allocation pattern (e.g., with 2 OFDM symbols are allocated for a CORESET with one symbol ($2^{nd}$ symbol) dedicated to DMRS) with CCE size of 5 PRBs which may be an example of increased number of REs per CCE compared to existing OFDM based CCE design. FIG. 5D, part (c), shows another example of short allocation pattern (e.g., with 2 OFDM symbols are allocated for a CORESET with one symbol (2nd symbol) dedicated to DMRS) with two CCEs multiplexed in the same OFDM symbol with each CCE equivalent of size 4.5 PRBs which may be an example of maintain the same number of REs per CCE compared to existing OFDM based CCE design.

Figure 5E:
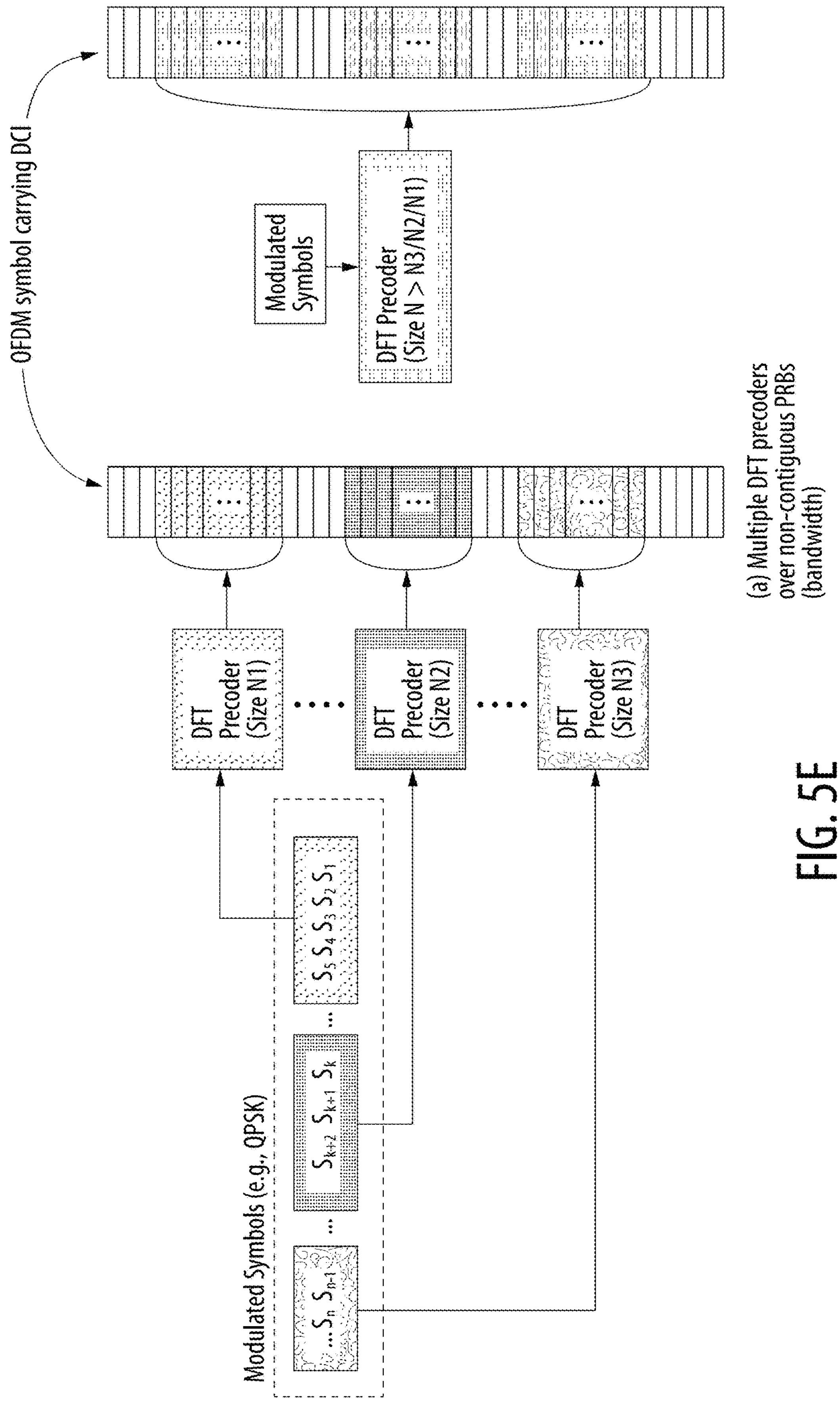
FIG. 5E shows an example of DFT precoding with one or more DFT precoders.

CCE allocation and multiplexing may impact DFT precoding. For a CORESET, one or more DFTs may be used to apply the transform precoding over a set of PDCCH modulated symbols and map the DFT pre-coded output samples onto a set of allocated REs (e.g., using contiguous or non-contiguous frequency resource allocation) over a set of OFDM symbols associated with the CORESET and allocated to carry DCI data. The one or more DFTs may have size(s) (e.g., number of DFT samples, which may be equal to the number of REs over which the DFT pre-coded samples may be mapped) that may be provided as a configuration parameter indicating same or different sizes for each of the DFTs used in the same OFDM symbol(s) and associated with the same CORESET. An example of using multiple DFT precoders vs one DFT precoder over an OFDM symbol associated with the same CORESET is shown in FIG. 5E. For a given number of PRBs, the configuration with higher number (e.g., with smaller size) DFTs, e.g., shown in FIG. 5D, part (a), may have higher PAPR compared to the lower number (e.g., with larger size) DFTs, e.g., shown in FIG. 5D, part (b). The configuration with separate DFT pre-coders within a OFDM symbol shown in FIG. 5D, part (a) is termed as distributed DFT configuration and the configuration with single DFT pre-coder within a OFDM symbol over the non-contiguous PRBs shown in FIG. 5D, part (b) is termed as clustered DFT configuration herein. The modulated symbols of one or more CCEs may belong to one or more PDCCHs addressed to one or more WTRUs.

A CORESET configuration may provide the information indicating a number of DFT precoders or/and the associated DFT size(s) to be considered over the allocated bandwidth (e.g., PRBs) and one or more OFDM symbols in the CORESET. In one example, the same DFT size may be used for all the DFT pre-coders. Different DFT sizes may be used for one or more DFT pre-coders over an OFDM symbol.

The configuration information may be provided explicitly as a sequence of integers indicating the size of one or more DFTs where the number of DFTs may be determined by the length of the sequence. The number of DFTs may be provided explicitly as an integer number and the size, which may be applicable to all DFTs, as another integer number. Alternatively, the number of DFTs and their size may be implicitly deduced based on a sequence of integers indicating the number of multiplexed CCEs within subset(s) of the frequency resources allocated in a CORESET and the OFDM symbol allocation pattern wherein the size of each subset may also be determined by the number of multiplexed CCEs and the size of each CCE for the indicated OFDM symbol allocation pattern.

The order of the subsets of the frequency resources may be preconfigured or signaled to the WTRU as part of the CORESET configuration. The WTRU may assume the first DFT pre-coder given in the list containing one or more DFT pre-coders may be used over the first set of REs allocated for the associated CORESET (e.g., starting from the lowest index RE in the frequency domain), where the number of REs in the first set equals to the DFT size of the first DFT pre-coder, and the second DFT pre-coder may be used over the second set of REs (e.g., starting from the first RE allocated to the CORESET which comes the last RE of the first RE set determined for the first DFT pre-coder) with number of REs in the second set equals to the DFT size of the second DFT pre-coder, and so on.

The WTRU may be configured with a (e.g., default/fixed) size of DFT used for one or more DFT pre-coders used over an OFDM symbol associated with the CORESET. The WTRU may determine the number of DFT pre-coders applied over an OFDM symbol by using the number of PRBs (e.g., REs) and the DFT size. For each DFT pre-coder, the WTRU may determine the number of CCEs multiplexed in the time domain using the DFT size and the CCE size.

Subsequently, different schemes of CCE multiplexing (e.g., time, frequency, and/or code domain multiplexing) may be considered in a CORESET based on the configuration. The WTRU may be configured to consider time multiplexing only (e.g., using single DFT over the allocated CORESET bandwidth), frequency multiplexing only (e.g., each CCE may be independently transform pre-coded), code multiplexing only (e.g., using single DFT over the allocated CORESET bandwidth with an indication of code multiplexing and/or orthogonal code length), or a combination thereof. The considered multiplexing schemes may be configured explicitly and/or implicitly within a CORESET for the associated one or more CCEs. Multiplexing pattern may be derived based on any one or more of the following: the number of DFTs, CCE size(s), DFT size(s), number of PRBs allocated within an OFDM symbol, or/and OFDM symbol allocation pattern (i.e., number of OFDM symbols allocated for the DCI data), etc. The multiplexed CCEs may constitute one or more PDCCHs carrying one or more DCIs intended for a single WTRU or more than one WTRU.

The WTRU may be provided a list of one or more configurations, each associated with, e.g., a DFT module or a subset of allocated frequency resources associated with a single DFT module, wherein the size of the list may be used to indicate frequency domain multiplexing, e.g., if more than one configuration may be provided, and each configuration includes a parameter indicating whether time or code multiplexing may be used for the subset of frequency resources associated with the corresponding DFT module. The WTRU may determine frequency multiplexing based on the received indication(s) of the number of DFTs considered in a CORESET and may be provided a global multiplexing option for all the DFT modules within the CORESET as a single CORESET configuration parameter. The WTRU may have to blindly determine the time and/or code multiplexing option associated with each DFT module in a configured CORESET. The WTRU may determine the number of CCEs multiplexed in the time or code domain over an OFDM symbol based on any of the CCE size, the DFT size used for the DFT pre-coder, and the OFDM symbol allocation pattern.

In the case of code domain multiplexing, the WTRU may be configured with orthogonal cover code (OCC) length. The orthogonal cover code length may depend on the number of multiplexed CCEs and each CCE may be spread by one code from a set of preconfigured codes based on the determined length. Alternatively, number of CCE multiplexed (e.g., within the same time and frequency resources) may depend on the OCC length. The WTRU may be preconfigured or configured with a set of orthogonal cover codes, which WTRU may use to extract the CCEs multiplexed in the code domain.

Figure 5F:
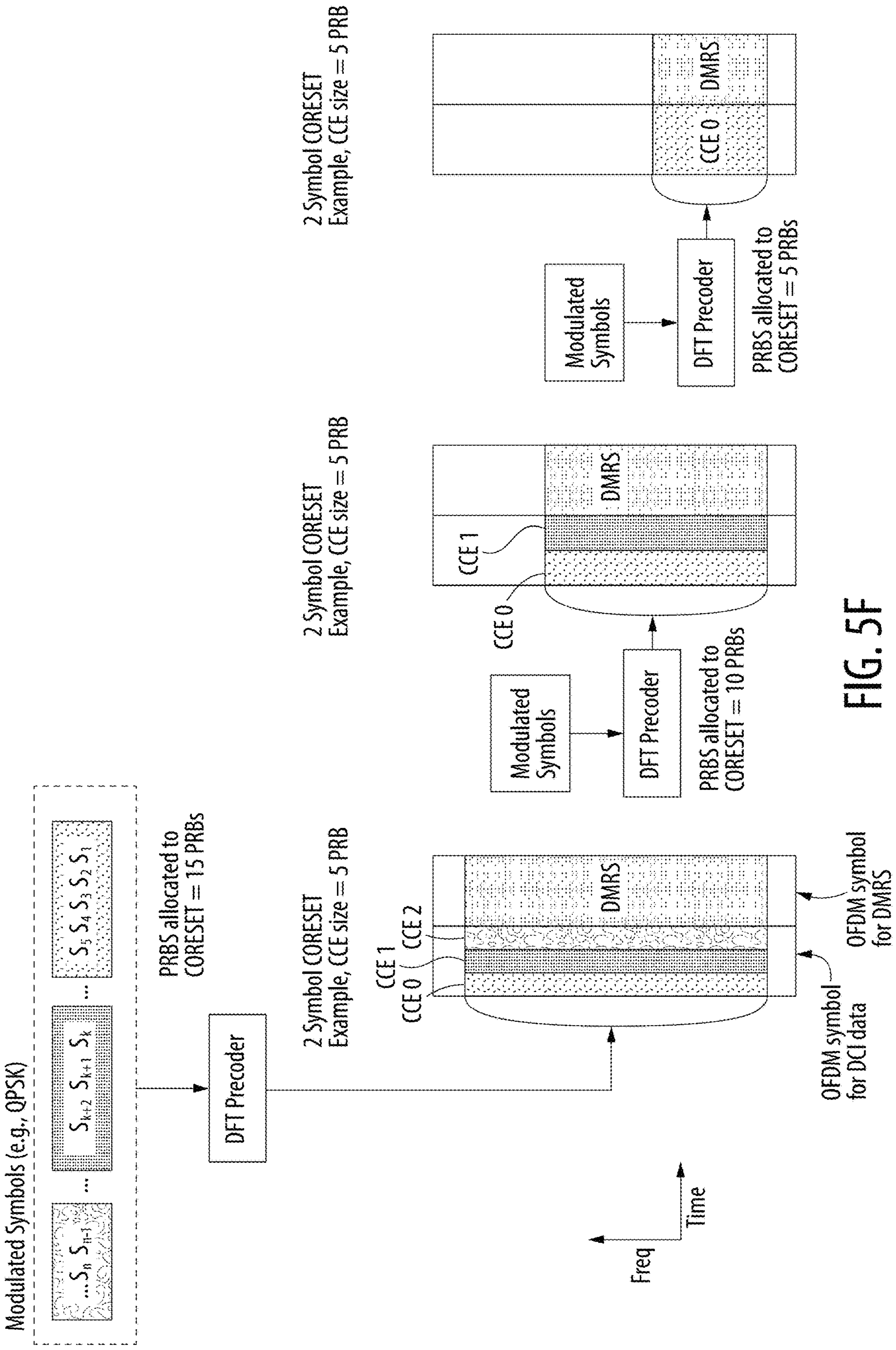
FIG. 5F shows examples of CCE multiplexing based on the number of PRBs allocated in an OFDM symbol and the CCE size.
Figure 5G:
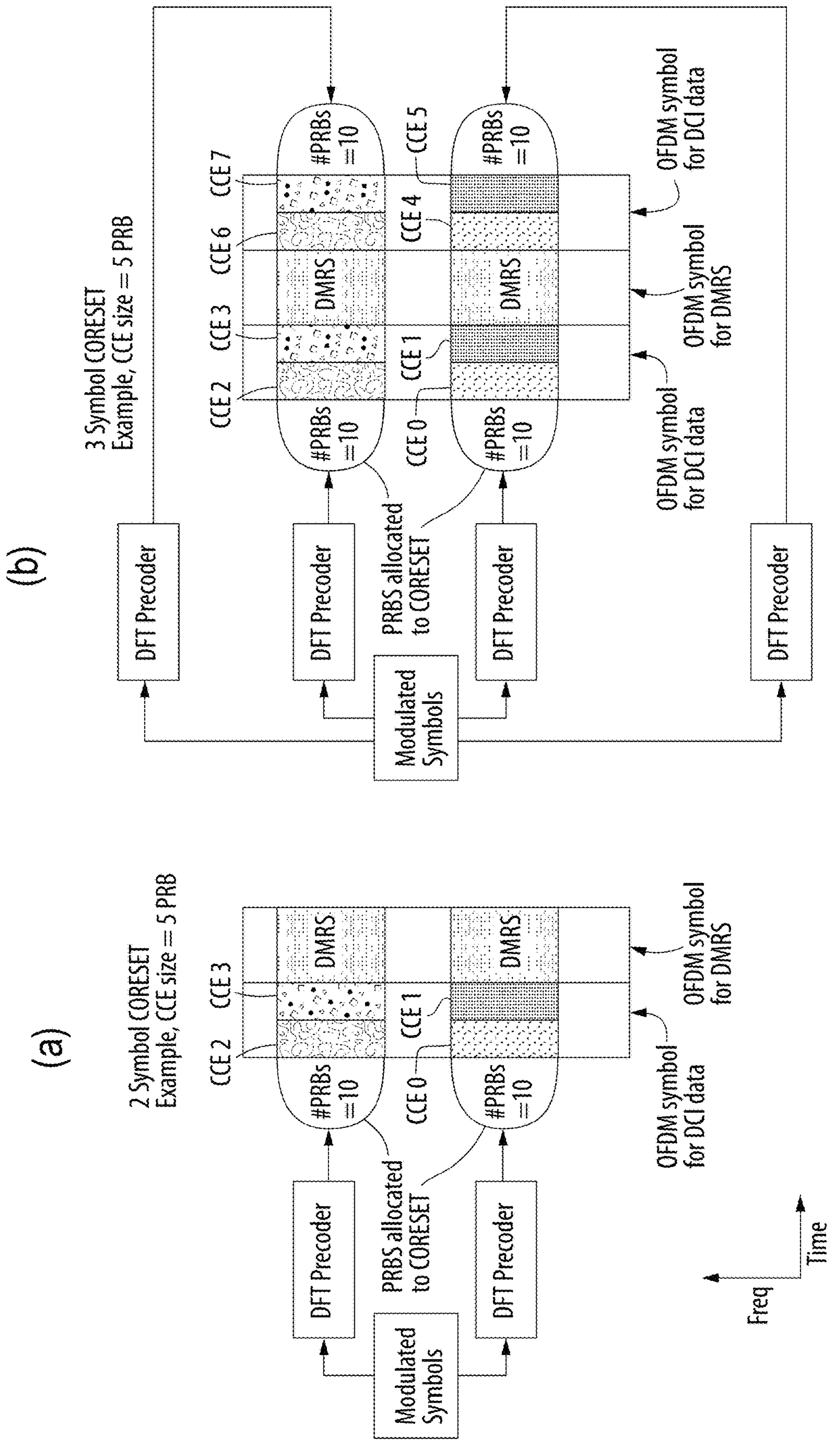
FIG. 5G shows examples of CCE multiplexing in both time and frequency domain.

Examples are shown in FIG. 5F with time domain CCE multiplexing in an OFDM symbol where the number of CCEs (e.g., number of CCEs ϵ{3, 2, 1} is shown) may be determined based on the number of PRBs allocated for the CORESET (e.g., examples with number of RBs ϵ{15, 10, 5} are shown), the CCE size (e.g., a size of 5 RBs per CCE is shown), OFDM symbol allocation pattern (e.g., two OFDM symbols are allocated with one OFDM symbol dedicated to DMRS for PDCCH). More examples, where a combination of time and frequency (e.g., using different DFT precoders) domain multiplexing may be considered, are shown in FIG. 5G. Those examples consider a number of DFTs of 2, a CCE size of 5 RBs, a total number of 10 RBs per CORESET, and an OFDM symbol allocation pattern with 2 OFDM symbols (part a of FIG. 5G) or 3 OFDM symbols (part b of FIG. 5G) and one OFDM symbol dedicated to DMRS for PDCCH.

In case of multi-symbol CORESET when more than one OFDM symbols may be allocated to send DCI data within the CORESET, same or different configurations may be used in terms of number of DFT pre-coders or/and DFT sizes. In case of different configurations over one or more OFDM symbols associated with the CORESET, one or more configurations associated with the one or more OFDM symbols may be given to the WTRU.

Figure 5H:
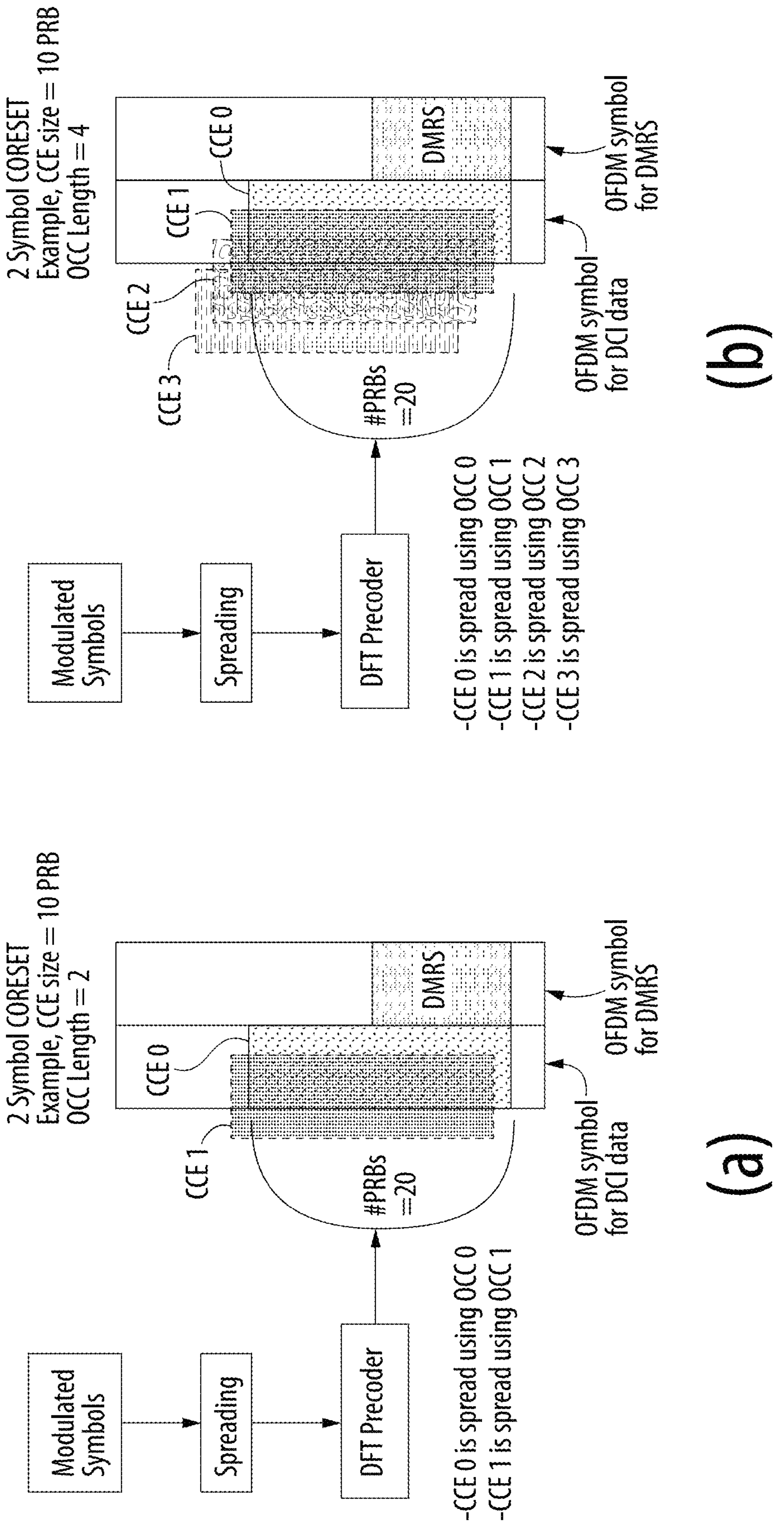
FIG. 5H shows examples of CCE multiplexing in the code domain.

Two examples of code domain CCE multiplexing are shown in FIG. 5H. In FIG. 5H, part (a), two CCEs are multiplexed on the same time and frequency resources using the OCC length (e.g., spreading factor or number of OCC codes) of 2, whereas in FIG. 5H, part (b), four CCEs are multiplexed on the same time and frequency resources using the OCC length of 4. Each CCE may be spread by one code from a set of OCC codes of the given length. Larger OCC length increases the multiplexing capacity but decreases the capacity (e.g., in terms of number of modulated symbols which may be mapped) available to each individual CCE. As shown in FIG. 5H, parts (a) and (b), increasing the spreading factor from 2 to 4 reduced the CCE size which may be mapped from 120 (equivalent to 10 PRBs) to 60 (equivalent to 5 PRBs).

The CCE composition may be defined in terms of one or more resource groups (RGs) where the term RG is used to differentiate from the REG term (e.g., in 3GPP 5G NR), in which DMRS may be multiplexed in the frequency domain. Further, a definition of a time resource element (TRE) may be introduced where each TRE represents an IFFT output sample and each DFT input sample may correspond to one or more TRE(s) based on the relationship between DFT and IFFT modules' sizes. Furthermore, due to DFT precoding, each modulated symbol in time domain may be spread across all the frequency resources (e.g., subcarriers or REs) that may be allocated to the single DFT module. Therefore, each DFT module may be assumed to be associated with a single frequency resource group (FRG) which spans one or more subcarriers (e.g., an FRG consists of $$N_{DFT}^{sc}$$

subcarriers, contiguous or non-contiguous, and one TRE). However, other terminologies may also be used to represent the definition of an RG, TRE and/or FRG.

Each RG may carry a portion of or all the modulated data symbols in a CCE, represented as $N_{symb}$. Each RG may consist of a portion (p) of the time resource elements (TREs) in an OFDM symbol and spans the frequency resource elements associated with a single DFT module. The for a single DFT module, the total number of subcarriers (e.g., frequency resources) allocated for the DFT may be equal to the DFT size (e.g., number of frequency domain, i.e., after DFT, samples), whereas the total number of time resources (TREs) associated with the single DFT may be equal to the number of time domain (i.e., before DFT) samples times the ratio between IFFT and DFT modules' sizes. The total time-frequency resources allocated to RGs associated with a CCE will correspond to the CCE size and may be defined in terms of number of TREs and FRGs, i.e., a CCE may be associated with $$N_{RG}^{CCE}$$

resource groups spanning N $$N_{FRG}^{CCE}$$

frequency resource groups and $$N_{TRE}^{CCE}$$

time resource elements such that each RG is allocated $$N_{tf}^{RG}\left(\text{e.g., } N_{tf}^{RG} = \left(N_{FRG}^{CCE} \times N_{TRE}^{CCE}\right) / N_{RG}^{CCE},\right.$$

assuming equal DFT sizes and/or equal RG sizes) time-frequency resources. The minimum unit of time-frequency resource is 1 FRG with 1 TRE.

The considering a CCE size of 54 REs (e.g., 54 modulated symbols) and two DFT modules, i.e., $$N_{FRG}^{CCE} = 2,$$

where each DFT is associated with a frequency resource group of size $$N_{DFT,1}^{sc} = N_{DFT,2}^{sc} = 0.25 \times N_{IFFT}$$

and $N_{IFFT}$ is the IFFT module size, the total number of time-frequency resources required for a single CCE may be obtained as $$N_{tf}^{CCE} = 54 \times \frac{N_{IFFT}}{N_{DFT,1}^{sc}} = 54 \times 4 = 216$$

(e.g., each modulated symbol requires 4 IFFT samples). Then, for a number of resource groups $$N_{RG}^{CCE} = 2 \text{ per } CCE,$$

the number of time-frequency resources per RG is $$N_{tf}^{RG} = N_{tf}^{CCE} / N_{RG}^{CCE} = \left(N_{FRG}^{CCE} \times N_{TRE}^{CCE}\right) / N_{RG}^{CCE} = 108$$

where each RG is allocated $$N_{TRE}^{CCE} = N_{tf}^{CCE} / N_{FRG}^{CCE} = 108,$$

each of the RGs is associated with a DFT module, and each RG may carry $$54 / N_{RG}^{CCE} = 27$$

REs or modulated symbols. In general, the allocated TREs for a CCE may span one or more OFDM symbols or a fraction ρ of an OFDM symbol.

The size of an RG and the number of RGs associated with a CCE may depend on any of the DFT size $$(N_{DFT}^{sc}),$$

CCE multiplexin pattern (in the frequency/time/code domain), number of allocated frequency resource groups $$\left(N_{FRG}^{CCE}\right)$$

for a CCE, and number of allocated TREs $$\left(N_{TRE}^{CCE}\right)$$

for a CCE. The RGs belonging to a CCE may have different or same sizes depending on the DFT size and the CCE multiplexing pattern.

Figure 5I:
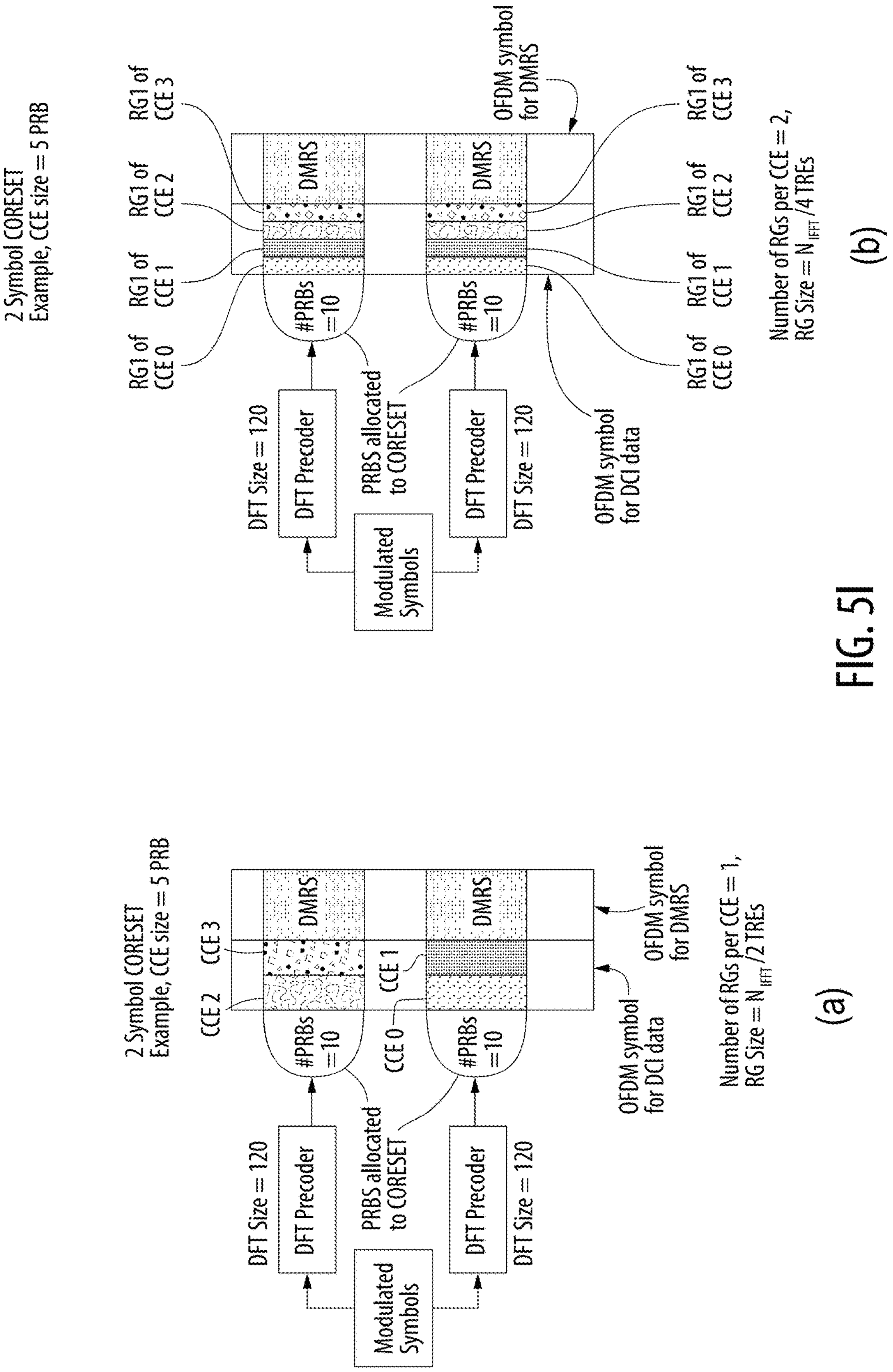
FIG. 5I shows examples of RG/RGs to CCE mapping based on the DFT size and the CCE multiplexing pattern.

FIG. 5I shows examples of two different scenarios of number of RGs per CCE based on the CCE multiplexing pattern. In this example, the CCE size is 60 REs (e.g., modulated symbols) and the DFT size is 120

$$(\text{e.g., } N_{DFT}^{sc} = 120).$$

In part a of FIG. 1, since there may be only two RGs/CCEs multiplexed in the time domain within each DFT operation $$\left(\text{e.g., } N_{Mux}^{DFT} = 2\right),$$

the number of TREs of each RG/CCE per FRG (e.g., DFT module)

$$N_{tf}^{CCE} / N_{FRG}^{CCE} = \frac{N_{IFFT}}{N_{Mux}^{DFT}} = \frac{N_{IFFT}}{2},$$

i.e., each RG/CCE is allocated half of the TREs per FRG per OFDM symbol. By noting that half of the TREs may carry 60 modulated symbols $$\left(\text{i.e., } N_{symb} \times \frac{N_{IFFT}}{N_{DFT}^{sc}} = \frac{N_{IFFT}}{2} \text{ resulting in } N_{symb} = \frac{N_{DFT}^{sc}}{2} = 60\right).$$

Therefore, only a single RG is required per CCE $$\left(\text{i.e., } N_{RG}^{CCE} = \frac{CCE \text{ size}}{N_{symb}} = 1\right)$$

based on the preconfigured/signaled CCE size.

In the part b of FIG. 5I, since there may be four CCEs multiplexed in the time domain within each DFT operation $$\left(\text{e.g., } N_{Mux}^{DFT} = 4\right),$$

the number of TREs of each RG/CCE per FRG (e.g., DFT module)

$$N_{tf}^{CCE}/N_{FRG}^{CCE} = \frac{N_{IFFT}}{N_{Mux}^{DFT}} = \frac{N_{IFFT}}{4},$$

i.e., each RG/CCE is allocated quarter of the TREs per FRG per OFDM symbol. By noting that quarter of the TREs may carry only 30 modulated symbols $$\left(\text{i.e., } N_{symb} \times \frac{N_{IFFT}}{N_{DFT}^{sc}} = \frac{N_{IFFT}}{4} \text{ resulting in } N_{symb} = \frac{N_{DFT}^{sc}}{4} = 30\right),$$

therefore two RGs may be required per CCE $$\left(\text{i.e., } N_{RG}^{CCE} = \frac{CCE\ \text{size}}{N_{symb}} = 2\right)$$

based on the preconfigured/signaled CCE size. The Two RGs of each CCEs are allocated different frequency locations (e.g., FRGs) with different DFT pre-coding blocks as shown in FIG. 5I.

Figure 5J:
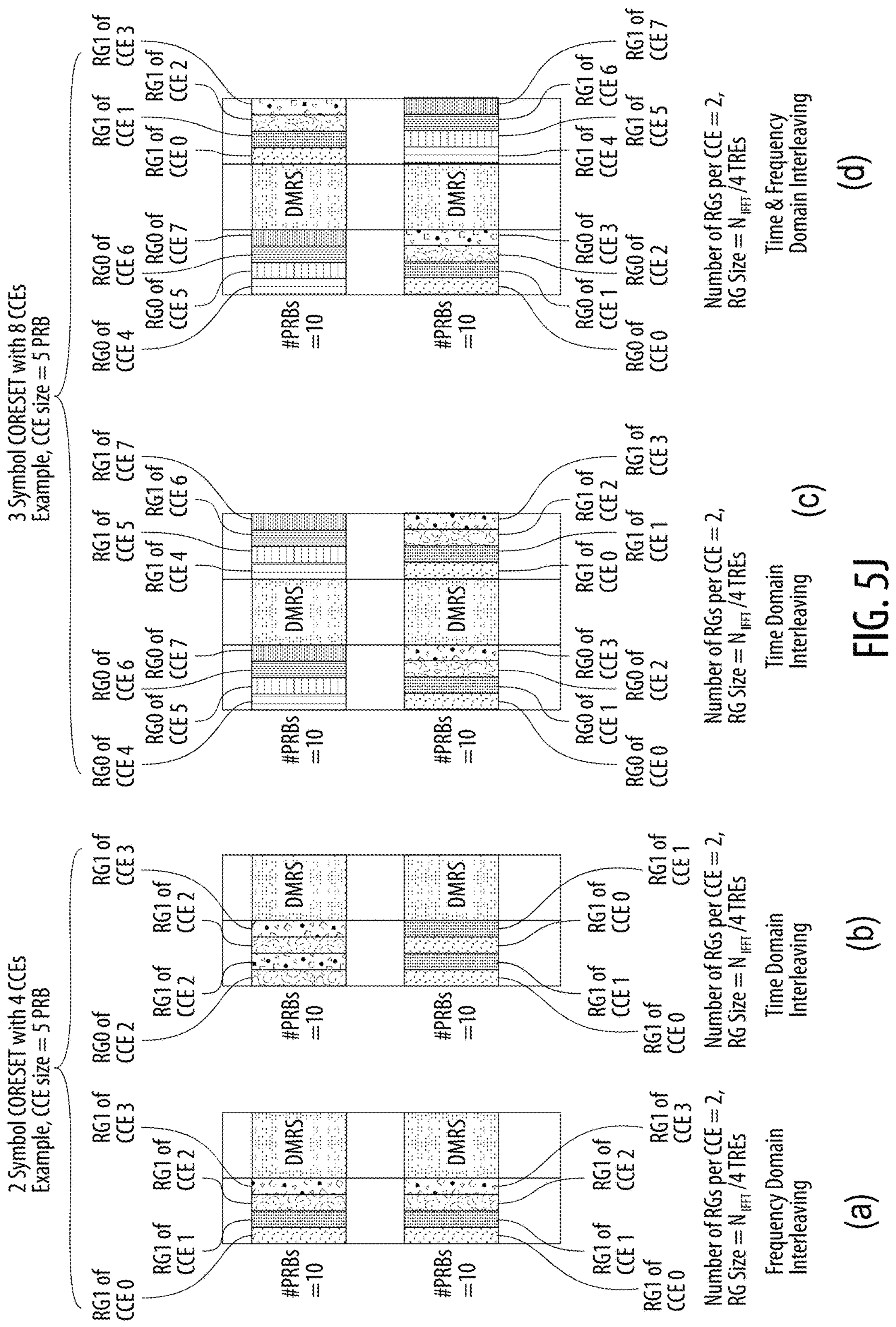
FIG. 5J shows examples of RG interleaving in time/frequency domains.

The RGs of a CCE may be interleaved in the time or/and frequency domain. FIG. 5J shows some examples of different RG to CCE interleaving scenarios in time, frequency, or both domains. The first example (e.g., parts a and b of FIG. 5J) shows a 2-symbol CORESET with 4 CCEs multiplexed using 2 FRGs (i.e., DFTs), each of size 10 PRBs and one OFDM symbol allocated for PDCCH, where each CCE may be allocated a size of 5 PRBs and may be split into 2 RGs. Two interleaving cases may be shown in this example, a first case with frequency domain interleaving (e.g., part a of FIG. 5J) and a second case with time domain interleaving (e.g., part b of FIG. 5J). In the first case, each of the 4 CCEs may be spread across the two FRGs (i.e., across frequency domain over two different DFTs where the CORESET frequency allocation may or may not be contiguous) via the 2 RGs allocated to each CCE. In the second case, each pair of CCEs may be dedicated to a single FRG (i.e., DFT module) and the corresponding RGs may be interleaved in time.

The second example (e.g., parts c and d of FIG. 5J) shows a 3-symbol CORESET with 8 CCEs multiplexed using 2 FRGs (i.e., DFTs), each of size 10 PRBs and two OFDM symbols allocated for PDCCH, where each CCE may be allocated a size of 5 PRBs and may be split into 2 RGs. Two interleaving cases may be shown in this example, a first case with time domain interleaving (e.g., part c of FIG. 5J) and a second case with a combination of time and frequency domain interleaving (e.g., part d of FIG. 5J). In the first case (e.g., part c of FIG. 5J), each of the 8 CCEs may be dedicated to a single FRG (e.g., 4 CCEs may be time domain multiplexed within a single FRG) and the 2 corresponding RGs may be allocated to different OFDM symbols. In the second case (e.g., part d of FIG. 5J), the 2 RGs corresponding to a single CCE may be allocated different FRGs and OFDM symbols (e.g., allocated to different DFT modules and at different times). For example, the first RG (e.g., RG 0) of a first CCE (e.g., CCE 0) may be allocated to a first FRG (e.g., FRG 0) at a first OFDM symbol (i.e., allocated for PDCCH) whereas a second RG (e.g., RG 1) of the first CCE may be allocated to a second FRG (e.g., FRG 1) at a second OFDM symbol (i.e., allocated for PDCCH).

Due to the additional overhead (e.g., in terms of processing complexity and/or processing latency) that may be imposed on control channel detection at the WTRU due to the use of the DFT-s-OFDM waveform, the WTRU may have to report any of its hardware capability and/or processing requirements (e.g., complexity, power consumption, latency, etc.). The reported WTRU capability may then include a number of parameters, for example, CORESET configuration, search space configuration, and other design aspects.

A WTRU may indicate to the base station/network, e.g., during registration or as part of WTRU capability indication, a capability to monitor PDCCH consisting any of the following. The WTRU may indicate the base station/network a maximum, e.g., supported, number of DFT modules (transform precoders) per symbol or/and per slot or/and per serving cell. For example, the WTRU may indicate an integer indicating a supported number of FRGs (e.g., DFTs), $N_{FRG}$, that may be monitored by the WTRU. The WTRU may indicate one or more DFT module sizes supported by the WTRU. For example, the WTRU may indicate an integer indicating the maximum DFT/FRG size (e.g., $$N_{DFT}^{sc})$$

supported, e.g., in terms of subcarriers or resource blocks. The WTRU may indicate a maximum number of PDCCH candidates per symbol or/and per slot or/and per serving cell that can be decoded by the WTRU, for a given numerology and one or more DFT sizes supported by the WTRU, e.g., one or more integers indicating the maximum number of PDCCH candidates, $$N_{pdcch}^{candidates}$$

associated with one or more DFT module sizes at a specified numerology, that may be supported in, e.g., a slot.

The WTRU may indicate a maximum number of PDCCH candidates per symbol or/and per slot or/and per serving cell that may be decoded by the WTRU for one or more number of DFT modules supported by the WTRU per symbol/slot. The WTRU may indicate a maximum number of non-overlapped CCEs in time, frequency, and/or in both domains per symbol or/and per slot or/and per serving cell for one or more DFT sizes supported by the WTRU. The WTRU may indicate a maximum number of non-overlapped CCEs in time, frequency, and/or in both domains per symbol and/or per slot and/or per serving cell for one or more number of DFT modules supported by the WTRU per symbol/slot. The WTRU may indicate one or more of PDCCH monitoring span/group combination (X, Y) supported by the WTRU for one or more DFT sizes or/and number of DFT modules (e.g., supported per symbol/slot or across multiple symbols/slots), where X is the minimum separation (e.g., in terms of number of symbols) between the first symbols of two consecutive spans of PDCCH monitoring occasions, including across slots, and Y is the number of symbols of the span. In some examples, a span may start at a first symbol where a PDCCH monitoring occasion starts and ends at a last symbol where a PDCCH monitoring occasion ends, where the number of symbols of the span is up to Y. The network may then limit the number and/or configuration of the PDCCH candidates to be monitored, e.g., blindly detected, based on the received WTRU capability.

A WTRU may receive from the base station a CORESET configuration, e.g., as part of ControlResourceSetZero and/or ControlResourceSet, using higher layer signaling (e.g., RRC or system information). The CORESET configuration may include any one or more of a CORESET Index, a time domain configuration, a frequency domain configuration, a configuration for DMRS for PDCCH, a CCE structure, a precoder granularity, and/or an indication of CCE aggregation levels and number of PDCCH candidates for each indicated aggregation level.

The CORESET configuration may include a time domain configuration, which may indicate any short or long format for the pattern of allocated OFDM symbols. The CORESET configuration may indicate a number of allocated OFDM symbols that may be indicated explicitly or implicitly. The CORESET configuration may include an indication of, e.g., short format 1, may be used to indicate an allocation of 2 OFDM symbols to PDCCH and DMRS for PDCCH, whereas an indication of, e.g., short format 2, may be used to indicate an allocation of 3 OFDM symbols to PDCCH and DMRS for PDCCH, etc. An indication of, e.g., long format 1, may be used to indicate an allocation of 4 OFDM symbols to PDCCH and DMRS for PDCCH, whereas an indication of, e.g., long format 2, may be used to indicate an allocation of 5 OFDM symbols to PDCCH and DMRS for PDCCH, and so on. The CORESET configuration may also indicate the indices of OFDM symbols within a slot which may be dedicated to PDCCH and DMRS for PDCCH. A n OFDM symbol index may be used to indicate the starting symbol of the CORESET within a slot.

The CORESET configuration may indicate a frequency domain configuration. For example, the CORESET configuration may indicate a resource block (RB) offset from, e.g., the first RB allocated to the CORESET, to, e.g., the first RB of the bandwidth part (BWP). The CORESET configuration may include a frequency domain resources allocated for the CORESET, which may correspond to contiguous or non-contiguous resource allocation (e.g., the resources may be indicated in terms of RBs, group of RBs, or FRGs).

The CORESET configuration may indicate a configuration of DMRS for PDCCH. For example, the CORESET configuration may include an indication of additional DMRS configuration, a mapping/location of PFDM symbols allocated to DMRS for PDCCH, an indication of frequency resources, and indication of DMRS sequence(s) parameters, and/or an indication of DMSR modulation type, spreading factor, and/or orthogonal sequence index. The mapping/location of OFDM symbols allocated to DMRS for PDCCH may be indicated explicitly and/or implicitly. The OFDM symbols locations may be indicated explicitly as a set of indices with respect to, e.g., the first OFDM in a slot containing the CORESET or the first OFDM symbol in a CORESET. Alternatively, the OFDM symbols' locations may be indicated explicitly as an index to an OFDM symbol and number of consecutive OFDM symbols allocated to DMRS for PDCCH. The OFDM symbols' locations may be indicated implicitly based on a set of preconfigured patterns that may be dependent on, e.g., time domain configuration of a CORESET and additional DMRS indication. The frequency resources, e.g., REs/RBs, considered for the transmission of the DMRS within any one of the dedicated OFDM symbols, may be indicated when a subset of REs or/and RBs within the bandwidth of the CORESET may be configured for DMRSs. The frequency domain configuration of resources selected to transmit DMRS (e.g., associated with the CORESET) may be indicated implicitly based on a set of preconfigured patterns that may be dependent on, e.g., RE indices (within a RB), RB indices within the BWP (e.g., associated with the CORESET) selected to transmit DMRSs. The indication of DMRS sequence(s) parameters, may include, e.g., sequence type(s), initializing seed(s), cyclic shift(s), base sequence(s), etc.

The CORESET configuration may indicate the CCE structure, interleaving, and/or multiplexing configuration. The CORESET configuration may indicate a CCE size, for example, in terms of the number of modulated symbols or equivalent number of REs/RBs. The CCE size may be fixed (e.g., preconfigured at the network/VTRU) or configurable. The configurable CCE size may be signaled explicitly as part of the CORESET configuration or derived/determined based on other CORESET parameters, e.g., frequency domain and multiplexing configurations. The number of RGs per CCE may be indicated along with a corresponding RG size. The RG size(s) per CCE may be explicitly signaled/indicated to the WTRU or derived/determined based on other CORESET configuration parameters, e.g., CCE size, number of RGs per CCE, multiplexing configuration, etc. The number of FRGs (e.g., number of DFTs per CORESET) and size of each FRG may be indicated in terms of number of subcarriers. Further, an indication of interleaving, interleaving size(s) in time and/or frequency domain, cyclic shift, and RG/CCE ordering indication, e.g., RGs/CCEs interleaved in time first and then frequency, or RGs/CCEs interleaved in frequency first and then time. An indication of any of the time and code domain multiplexing option(s) may be indicated per FRG and OFDM symbol. The CORESET configuration may also indicate the number of multiplexed RGs/CCEs per FRG where the multiplexing may be over one or more OFDM symbols. An indication of orthogonal (e.g., cover) code(s) and corresponding length(s) may be indicated, e.g., spreading factor(s), when code domain multiplexing is indicated.

The CORESET configuration may indicate the precoder granularity. The precoder granularity may be configured as sameAsFRG or allContiguousRBs. The precoder granularity may be configured as sameAsFRG when the same precoding weights may be applied to all RBs associated with a FRG (e.g., DFT module), e.g., different precoding weights may be applied to RBs belonging to different FRGs. The precoder granularity may be configured as allContiguousRBs when the same precoding weights may be applied to all RBs belonging to contiguous RBs.

A WTRU may receive from the base station a search space configuration, e.g., as part of SearchSpaceZero and/or SearchSpace, using higher layer signaling, e.g., RRC or system information. The search space configuration may include any one or more parameters. One parameter may be a CORESET index to indicate the associated CORESET. A PDCCH monitoring periodicity and an offset in terms of integer number of slots may be provided. A PDCCH monitoring pattern within a slot may be provided, indicating one or more first symbol(s) of the CORESET within one or more slot(s) for PDCCH monitoring. Further, a duration may be provided indicating a number of (e.g., consecutive) slots that the search space exists. An indication may be provided for CCE aggregation levels and number of PDCCH candidates for each indicated aggregation level. Other options include search space type parameters, which may be set to either common or WTRU-specific according to the category of search space and indication of DCI formats which may be carried using the search space being configured. Frequency monitoring locations may be provided to define an association of the search space to multiple monitoring locations in the frequency domain and indicates whether the pattern configured in the associated CORESET may be replicated to a specific RB or FRG set. Each bit in the bitmap corresponds to one RB or FRG set, and the leftmost (most significant) bit corresponds to RB/FRG set 0 in the BWP. A bit set to 1 indicates that a frequency domain resource allocation replicated from the pattern configured in the associated CORESET may be mapped to the RB/FRG set Other design considerations may be derived/used, for a given time-frequency allocation/configuration of a CORESET, including different CCE structure, interleaving, and multiplexing configurations (i.e., in terms of number of FRGs/DFTs, FRG/DFT size, number of CCEs multiplexed in the time/code domain per a FRG/DFT within an OFDM symbol, RG interleaving pattern, etc.). The CCE structure, interleaving, and/or multiplexing configurations may be derived based on any of the following criteria/factors. The criteria/factors may include any combination of the network (e.g., BS) energy efficiency, CCE aggregation, frequency domain diversity, time domain diversity, precoding, WTRU complexity/capability, and/or control channel congestion.

For network energy efficiency, for a given bandwidth allocation (e.g., PRBs either contiguous or non-contiguous), a PAPR may be inversely proportional to the DFT size and directly proportional to the number of DFT pre-coders. A configuration with higher number of DFT pre-coders (e.g., with smaller DFT size) applied to allocated PRBs in an OFDM symbol may have higher PAPR (e.g., lower BS energy efficiency) compared to smaller number of DFT pre-coders (e.g., with larger DFT size, higher BS energy efficiency). Lower PAPR may be beneficial to improve the network's coverage.

CCE aggregation may be defined where a WTRU may be allocated multiple CCEs (e.g., CCE aggregation level>1) to improve the coverage. Aggregation may be performed in the time domain (e.g., within a OFDM symbol or/and over multiple OFDM symbols), for example, in noise limited scenarios (or relatively fast fading channel scenarios); or in the frequency domain (e.g., within a OFDM symbol or/and over multiple OFDM symbols), for example, in case of frequency selective fading over the allocated bandwidth of the CORESET.

Frequency domain diversity may be helpful in case of frequency selective fading. CCEs allocated to a WTRU or RGs associated to a CCE of WTRU may be interleaved in the frequency domain within a OFDM symbol or/and over multiple OFDM symbols to achieve frequency diversity. CCEs allocated to a WTRU or RGs associated to a CCE of WTRU may be interleaved and/or aggregated in the frequency domain using distributed (e.g., different/separate) DFT pre-coders or clustered DFT pre-coding.

Time domain diversity may be helpful in case of fast fading channel (e.g., channel coherence time of order of OFDM symbol length). CCEs allocated to a WTRU or RGs associated to a CCE of WTRU may be interleaved and/or aggregated in the time domain within an OFDM symbol or/and over multiple OFDM symbols to achieve time diversity.

There may be constraints from the (e.g., transmitter) precoding perspective. Same precoding may need to be applied to all the data within an OFDM symbol mapped using a DFT pre-coder. The same precoding weights may need to be applied to all the CCEs/RGs multiplexed in the time/code domain after a DFT pre-coding within an OFDM symbol. These CCEs/RGs may belong to one or more WTRUs.

WTRUs may have different complexities/capabilities in terms of supported number of DFT pre-coders and corresponding DFT sizes per OFDM symbol/slot per serving cell. Blind decoding generates a significant processing load at the WTRU. DFT decoding at the WTRU side to extract the WTRU's PDCCH may incur additional WTRU processing time/overhead. Maximum number of PDCCH candidates or/and maximum CCE requiring channel estimation per slot per serving cell with DFT pre-coded PDCCH (e.g., as a function of sub-carrier spacing) may be defined.

Control channel congestion parameters may result from moderate CCE aggregation levels (and/or higher granularity precoding) with frequency diversity (e.g., using distributed or clustered DFT pre-coding within an OFDM symbol or/and over multiple OFDM symbols) that may be selected at the expense of lower network (e.g., gNB) energy efficiency (e.g., due to higher PAPR) to reduce the control channel blocking probability. A higher aggregation level (and/or lower granularity precoding) with time domain multiplexing via a larger DFT pre-coding (e.g., assuming this configuration has lower frequency diversity compared to the previous one and/or lower CCE decoding performance due to the squeeze of CCE modulated symbols in shorter period of time) may be used to achieve higher network energy efficiency (e.g., lower PAPR) at the expense of higher blocking probability.

Figure 5K:
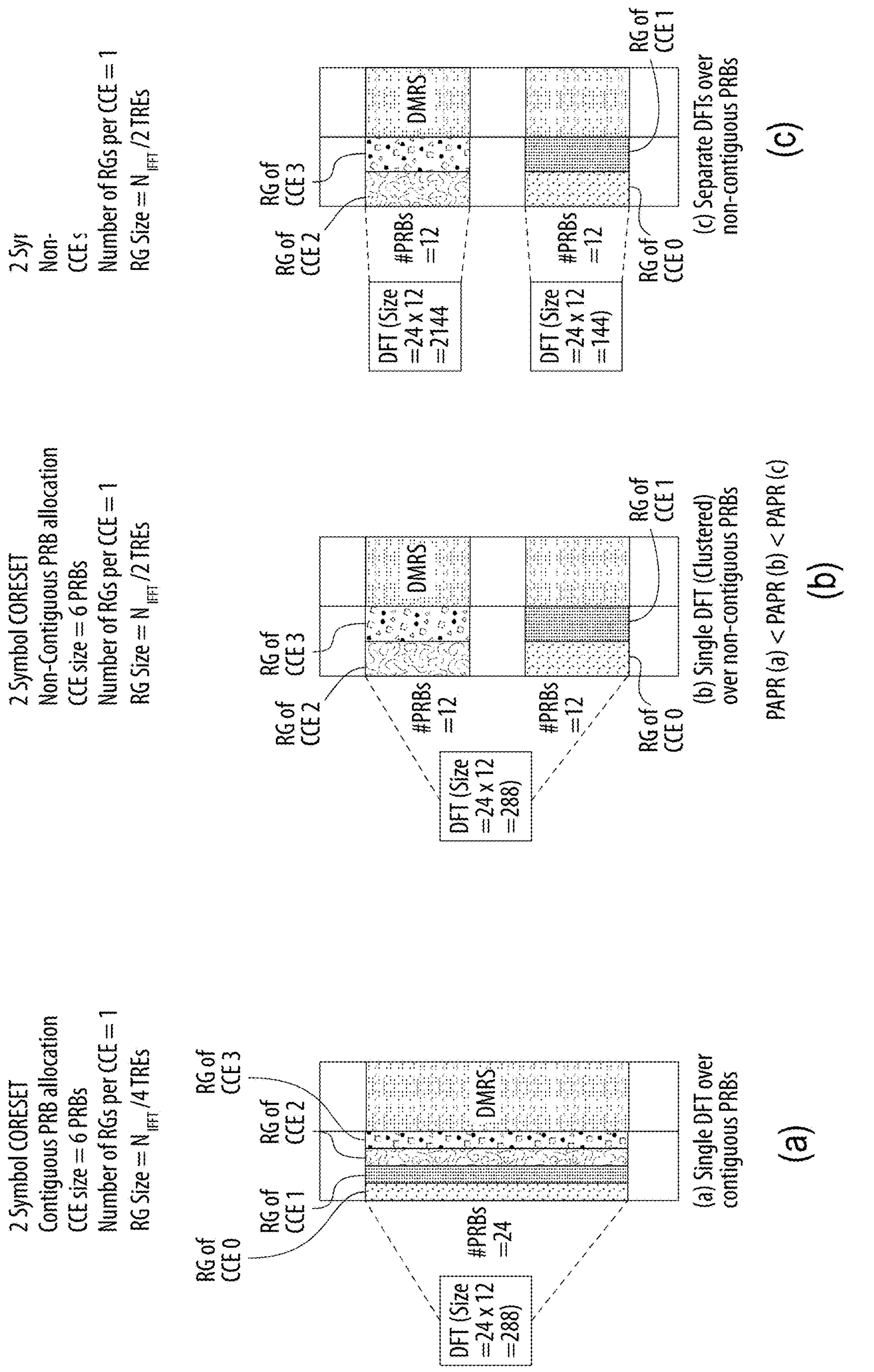
FIG. 5K shows examples of 2 symbol CORESET with contiguous and non-contiguous PRB allocation.

An illustrative example of a 2 symbol CORESET with 24 PRBs is shown in FIG. 5K with contiguous and non-contiguous PRB allocation. In case of non-contiguous allocation, either single DFT (clustered DFT [8]) or separate DFT pre-coders may be applied. Out of these three different scenarios, the scenario (a) will have the lowest PAPR. Out of scenarios (b) and (c), the scenario (b) will have lower PAPR performance.

Figure 5L:
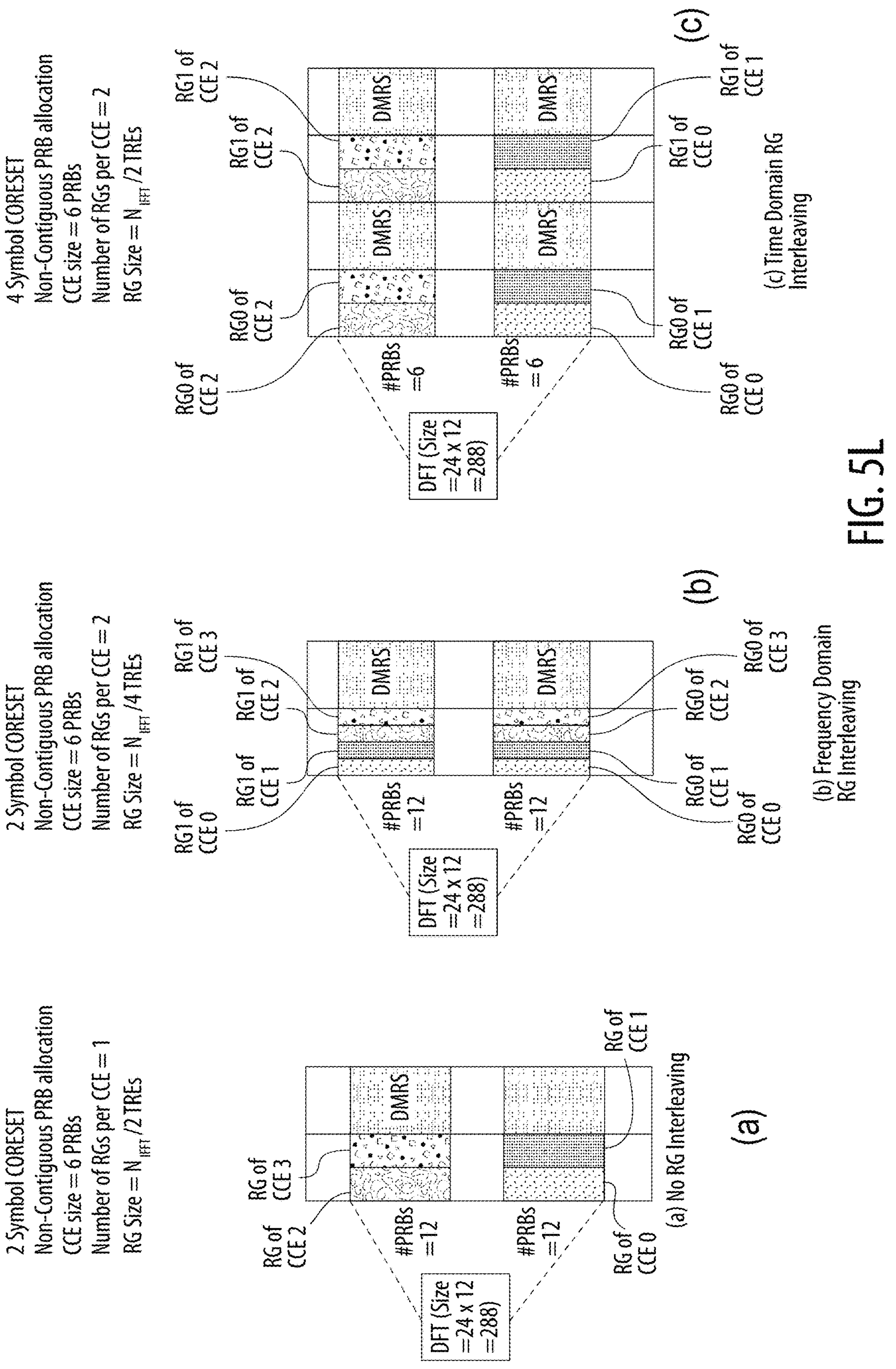
FIG. 5L shows examples of 2 and 4 symbol CORESET with non-contiguous PRB allocation and different types of RG interleaving.

An illustrative example of CORESET configurations with non-contiguous PRB allocation with different scenarios of RG interleaving is shown in FIG. 5L. FIG. 5L, part (a) shows a 2 symbol CORESET with no RG interleaving, FIG. 5L, part (b) shows a 2 symbol CORESET with frequency domain RG interleaving to achieve better frequency diversity and the FIG. 5L, part (c) shows a 4 symbol CORESET with time domain interleaving across different OFDM symbols to achieve better time diversity.

WTRU procedures related to determination of DL control channel configuration may be defined to receive a PDCCH containing downlink control information. For each DL BWP configured to a WTRU in a serving cell, the WTRU may determine the time domain configuration indicating the starting symbol indices, slot indices, or/and frame indices to be monitored to receive a PDCCH according to the configuration parameters consisting any of PDCCH monitoring periodicity and offset, PDCCH monitoring pattern, and duration, provided in the associated search space configuration, as discussed herein in the section related to WTRU Capability, CORESET Configuration, Search Space Configuration, and Design.

Given the frame, slot, and the starting symbol, the WTRU may determine the time domain configuration indicating the number of (e.g., consecutive) OFDM symbols containing PDCCH and DMRSs according to the time domain configuration provided in the associated CORESET. For the given time-domain span (e.g., consecutive OFDM symbols) associated with the CORESET, the WTRU may determine the time domain pattern/mapping of (e.g., DCI) data and DMRS symbols (e.g., indicating which symbols may be dedicated for DMRSs or/and DCI data transmissions) according to the configuration parameters including any of locations of OFDM symbols allocated to DMRS or pattern index selected from a set of preconfigured patterns, indication of additional DMRS configuration, provided in the associated CORESET configuration.

For each DL BWP configured to a WTRU in a serving cell, the WTRU may determine the frequency domain configuration indicating the, e.g., contiguous or/and non-contiguous, set of RBs (i.e., associated with the OFDM symbols allocated for the transmission of the DCI data) to be monitored for the reception of a PDCCH according to the frequency domain configuration provided in the associated CORESET or/and frequency monitoring locations provided in the associated search space.

The WTRU may determine the frequency domain configuration indicating the set of RBs, set of REs within each indicated RB, allocated over the OFDM symbols containing the DMRSs, to be monitored for channel estimation purpose for proper decoding of a PDCCH according to explicit indication of the frequency resources allocated for DMRS or a pattern index selected from a set of preconfigured patterns provided in the associated CORESET configuration. For the channel estimation purpose, the WTRU may determine the DMRS sequence according to the configuration parameters including any of sequence type(s), initializing seed(s), cyclic shift(s), and base sequence(s), provided in the associated CORESET configuration. For the channel estimation purpose, the WTRU may determine the frequency selectivity of the precoding applied by the network according to the precoding granularity provided in the associated CORESET configuration.

The WTRU may determine the CCE allocation pattern indicating the association/mapping between the CCE indices and the time-frequency resources (e.g., OFDM symbols, FRGs) of the given CORESET containing the DCI data according to the configuration parameters indicating the CCE structure, interleaving, and multiplexing configuration provided in the CORESET configuration.

The WTRU may be provided with the configuration parameters including at least one of indication of code domain multiplexing, OFDM symbol level time domain multiplexing, spreading factor (or orthogonal cover code length, $L_{occ}$), orthogonal cover codes (e.g., spreading sequences), CCE size, number of FRGs (e.g., DFTs) and the associated FRG/DFT sizes $$(N_{DFT}^{sc}),$$

indication of time domain interleaving and the associated interleaving size, indication of frequency domain interleaving and the associated interleaving size as part of the CORESET configuration. With this configuration setting, the WTRU may perform the following steps.

In a first step, the WTRU may determine the RG size ($N_{symb}$) associated with each FRG/DFT, $$N_{Symb} = \frac{N_{DFT}^{sc}}{L_{occ}}.$$

In this case each RG will be allocated the whole OFDM symbol with $L_{occ}$ number of RGs multiplexed in the code domain using different orthogonal cover codes. The number of modulated symbols associated with each RG may be reduced by a factor corresponding to the spreading factor, $L_{occ}$. In a second step, the WTRU may determine the number of RGs per CCE, $$N_{RG}^{CCE} = \frac{CCE \text{ size}}{N_{Symb}}.$$

In a third step, the WTRU may determine the CDM RG set size, i.e., number of RGs multiplexed in the code domain per FRG per OFDM symbol which is equal to $L_{occ}$. For each FRG and an OFDM symbol, associated OCCs may be assigned an index. For example, in case of 4 OCCs ($L_{occ}$=4), indices OCC 0, OCC 1, OCC 2, and OCC 3 assigned to the 4 OCCs. In a fourth step, the WTRU may determine the RG interleaving/allocation pattern within the OFDM symbol using different OCCs, across OFDM symbols and FRGs according to the OCC length, time domain and frequency domain interleaving sizes.

For code domain multiplexing with only time domain interleaving an indication of an interleaver size M (>=1), and with no frequency domain interleaving indication or with frequency domain interleaving indication of an interleaver size N(=1), the RGs associated with CCEs may be mapped to time, frequency, and code domain by first moving in the time domain, then in the frequency domain (e.g., when number of FRGs>1), and then in the code domain. For each DFT module, the total number of OFDM symbols (dedicated for DCI data transmission) may be divided into M sections. Starting with the lowest CCE index (e.g., CCE 0), the RGs associated with a CCE, starting with the first RG of the CCE, may be mapped first in the time domain to OFDM symbols by rotating around the M sections in the increasing order of OFDM symbol indices within the first FRG using the first OCC, and then move upwards in the frequency domain to map to the OFDM symbols associated with the second FRG in the same manner, and so on. Once all the OFDM symbols and FRGs may be allocated utilizing the first OCC, the remaining RGs, in the increasing order of CCE indices, may be mapped in the same manner starting from the first OFDM symbol, first FRG, but using the second OCC, and so on.

Figure 5M:
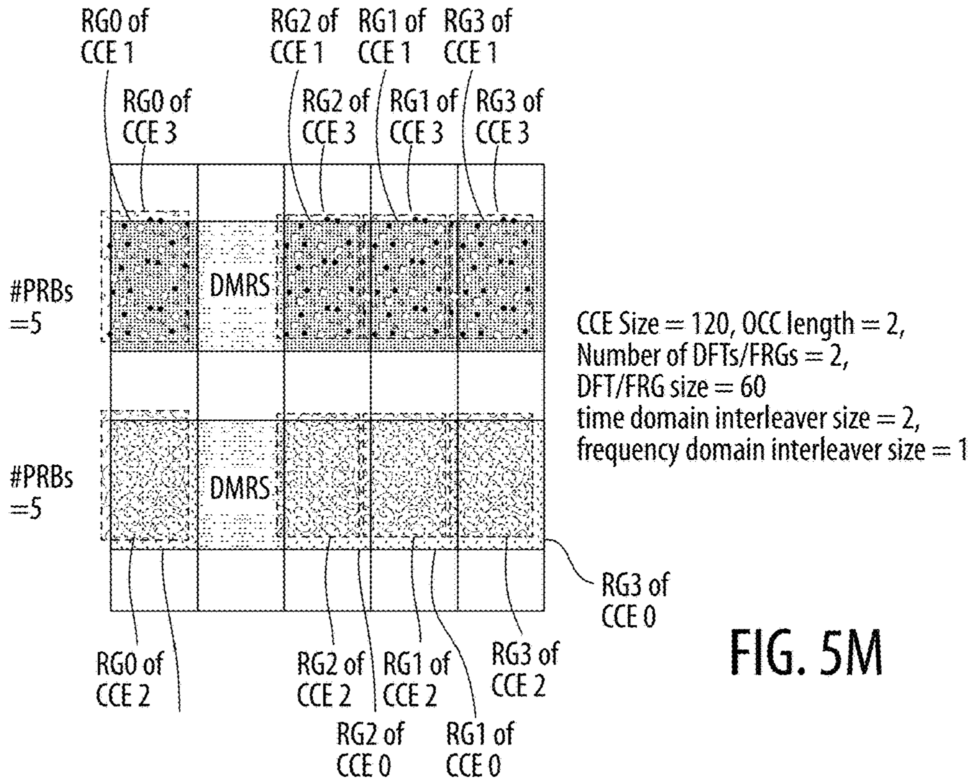
FIG. 5M shows examples of RG mapping with code domain multiplexing with time domain interleaving configuration.

An example of RG mapping with time-domain interleaving and code domain multiplexing configuration for a 5 symbol CORESET with CCE size=120, OCC length=2, number of DFTs=2 with the same DFT size of 60, M=2, and N=1 is shown in FIG. 5M. One symbol (2nd symbol) is allocated for DMRS. Given the number of OFDM symbols, number of DFTs, DFT sizes, CCE sizes, OCC length (e.g., number of OCCs), the WTRU may determine that 4 CCEs may be multiplexed within the given CORESET. In this example, since there may be 4 OFDM symbols dedicated for DCI data transmissions, and the value of M=2, two sections may be considered in the time domain where the first section consists of first and third OFDM symbols and the second section consists of fourth and fifth OFDM symbols. The mapping of RGs may be performed by first using the first OCC and utilizing the OFDM symbols of the first FRG by rotating over the two sections. After utilizing the first FRG, the OFDM symbols associated with the second FRG may be utilized in the same manner with continue using the first OCC. Once all the OFDM symbols of the second FRGs may be used, mapping may be continued by moving back to the OFDM symbols of the first FRG and then the second FRG afterwards but utilizing the second OCC.

For code domain multiplexing with only frequency domain interleaving an indication of an interleaver size N (>=1), and with no time domain interleaving indication or time domain interleaving indication of an interleaver size M (=1), the RGs associated with CCEs may be mapped to the time, frequency, and code domain by first moving in the frequency domain, then in the time domain (e.g., when number of OFDM symbols dedicated for DCI transmissions>1), and then in the code domain. For each OFDM symbol, the total number of FRGs may be divided into N sections. Starting with the lowest CCE index (e.g., CCE 0), the RGs associated with a CCE, starting with the first RG of the CCE, may be mapped first in the frequency domain by rotating around the N sections in the increasing order of FRG indices over the first OFDM symbol using the first OCC and then move rightwards in the time domain to map to the second OFDM symbol in the same manner, and so on. Once all the FRGs and OFDM symbols may be allocated utilizing the first OCC, the remaining RGs, in the increasing order of RG and CCE indices, may be mapped in the same manner starting from the first OFDM symbol and first FRG, but using the second OCC, and so on.

Figure 5N:
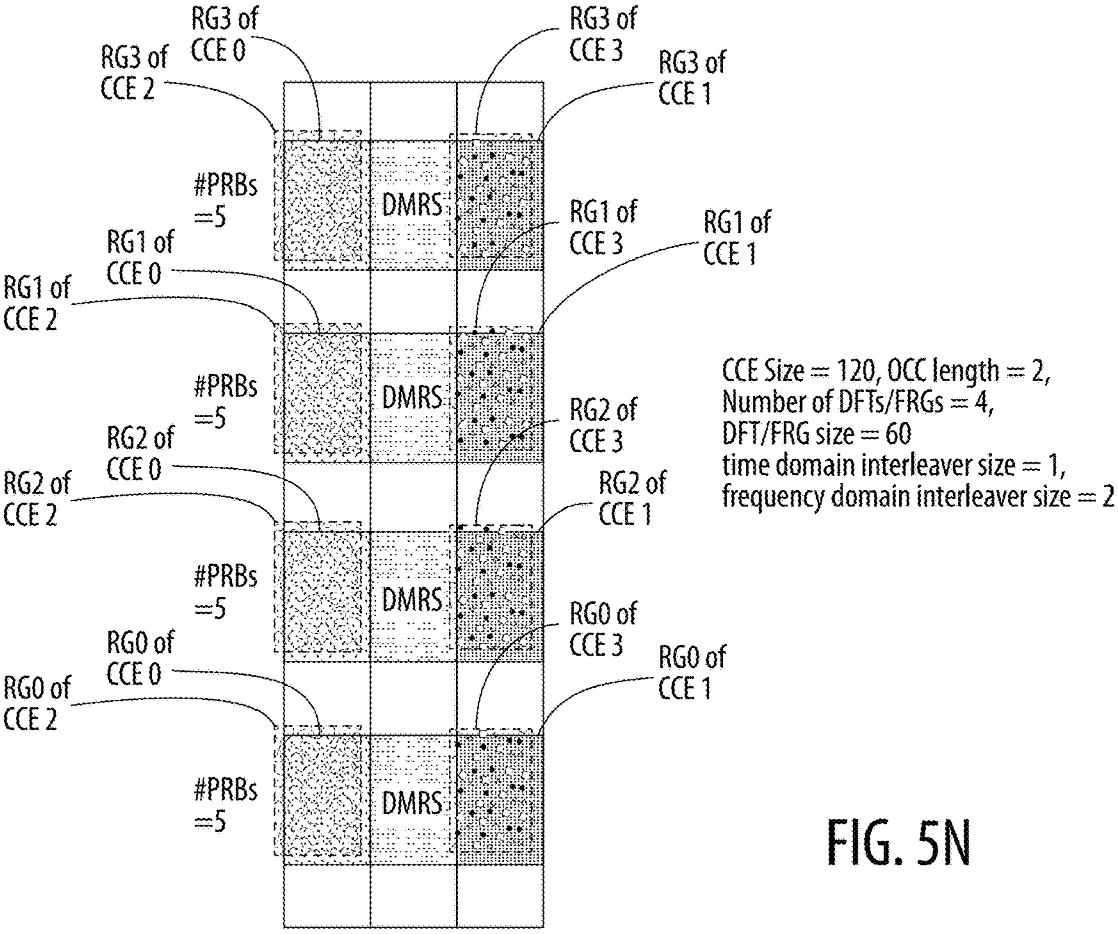
FIG. 5N shows examples of RG mapping with code domain multiplexing with frequency domain interleaving configuration.
Figure 50:
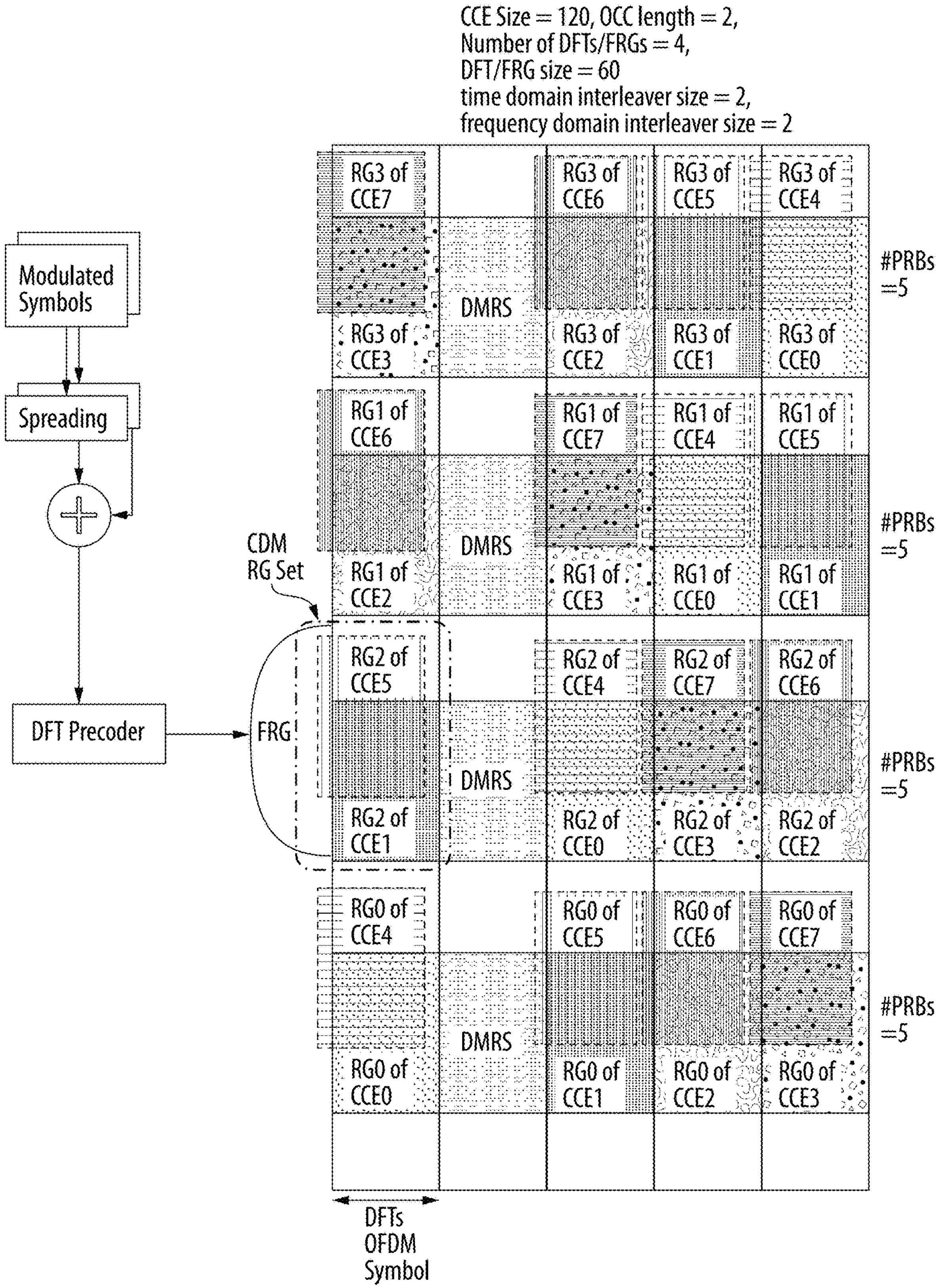

An example of RG mapping with frequency-domain interleaving and code domain multiplexing configuration for a 3 symbol CORESET with CCE size=120, OCC length=2, number of DFTs=4 with the same DFT size of 60, N=2, and M=1 is shown in FIG. 5N. One symbol ($2^{nd}$ symbol) is allocated for DMRS. Given the number of OFDM symbols, number of DFTs, DFT sizes, CCE sizes, OCC length, the WTRU may determine that 4 CCEs may be multiplexed. In this example, since there may be 4 FRGs, and the value of N=2, two sections may be considered in the frequency domain where the first section consists of first and second FRGs and the second section consists of third and fourth FRGs. The mapping of RGs may be performed by first using the first OCC and utilizing the FRGs of the first OFDM symbol by rotating over the two sections. After utilizing the first OFDM symbol, the FRGs associated with the second OFDM symbol may be utilized in the same manner with continue using the first OCC. Once all the FRGs of the second OFDM symbol may be used, mapping may be continued by moving back to the FRGs of the first OFDM symbol and then the second OFDM symbol afterwards but utilizing the second OCC.

For code domain multiplexing with both time and frequency domain interleaving an indication of interleaver size M (>=1), and with frequency domain interleaving indication of an interleaver size N (>=1), the RGs associated with CCEs may be mapped to time-frequency resources by moving in both time (e.g., when number of OFDM symbols dedicated for DCI transmissions>1) and frequency domain (e.g., when number of FRGs>1) along with utilizing configured OCCs in the code domain. For each FRG, the total number of OFDM symbols (e.g., dedicated for DCI data transmission) may be divided into M sections. For each OFDM symbol, the total number of FRGs may be divided into N sections. Starting with the lowest CCE index (e.g., CCE 0), the RGs associated with a CCE, starting with the first RG of the CCE, may be mapped by rotating around the M sections in the increasing order of OFDM symbol indices and around the N sections in the increasing order of FRG indices simultaneously using the OCCs in the increasing order of OCC indices.

An example of RG mapping with both time and frequency domain interleaving configuration with code domain multiplexing is shown in FIG. 5O with CCE size=120, OCC length=2, number of DFTs=4 with the same DFT size of 60, M=2, and N=2. Given the number of OFDM symbols, number of DFTs, DFT sizes, CCE sizes, OCC length, the WTRU may determine that 8 CCEs may be multiplexed within the given CORESET. In this example, since there may be 4 OFDM symbols dedicated for DCI data, and there may be 4 FRGs, with value of M and N equal to 2, the mapping of RGs may be rotated over 2 sections of OFDM symbols (first section consists of first and third OFDM symbols and second section consist of fourth and fifth OFDM symbols) and 2 sections of FRGs (first section consists of first and second FRGs and second section consist of third and fourth FRGs) simultaneously, first using the first OCC and then second OCC, and so on. RGs of each CCE, starting from the lowest index, may be first mapped using the to the next available OFDM symbol (with the lowest FRG) then move to the next OFDM symbol and FRG following the rotation with M=N=2. The mapping of RGs over all the OFDM symbols and FRGs may be performed first using the first OCC. Once all the OFDM symbols and FRGs may be utilized, the remaining RGs may be mapped using the second OCC in the same manner (e.g., starting from the lowest OFDM symbol and FRG).

In a fifth step, the WTRU may determine the CCE indices for aggregation level L indicated in the search space corresponding to each PDCCH candidate, for example, according to Equation (D) herein.

The WTRU may then receive a PDCCH and decode a DCI through a PDCCH candidate based on the received and the determined configurations. The reception of the PDCCH may further comprise performing of an IDFT on the FRGs and OFDM symbols associated with the PDCCH candidate based on determined CCE indices, number of RGs per CCE, and CDM RG set allocation pattern. It may further comprise the extraction and de-spreading of the RGs corresponding to the PDCCH candidate based on determined correspondence of RGs per CDM RG set to OCCs. Additionally, it may comprise demodulation of the symbols received over all the RGs associated with the PDCCH candidate, detection of a DCI format, and decoding of the DCI.

The WTRU may be provided the configuration parameters including at least one of indication of code domain multiplexing, CCE size, number of RGs per CCE $$(N_{RG}^{CCE}),$$

orthogonal cover codes (e.g., spreading sequences), number of FRGs (e.g., DFTs) and the associated FRG/DFT sizes $$(N_{DFT}^{sc}),$$

indication of time domain interleaving and the associated interleaving size, indication of frequency domain interleaving and the associated interleaving size as part of the CORESET configuration. With this configuration setting, the WTRU may perform the following steps:

In a first step, the WTRU may determine the RG size ($N_{Symb}$) associated with each FRG/DFT, $$N_{Symb} = \frac{CCE \text{ Size}}{N_{RG}^{CCE}}.$$

In a second step, the WTRU may determine the OCC length (number of OCCs) used for code domain multiplexing per FRG per OFDM symbol, $$L_{occ} = \frac{N_{DFT}^{sc}}{N_{Symb}}.$$

In additional steps (e.g., a third through sixth steps), the WTRU may be same as given in the previous embodiments of code domain multiplexing.

The WTRU may be provided the configuration parameters including at least one of indication of code domain multiplexing, spreading factor (or orthogonal cover code length, $L_{occ}$), number of RGs per CCE $$(N_{RG}^{CCE}),$$

orthogonal cover codes (e.g., spreading sequences), number of FRGs (e.g., DFTs) and the associated FRG/DFT sizes $$(N_{DFT}^{sc}),$$

indication of time domain interleaving and the associated interleaving size, indication of frequency domain interleaving and the associated interleaving size as part of the CORESET configuration. With this configuration setting, the WTRU may perform any combination of the following steps. In a first step, the WTRU may the WTRU may determine the RG size ($N_{symb}$) associated with each FRG/DFT, $$N_{Symb} = \frac{N_{DFT}^{sc}}{L_{occ}}.$$

In a second step, the WTRU may determine the CCE size, $$CCE\ \text{Size} = N_{RG}^{CCE} \times N_{Symb}.$$

In additional steps (e.g., a third through sixth steps), the WTRU may be same as given in the previous embodiments of code domain multiplexing.

The WTRU may be provided the configuration parameters including at least one of indication of code domain multiplexing, code domain multiplexing with TRE block level time domain multiplexing, spreading factor (or orthogonal cover code length, $L_{occ}$), CCE size, number of RGs per CCE $$(N_{RG}^{CCE}),$$

orthogonal cover codes (e.g., spreading sequences), number of FRGs (e.g., DFTs) and the associated FRG/DFT sizes $$(N_{DFT}^{sc}),$$

indication of time domain interleaving and the associated interleaving size, and/or indication of frequency domain interleaving and the associated interleaving size as part of the CORESET configuration. With this configuration setting, the WTRU may perform any combination of the following steps.

In a first step, the WTRU may determine the RG size ($N_{symb}$) associated with each FRG/DFT, $$N_{Symb} = \frac{CCE\ \text{Size}}{N_{RG}^{CCE}}.$$

In a second step, the WTRU may determine a CDM RG set size, i.e., the number of RGs multiplexed in the code domain per FRG per OFDM symbol, which is equal to $L_{occ}$. In a third step, the WT RU may determine the number of CDM RG sets multiplexed in the time domain for each FRG, $$N_{Mux}^{DFT} = \frac{N_{DFT}^{sc}}{L_{occ} \times N_{Symb}}$$

In this case each CDM RG set may be allocated a portion of the symbol in the time domain with $L_{occ}$ number of RGs multiplexed in the code domain using different orthogonal cover codes.

In a fourth step, the WTRU may determine the number of TREs per TRE block (i.e., associated with each CDM RG set) as $L_{occ} \times N_{Symb}$ times the ratio between IFFT and DFT modules' sizes, where IFFT module size may be preconfigured or signaled via higher layer signaling (e.g., RRC) or SI. In a fifth step, the WTRU may determine the number of TRE blocks within each FRG as the product of the determined $$N_{Mux}^{DFT}$$

and the number of OFDM symbols allocated for DCI. For each FRG, each TRE block may be assigned an index according to the procedure described earlier in this section. In a sixth step, the WTRU may determine the RG interleaving/allocation pattern within the OFDM symbol using different OCCs, across OFDM symbols and FRGs according to the OCC length, time domain and frequency domain interleaving sizes.

Code domain multiplexing with only time domain interleaving including an indication of an interleaver size M (>=1), and with no frequency domain interleaving indication or with frequency domain interleaving indication of an interleaver size N(=1), the RGs associated with CCEs may be mapped to time, frequency, and code domain by first moving in the time domain, then in the frequency domain (e.g., when number of FRGs>1), and then in the code domain. For each DFT module, the total number of TRE blocks available over the OFDM symbols containing the DCI data may be divided into M sections. Starting with the lowest CCE index (e.g., CCE 0), the RGs associated with a CCE, starting with the first RG of the CCE, may be mapped first in the time domain to TRE blocks by rotating around the M sections in the increasing order of TRE block indices within the first FRG using the first OCC, and then move upwards in the frequency domain to map to the TRE blocks associated with the second FRG in the same manner, and so on. Once all the OFDM symbols and FRGs may be allocated utilizing the first OCC, the remaining RGs, in the increasing order of CCE indices, may be mapped in the same manner starting from the first OFDM symbol, first FRG, but using the second OCC, and so on.

Code domain multiplexing with only frequency domain interleaving including an indication of an interleaver size N (>=1), and with no time domain interleaving indication or time domain interleaving indication of an interleaver size M (=1), the RGs associated with CCEs may be mapped to the time, frequency, and code domain by first moving in the frequency domain, then in the time domain (e.g., when number of TRE blocks>1), and then in the code domain. For each TRE block, the total number of FRGs may be divided into N sections. Starting with the lowest CCE index (e.g., CCE 0), the RGs associated with a CCE, starting with the first RG of the CCE, may be mapped first in the frequency domain by rotating around the N sections in the increasing order of FRG indices over the first TRE block using the first OCC and then move rightwards in the time domain to map to the TREs of the second TRE block of the FRGs in the same manner, and so on. Once all the FRGs and OFDM symbols may be allocated utilizing the first OCC, the remaining RGs, in the increasing order of RG and CCE indices, may be mapped in the same manner starting from the first TRE block and first FRG, but using the second OCC, and so on.

Code domain multiplexing with both time and frequency domain interleaving including an indication of an interleaver size M (>=1), and with frequency domain interleaving indication of an interleaver size N (>=1), the RGs associated with CCEs may be mapped to time-frequency resources by moving in both time (e.g., when number of TRE blocks>1) and frequency domain (e.g., when number of FRGs>1) along with utilizing configured OCCs in the code domain. For each FRG, the total number of TRE blocks available over the OFDM symbols dedicated for the DCI data may be divided into M sections. For each TRE block, the total number of FRGs may be divided into N sections. Starting with the lowest CCE index (e.g., CCE 0), the RGs associated with a CCE, starting with the first RG of the CCE, may be mapped by rotating around the M sections in the increasing order of TRE block indices and around the N sections in the increasing order of FRG indices simultaneously using the OCCs in the increasing order of OCC indices.

In a seventh step, the WTRU may determine the CCE indices for aggregation level L indicated in the search space corresponding to each PDCCH candidate, for example, according to Equation (D) herein.

WTRU procedures related to determination and update of DL control channel configuration may consider the adaptation of the configuration based on any of WTRU complexity/capability (e.g., including power saving requirements), network energy efficiency, channel characteristics, and/or control channel congestion. A WTRU may receive a configuration of a search space and/or a CORESET to monitor for a PDCCH. The WTRU may determine a power consumption overhead, e.g., due to need to utilize multiple IDFT modules based on received configuration, that may not be tolerated for a certain period of time.

The WTRU may be looking for coverage extension or the channel characteristics may be changed significantly either due to blockage or change in orientation, etc. The network may trade-off its energy efficiency for the reduction in control channel congestion, e.g., through reduction in CCE aggregation level to accommodate more control channels but utilizing multiple smaller DFTs to enable higher precoding granularity. The DL control channel configuration adaptation may be based on any of measurement reporting or indication of a preferred configuration (e.g., from a list of signaled and/or predefined configurations) from the WTRU.

The WTRU may use a first configuration(s) of search space and/or CORESET, e.g., received in any of RRC and system information messages, to monitor for a PDCCH and receive DCIs. The WTRU may perform channel measurements including any of a received signal strength, a coherence bandwidth, a coherence time, a delay spread, and a Doppler spread. The WTRU may determine any of a first condition on the measurements and a second condition on power consumption. The WTRU may transmit an indication of a preferred second configuration of search space and/or CORESET. The WTRU may receive a third configuration of search space and/or CORESET to monitor for the PDCCH and receive DCIs.

The first configuration(s) of search space and/or CORESET may be default configurations that are independent of any of a WTRU's capability, and existing and/or prior channel conditions. For example, the first configuration(s) may be determined based on a received pdcch-ConfigSIB1 (e.g., determines a common search space and a CORESET #0) in MIB or a received PDCCH-ConfigCommon in BWP-DownlinkCommon in SIB1. In a second technical realization, the first configuration(s) of search space and/or CORESET may be received in response to a WTRU reporting of its capability. For example, the first configuration(s) may be determined based on a received PDCCH-Config (e.g., configured WTRU specific PDCCH parameters such as controlResourceSet) in BWP-DownlinkDedicated in any of an RRCSetup, RRCResume, or an RRCReconfiguration messages.

The WTRU capability information may include anyone or more of the parameters described herein. The parameters may be indicated to the network explicitly or as an index to a set/tuple of known values at both the WTRU and the network. The one or more parameters may also be indicated to the network as a set of one or more index(-ices), each corresponding to a set/tuple of the known values. For example, the WTRU may report explicitly to the network a set of tuples in the following format $$\{(N_{FRG}, N_{DFT}^{sc}, N_{pdcch}^{candidates})\},$$

e.g., {(1, 120, 10), (2, 60, 10), . . . }. Alternatively, the WTRU may report a set of indices, e.g., $\{s_1, s_2, \ldots\}$ where the first index, $s_1$, may be used to indicate a first tuple of values, e.g., $$(N_{FRG} = 1, N_{DFT}^{sc} = 120, N_{pdcch}^{candidates} = 10),$$

and the second index, $s_2$ may be used to indicate a second tuple of values, e.g., $$N_{FRG} = 2, N_{DFT}^{sc} = 60, N_{pdcch}^{candidates} = 10),$$

. . . etc., and the mapping between the indices values and the tuples is known apriori at both the WTRU and the network.

The first configuration(s) of search space and/or CORESET may be dependent on the one or more parameters indicating the channel status between the WTRU and the network which may be signaled by the WTRU, to the network, in one or more prior measurement reports. The channel status parameters may include/indicate explicitly or implicitly any of a received signal strength measurement, a coherence bandwidth, a coherence time, a delay spread, and a Doppler spread.

The first configuration(s) further comprises configuration of the measurements, to be performed by the WTRU for the evaluation of search space and/or CORESET configuration adaptation conditions. Alternatively, the measurement configuration may be received in a separate RRC message, e.g., RRCReconfiguration or RRCResume messages. The measurement configuration may be provided as part of system information, e.g., as part of SIB2 or SIB11, when the WTRU is RRC IDLE/INACTIVE state. The measurement configuration may also include one or more indication(s) of any of the evaluation conditions and corresponding thresholds (e.g., adaptation indication criteria). Alternatively, the evaluation conditions and/or corresponding thresholds (e.g., adaptation indication criteria) may be preconfigured (e.g., apriori known) at the WTRU.

The WTRU may receive an indication of activation/deactivation (e.g., enablement/disablement) of search space and/or CORESET configuration adaptation in any of L1 message (e.g., a DCI) and an RRC message (e.g., RRCReconfiguration message). For example, the WTRU may receive a DCI indicating deactivation (e.g., disablement) of search space and/or CORESET adaptation. For example, the WTRU may receive an RRCReconfiguration message indicating activation of search space and/or CORESET adaptation. The RRCReconfiguartion message may further include an update of the measurement configuration and/or adaptation indication criteria.

The first condition on the measurements evaluates a measurement of received signal strength against any of a first threshold and a second threshold. In an example, the WTRU determines the received signal strength below the first threshold and transmits an indication of a second configuration that enables precoding with finer granularity. The WTRU determines the received signal strength above the second threshold and transmits an indication of a second configuration that enables precoding with coarse granularity. In one alternative, the first condition on the measurements evaluates a measurement of channel coherence bandwidth (e.g., or delay spread) against a third threshold. In an example, the WTRU determines the coherence bandwidth above the third threshold and transmits an indication of a second configuration of long CORESET format, e.g., to support higher mobility.

Based on the determined high coherence bandwidth, the WTRU may not benefit from the frequency diversity provided by the DFT spreading and therefore may decide to select a different CORESET format, e.g., long format, with more time resources than frequency enabling the WTRU to benefit from time domain diversity (e.g., due to shorter coherence time) especially at high mobility. The first condition on the measurements evaluates (e.g., jointly) a measurement of received signal strength and a measurement of channel coherence bandwidth (e.g., or delay spread). In an example, the transmission of an indication of a second configuration of long CORESET format may be subject to determination of the received signal strength below the first threshold and the coherence bandwidth above the third threshold. For all the alternatives, any one or more of the thresholds may be preconfigured at the WTRU or signaled in any of L1, MAC-CE, RRC, and system information messages.

One or more of the first condition alternatives may be considered, jointly, with the second condition on a WTRU's power status, e.g., power consumption and/or battery status and/or power saving preference. The second condition evaluates the WTRU's power status against one or more thresholds. In an example, the WTRU determines an overall power consumption above a first threshold and transmits an indication of a second configuration of smaller CORESET size (e.g., in terms in number of allocated frequency resources), smaller number of DFTs, and/or smaller number of PDCCH candidates. The condition evaluates a battery status against a second threshold. In one alternative, the second condition may be considered independently of the first condition and may be used to activate/deactivate DFT-s-OFDM based PDCCH, e.g., revert to an OFDM based design of PDCCH. For all the alternatives, any one or more of the thresholds may be preconfigured at the WTRU or signaled in any of L1, MAC-CE, RRC, and system information messages.

The indication of a preferred second configuration comprises an explicit signaling of an updated one or more parameters of the first configuration. In one alternative, the indication may be an index to a configuration from one or more configurations that may be known apriori (e.g., preconfigured) at both the WTRU and the network. The indication may be an index to a configuration from one or more configurations that may be signaled, from the network, to the WTRU in any of an RRC or system information messages. For all the alternatives, the indication of a preferred second configuration may be sent by the WTRU in any of L1 (e.g., UL control information via any of PUCCH and PUSCH), UL MAC-CE, UL RRC messages.

The third configuration may be received in any of a DCI and an RRC message (e.g., RRCReconfiguration) to be applied for the monitoring of subsequent PDCCH occasions (e.g., in a subsequent slot, subframe, frame, or DRX cycle). In a tenth technical realization, the received third configuration may be the same as the indicated second configuration. In an alternative, the received third configuration comprises part (e.g., one or more parameters' values) of the indicated second configuration.

In some examples, the WTRU may use a first configuration(s) of search space and/or CORESET, e.g., received in any of RRC and system information messages, to monitor for a PDCCH and receive DCIs. The WTRU may perform channel measurements including any of a received signal strength, a coherence bandwidth, a coherence time, a delay spread, and a Doppler spread. The WTRU may transmit a measurement report including any of channel state information and power status. The WTRU may receive a second configuration of search space and/or CORESET to monitor for the PDCCH and receive DCIs.

The WTRU performs the measurement based on measurement configuration received in any of RRC (e.g., measConfig in RRCReconfiguration or RRCResume, and MeasIdleConfig in RRCRelease) and system information (e.g., MeasIdleConfigSIB in SIB11) messages. The measurement configuration may include parameters that configures the measurements of any of a received signal strength measurement, a coherence bandwidth, a coherence time, a delay spread, and a Doppler spread, to be reported as part of channel state information.

The measurement report transmission may be periodic according to received measurement configuration. In one alternative, the measurement report transmission may be triggered by events that may be configured as part of a received measurement configuration. The triggering events may be determined by the WTRU as any of a first condition on the measurements and a second condition on power status as in the previous embodiment. The measurement report transmission may be triggered by a received request from the network in any of L1 (e.g., a DCI) or MAC-CE signaling. For all the alternatives, the measurement report may be transmitted by the WTRU in any of L1 (e.g., UL control information via any of PUCCH and PUSCH), UL MAC-CE, UL RRC messages.

The second configuration (e.g., determined based on the transmitted measurement report) may be received in any of L1-signal (e.g., a DCI) and an RRC message (e.g., RRCReconfiguration) to be applied for the monitoring of subsequent PDCCH occasions (e.g., in a subsequent slot, subframe, frame, or DRX cycle).

The search space and CORESET configuration may include any of the parameters that may be presented herein for the WTRU capability, CORESET configuration, Search Space configuration, and related design considerations, and DL control channel configuration may be determined according to any of the embodiments presented herein for the determination of DL control channel configuration.

The WTRU may be configured to perform a method of operation where it receives a first configuration information indicating a control channel element (CCE) size, a spreading factor, and an indication of code domain multiplexing (CDM). The WTRU determines a second configuration information based on the received first configuration information. The second configuration information may include a resource group (RG) size and a correspondence between the RG size for a CDM RG set and one or more orthogonal cover codes (OCCs). The WTRU may determine a CDM RG set allocation pattern across one or more orthogonal frequency division multiplexing (OFDM) symbols, such as discrete Fourier transform (DFT) spread OFDM (DFT-s-OFDM) symbols, and one or more frequency resource groups (FRGs) based on the second configuration information. The WTRU may receive a PDCCH transmission and perform an inverse discrete Fourier transform (IDFT) on a plurality of FRGs and the OFDM/DFT-s-OFDM symbols associated with the PDCCH transmission based on the CDM RG set allocation pattern. The WTRU de-spreads a set of RGs corresponding to the received PDCCH transmission based on the correspondence of RGs per CDM RG set to OCCs. The WTRU may decode a downlink control information (DCI) in the received PDCCH transmission based on the de-spread set of RGs. The first configuration information is contemplated to be static, or at least semi-static. The second configuration information may include dynamic adaptation of configuration for decoding of the DCI in the PDCCH transmission.

The WTRU may be configured to demodulate the OFDM/DFT-s-OFDM symbols received over one or more RGs associated with the PDCCH transmission to determine DL resource scheduling information. The WTRU may further receive a physical downlink shared channel (PDSCH) transmission based on the DL resource scheduling information. The first configuration information may include a search space configuration or a control resource set (CORESET) format. The first configuration information may include a number and size of one or more frequency resource groups (FRGs). The second configuration information may include a number of RGs per control channel elements (CCE) and a plurality of CDM RG sets. The WTRU may further determine the second configuration information based on correspondence of the RGs per set to OCCs, a preconfigured list of OCCs, and a preconfigured mapping for the RG size to the OOCs. As indicated, one or more of the FRGs may be associated with a single DFT module.

The WTRU may be configured to determine CCE indices for each PDCCH candidate of the PDCCH transmission based on an aggregation level and a pre-configured hash function. The WTRU may perform the IDFT on the plurality of FRGs and the OFDM/DFT-s-OFDM symbols associated with the PDCCH transmission based on determined CCE indices, a number of RGs per CCE, and the CDM RG set allocation pattern. The WTRU may be configured to demodulate the OFDM/DFT-s-OFDM symbols received over all RGs associated with the PDCCH transmission, detect a DCI format associated with the PDCCH transmission and decode the DCI based on the detected DCI format.

Figure 6:
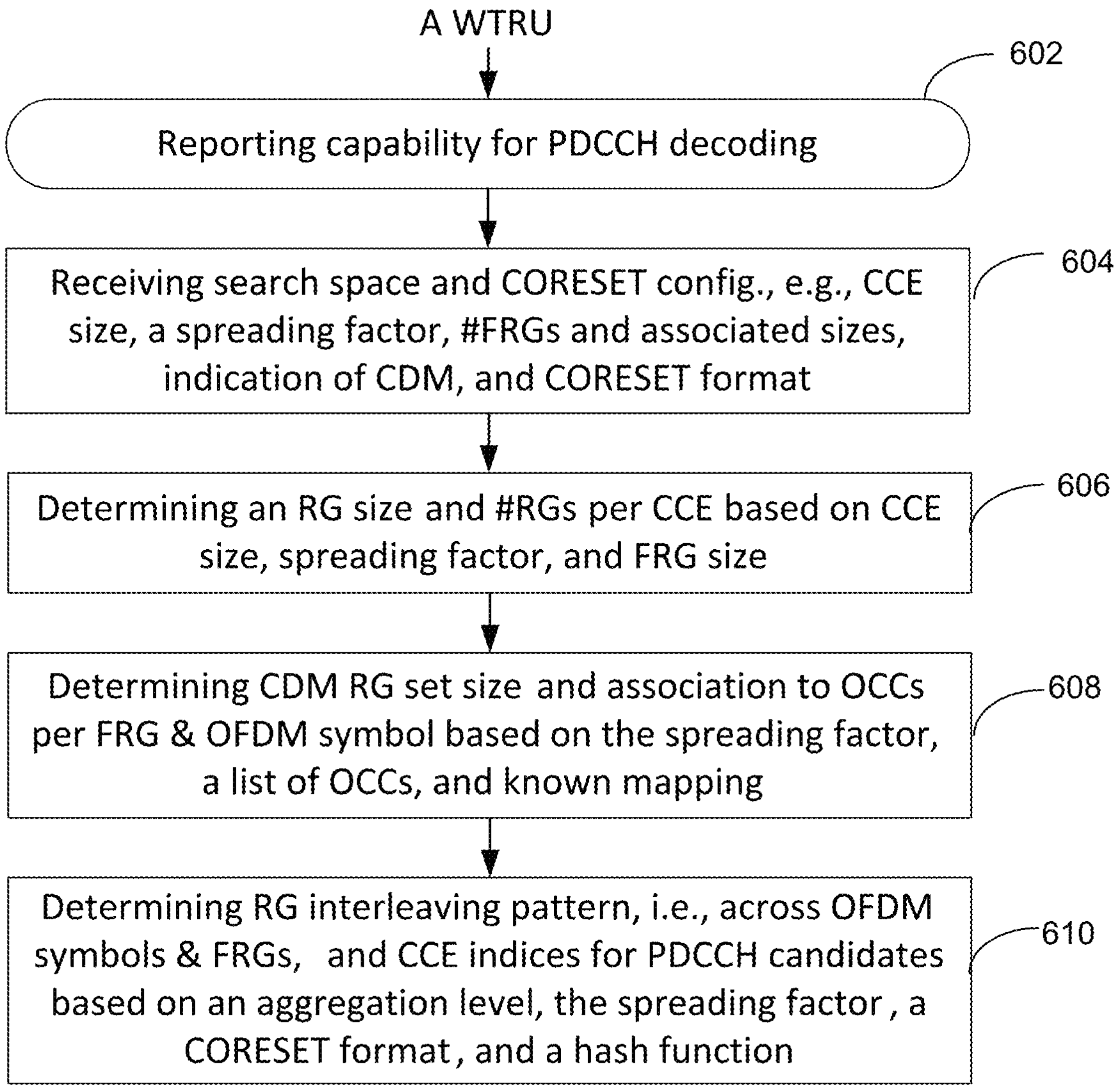
FIG. 6 is a flow chart illustrating an example of WTRU actions to determine configuration for proper decoding of PDCCH candidates considering code domain multiplexing (CDM).

DL control channel configuration may include code domain multiplexed RGs/CCEs. As shown in FIG. 6, a WTRU may determine a configuration for proper decoding of PDCCH candidates considering code domain multiplexing. At 602, the WTRU may report capability for PDCCH decoding including supported number of DFT modules and size(s). At 604, the WTRU may receive a PDCCH configuration as a search space and CORESET configurations. The search space and CORESET configuration may include any combination of a CCE size, a spreading factor (or an orthogonal code length), a number of FRGs (e.g., DFTs) and associated sizes, an indication of code domain multiplexing, and/or a CORESET format. At 606, the WTRU may determine RG size(s) and number of RGs per CCE based on configured spreading factor, CCE size, and/or FRG size. At 608, the WTRU may determine the CDM RG set size and association between RGs and orthogonal cover codes (OCCs) per FRG & OFDM symbol based on the configured spreading factor and preconfigured list of OCCs and preconfigured or known mapping for the RG size to the OOCs. At 610, the WTRU may determine an RG allocation pattern (e.g., across OFDM symbols and FRGs) and CCE indices corresponding to each PDCCH candidate based on an aggregation level, the spreading factor, a CORESET format, and/or a pre-configured hash function.

The WTRU may further include maximum supported number of PDCCH candidates and maximum number of non-overlapped CCEs supported per slot per serving cell. The WTRU may determine the RG size of a CCE as the ratio between the configured FRG size and the configured spreading factor. The WTRU may determine the number of RGs per CCE as the ratio between the configured CCE size and the determined RG size. The WTRU may further determine the aggregation level according to an indicated maximum aggregation level in the configured search space and the pre-configured hash function, such as that defined in Equation (D) herein. The CORESET configuration may further include a CORESET format indicating any of a number of OFDM symbols for DCI, a number of OFDM symbols for DMRS, a total number of OFDM symbols for DCI and DMRS, OFDM symbol indices for DCI, and OFDM symbol indices for DMRS. The CORESET format may include frequency domain configuration indicating RE/RB mapping pattern for DMRSs and DMRS sequence parameters. The CORESET format may further include an indication of any of a time domain interleaving, a frequency domain interleaving, a time domain interleaving size, and a frequency domain interleaving size. In embodiments the CORESET format may include a precoding granularity as any of FRG-level granularity or CORESET-level granularity. The WTRU may also determine the RG interleaving pattern, i.e., across OFDM symbols and FRGs, based on any of the number of code-domain multiplexed RGs per FRG, the number of OFDM symbols for DCI, the number of FRGs, the time domain interleaving size, and the frequency domain interleaving size.

Figure 7:
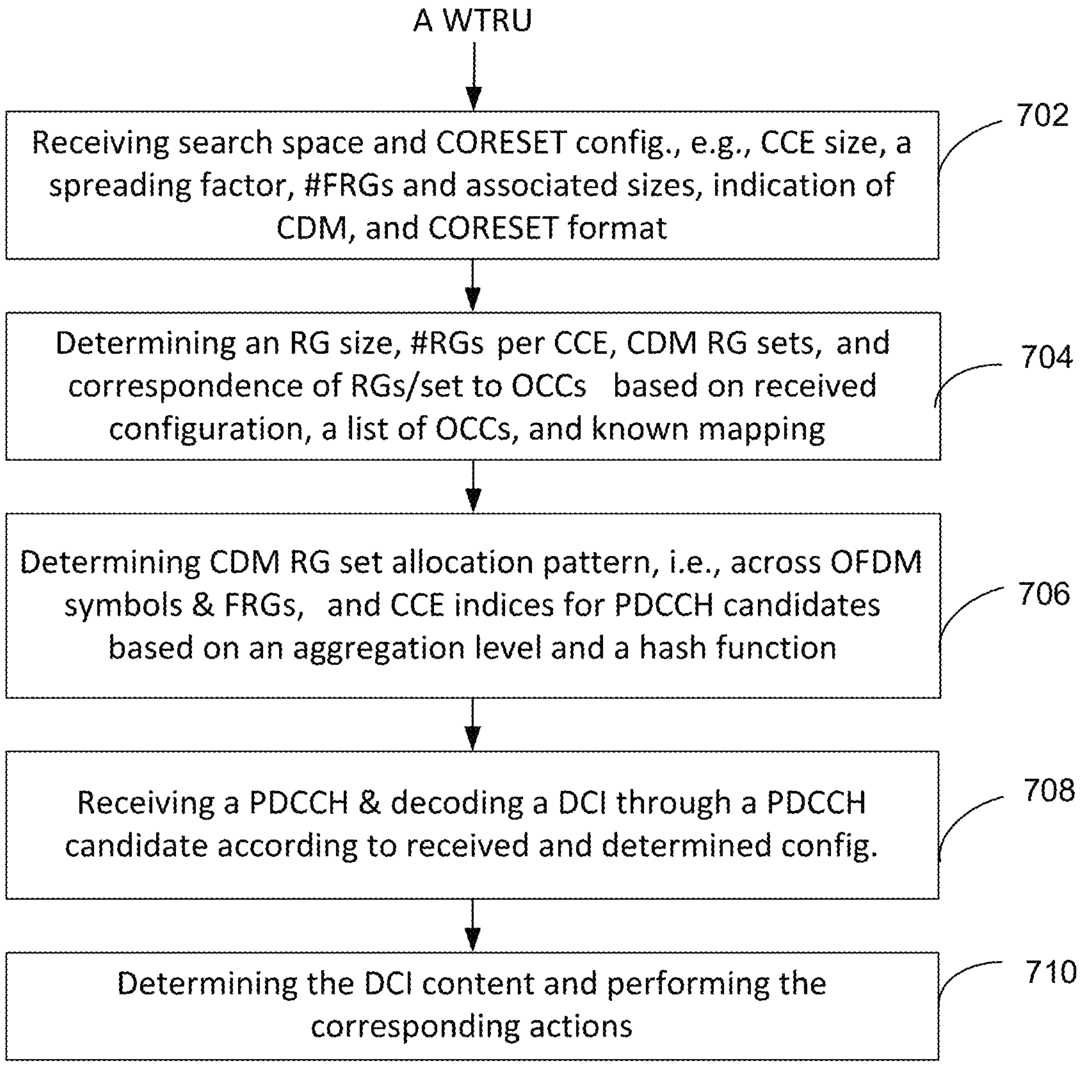
FIG. 7 is a flow chart illustrating another example of WTRU actions to determine configuration for proper decoding of PDCCH candidates considering code domain multiplexing (CDM).

In embodiments, such as that illustrated in FIG. 7, a WTRU determines configuration for proper decoding of PDCCH candidates considering code domain multiplexing. At 702, the WTRU may receive a search space and CORESET configuration. The search space and CORESET configuration may include a CCE size, a spreading factor, a number/size of FRGs, an indication of CDM, and/or a CORESET format. At 704, the WTRU may determine an RG size, a corresponding number of RGs per CCE, CDM RG sets, and/or correspondence of RGs per set to OCCs based on received configuration, a preconfigured list of OCCs, and a preconfigured or known mapping for the RG size to the OOCs. At 706, the WTRU may determine a CDM RG set allocation pattern across OFDM symbols and FRGs based on the CORESET format and determined configuration. The WTRU may determine CCE indices for each PDCCH candidate based on an aggregation level and a pre-configured hash function. At 708, the WTRU may receive a PDCCH and decode a DCI through a PDCCH candidate based on received and determined configuration. At 710, the WTRU may determine the DCI content. The WTRU may perform the corresponding actions.

The reception of a PDCCH may further include performing IDFT on the FRGs and OFDM symbols associated with the PDCCH candidate based on determined CCE indices, number of RGs per CCE, and CDM RG set allocation pattern; extracting/de-spreading the RGs corresponding to the received PDCCH candidate based on determined correspondence of RGs per CDM RG set to OCCs, and demodulating the symbols received over all RGs associated with the PDCCH candidate, detecting a DCI format, and decoding the DCI. The DCI content may be a downlink resource scheduling information, and the corresponding action may be reception of a PDSCH based on assigned downlink resources determined from the scheduling information. The DCI content may be an uplink grant or resource scheduling information, and the corresponding action may be transmission of a PUSCH on the assigned uplink resources determined from the grant or scheduling information. Further, the DCI content may be an indication of a slot format, and the corresponding action may be the determination of the slot format.

Figure 8:
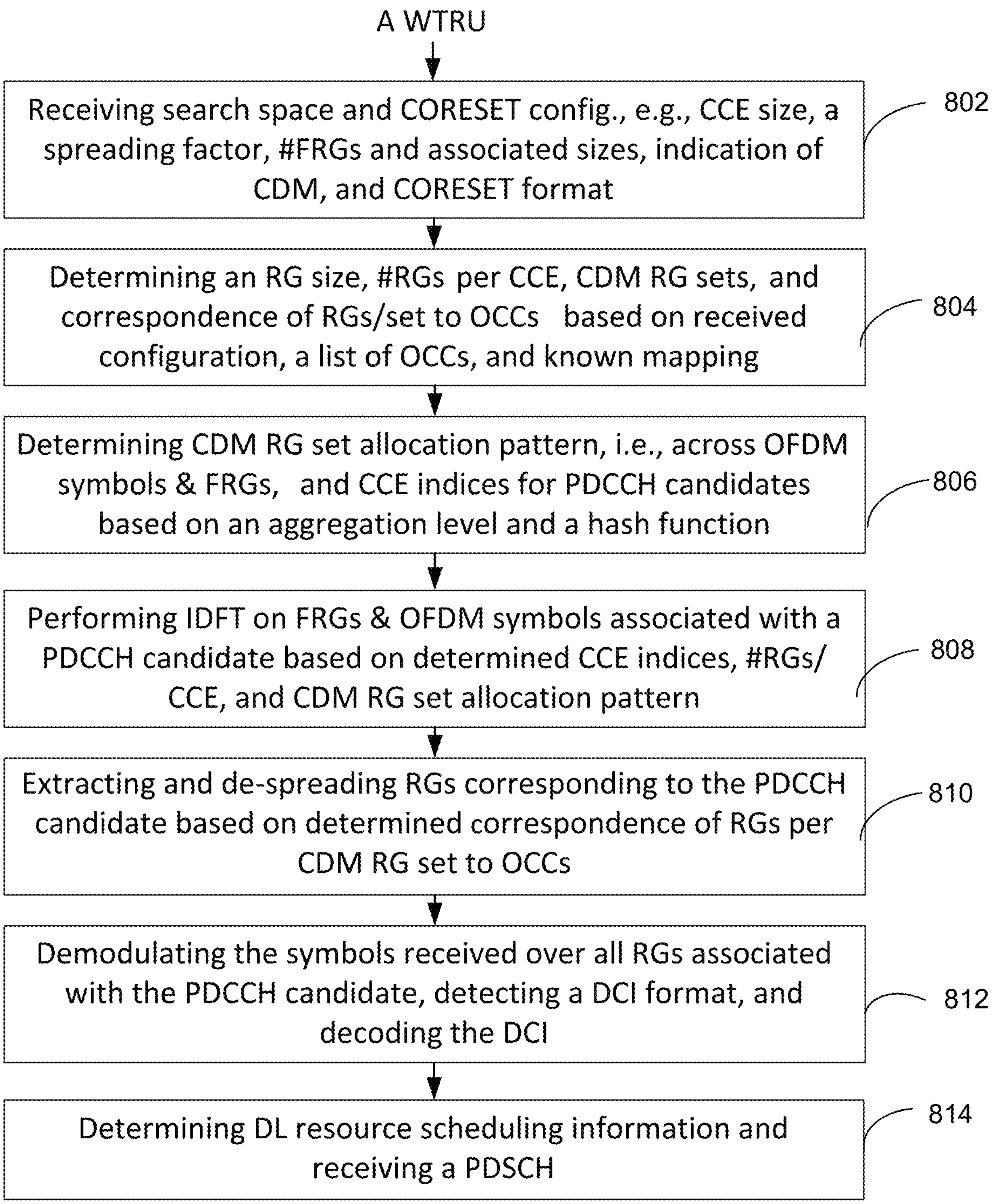
FIG. 8 is a flow chart illustrating a technical realization of WTRU actions to determine configuration for proper decoding of PDCCH candidates considering code domain multiplexing (CDM).

As illustrated in FIG. 8, a WTRU may determine a configuration for proper decoding of PDCCH candidates considering code domain multiplexing. At 802, the WTRU may receive a search space and CORESET configurations including a CCE size, a spreading factor, a number/size of FRGs, an indication of CDM, and/or a CORESET format. At 804, the WTRU may determine an RG size, a corresponding number of RGs per CCE, CDM RG sets, and correspondence of RGs per set to OCCs based on received configuration, a preconfigured list of OCCs, and/or preconfigured or known mapping for the RG size to the OOCs. At 806, the WTRU may determine CDM RG set allocation pattern across OFDM symbols and FRGs based on the CORESET format and determined configuration. The WTRU may determine CCE indices for each PDCCH candidate based on an aggregation level and a pre-configured hash function. At 808, the WTRU may perform IDFT on FRGs & OFDM symbols associated with a PDCCH candidate based on determined CCE indices, #RGs/CCE, and/or CDM RG set allocation pattern. At 810, the WTRU may extract and de-spread RGs corresponding to the PDCCH candidate based on determined correspondence of RGs per CDM RG set to OCCs. At 812, the WTRU may demodulate the symbols received over all RGs associated with the PDCCH candidate, detecting a DCI format, and/or decoding the DCI. At 814, the WTRU may determine DL resource scheduling information and receive a PDSCH.

Figure 9:
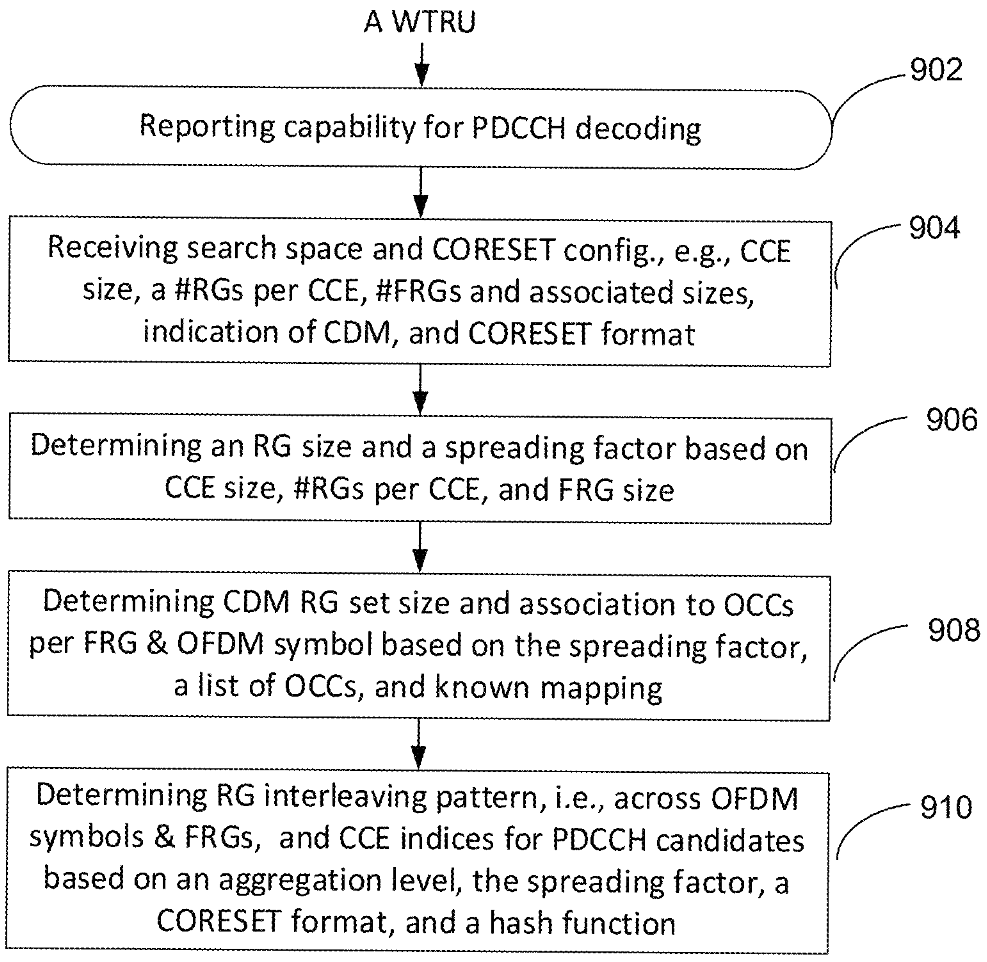
FIG. 9 is a flow chart illustrating an example of WTRU actions to determine configuration for proper decoding of PDCCH candidates considering code domain multiplexing (CDM).

As illustrated in FIG. 9, a WTRU may determine configuration for proper decoding of PDCCH candidates considering code domain multiplexing by reporting WTRU capability for PDCCH decoding. The PDCCH decoding may include the supported number of DFT modules and size(s). At 902, the WTRU may report the capability of the WTRU for PDCCH decoding. At 904, the WTRU may receive a PDCCH configuration as a search space and CORESET configuration. The search space and CORESET configuration may include a CCE size, a number of RGs per CCE, a number of FRGs (e.g., DFTs) and associated sizes, an indication of code domain multiplexing, and/or a CORESET format. At 906, the WTRU may determine the RG size(s) and spreading factor(s) based on a configured CCE size, a number of RGs per CCE, and/or a FRG size. At 908, the WTRU may determine the number of multiplexed RGs and association between RGs and orthogonal cover codes (OCCs) per FRG & OFDM symbol based on the determined spreading factor and preconfigured list of OCCs and/or a preconfigured or known mapping for the RG size to the OOCs. At 910, the WTRU may determine an RG allocation pattern (e.g., across OFDM symbols and FRGs) and CCE indices corresponding to each PDCCH candidate based on an aggregation level, the spreading factor, a CORESET format, and/or a pre-configured hash function.

The WTRU may determine the RG size of a CCE as the ratio between the configured CCE size and the configured number of RGs per CCE. Further, the WTRU may determine the spreading factor that defines code domain multiplexing per FRG & OFDM symbol, as the ratio between the configured FRG size and the determined RG size.

Figure 10:
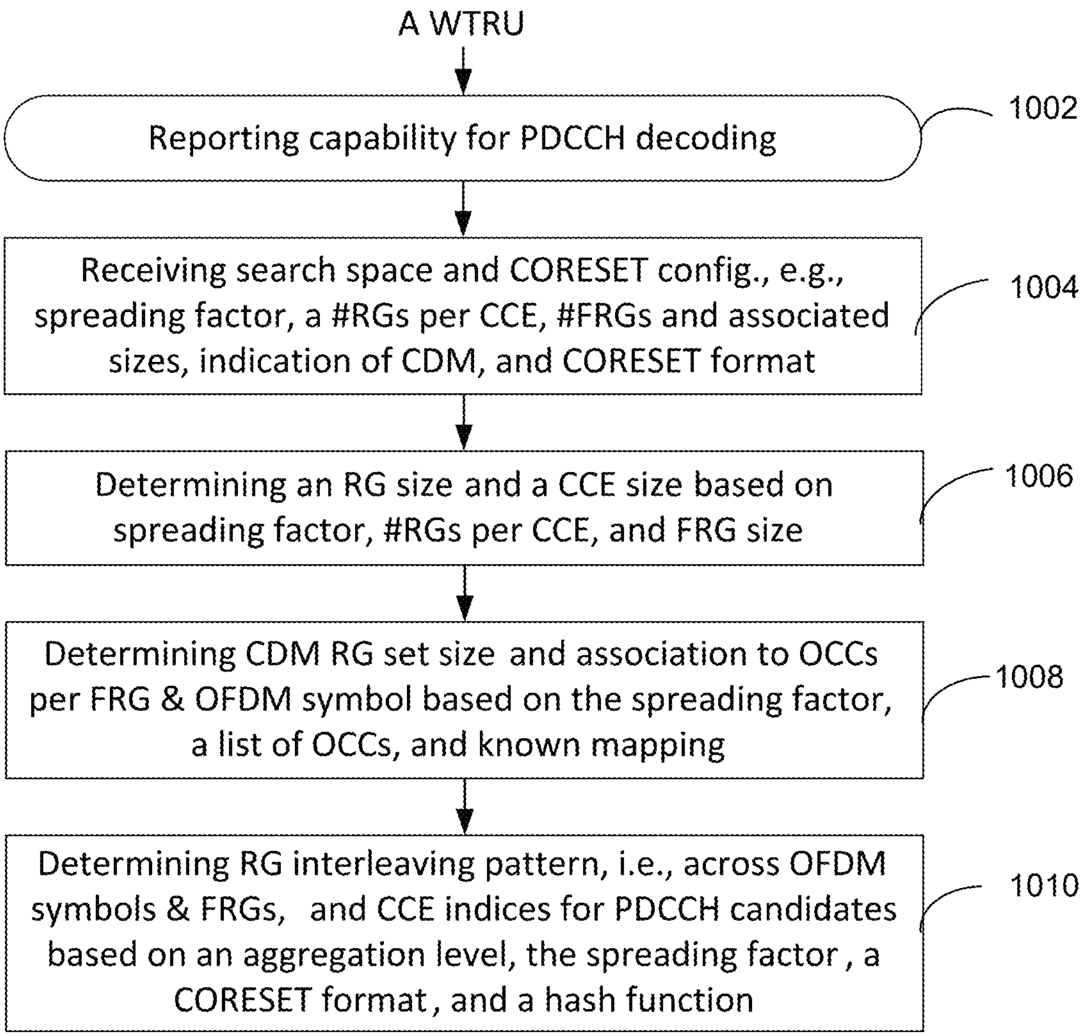
FIG. 10 is a flow chart illustrating another example of WTRU actions to determine configuration for proper decoding of PDCCH candidates considering code domain multiplexing (CDM).

As illustrated in FIG. 10, a WTRU may determine configuration for proper decoding of PDCCH candidates considering code domain multiplexing. At 1002, the WTRU may report the WTRU capability for PDCCH decoding, which may include supported number of DFT modules and size(s). At 1004, the WTRU may receive a PDCCH configuration as a search space and CORESET configuration. The search space and CORESET configuration may include a spreading factor, a number of RGs per CCE, a number of FRGs (e.g., DFTs) and associated sizes, an indication of code domain multiplexing, and/or a CORESET format. At 1006, the WTRU may determine RG size(s) and a CCE size based on one or more of the configured spreading factor, a number of RGs per CCE, and/or FRG size, At 1008, the WTRU may determine the number of multiplexed RGs and association between RGs and orthogonal cover codes (OCCs) per FRG and OFDM symbol based on the configured spreading factor and preconfigured list of OCCs and/or a preconfigured or known mapping for the RG size to the OOCs. At 1010, the WTRU may determine an RG allocation pattern (e.g., across OFDM symbols and FRGs) and CCE indices corresponding to each PDCCH candidate based on an aggregation level, the spreading factor, a CORESET format, and/or a pre-configured hash function.

The WTRU may determine the RG size of a CCE as the ratio between the configured FRG size and the configured spreading factor. Further, the WTRU may determine the CCE size as the product of the configured number of RGs per CCE and the determined RG size.

Figure 11:
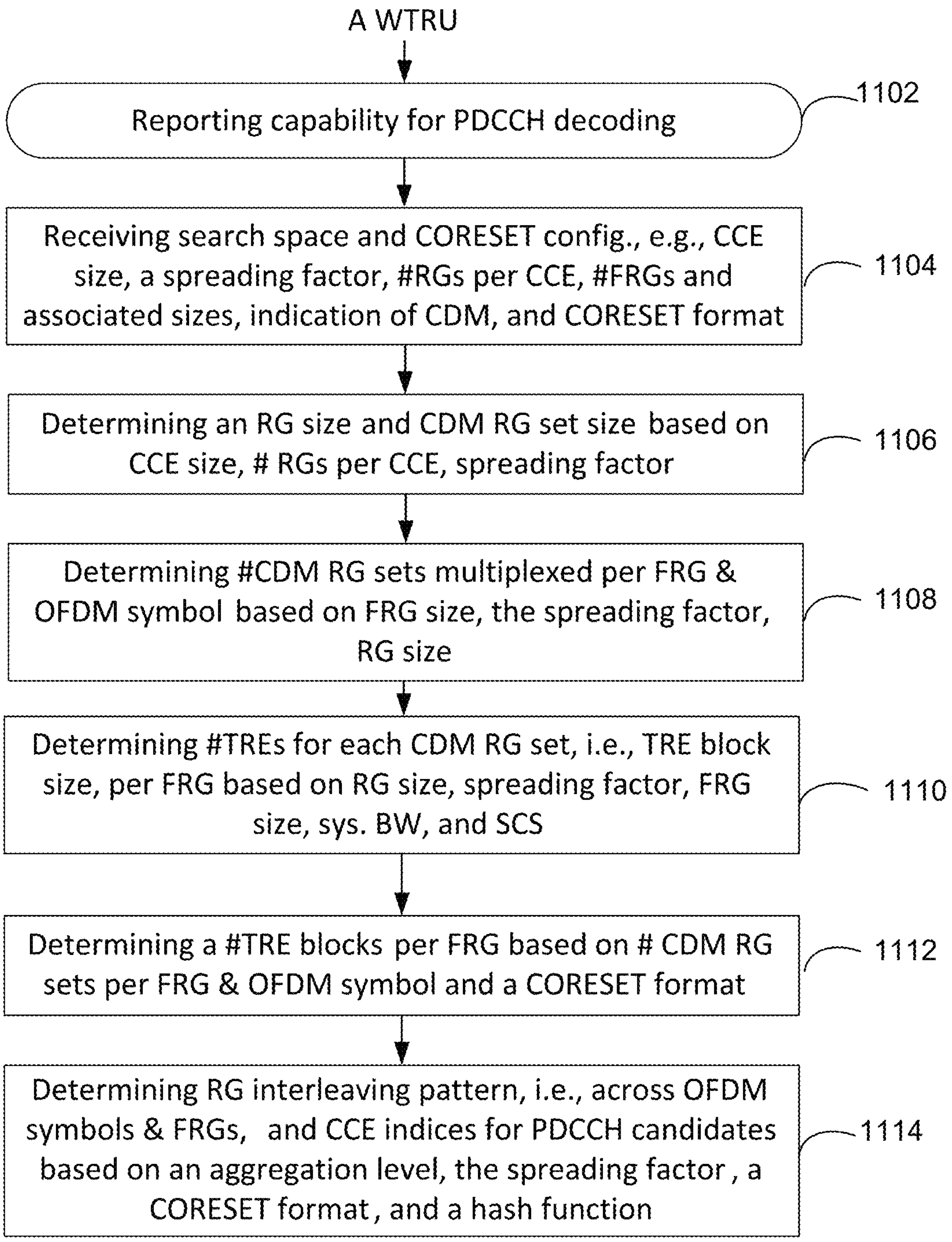
FIG. 11 is a flow chart illustrating a further example of WTRU actions to determine configuration for proper decoding of PDCCH candidates considering code domain multiplexing (CDM).

As illustrated in FIG. 11, a WTRU may determine configuration for proper decoding of PDCCH candidates considering code domain multiplexing. At 1102, the WTRU may report WTRU capability for PDCCH decoding including supported number of DFT modules and size(s). At 1104, the WTRU may receive a PDCCH configuration as a search space and CORESET configuration, The search space and CORESET configuration may include a CCE size, a spreading factor (e.g., or an orthogonal code length), number of RGs per CCE, a number of FRGs (e.g., DFTs) and associated sizes, an indication of code domain multiplexing, and/or a CORESET format. At 1106, the WTRU may determine RG size(s) and CDM RG set size based on configured spreading factor, CCE size, and/or a number of RGs per CCE. At 1108, the WTRU may determine the number of CDM RG sets multiplexed per FRG & OFDM symbol based on the determined RG size, configured spreading factor, and/or FRG size. At 1110, the WTRU may determine a number of TREs for each CDM RG set (e.g., TRE block size(s)) within each FRG based on the RG size, spreading factor, FRG size, system bandwidth, and/or the subcarrier spacing. At 1112, the WTRU may determine a number of TRE blocks, within each FRG, based on the number of CDM RG sets per FRG & OFDM symbol and a CORESET format. At 1114, the WTRU may determine an RG allocation pattern (e.g., across OFDM symbols and FRGs) and CCE indices corresponding to each PDCCH candidate based on an aggregation level, the spreading factor, a CORESET format, and/or a pre-configured hash function.

The WTRU may determine the number of CDM RG sets multiplexed in the time domain per FRG & OFDM symbol as the ratio between the FRG size and the product of spreading factor and RG size. The WTRU may determine the number of TREs associated with each CDM RG set in an FRG as the product of the RG size, spreading factor, and a ratio between an IFFT and DFT modules' size, where the DFT module size corresponds to the FRG size and the IFFT module size corresponds to the number of subcarriers in an OFDM system with a certain system bandwidth and a certain subcarrier spacing. The WTRU may further determine the number of TRE blocks, within each FRG, as the product of the determined number of CDM RG sets per FRG & OFDM symbol and the number of OFDM symbols allocated for DCI as determined by the CORESET format. Still further, the WTRU may determine the RG interleaving pattern, i.e., across TRE blocks and FRGs, based on any of the number of code-domain multiplexed RGs per FRG, the number of OFDM symbols for DCI, the number of FRGs, the time domain interleaving size, and the frequency domain interleaving size.

Figure 12:
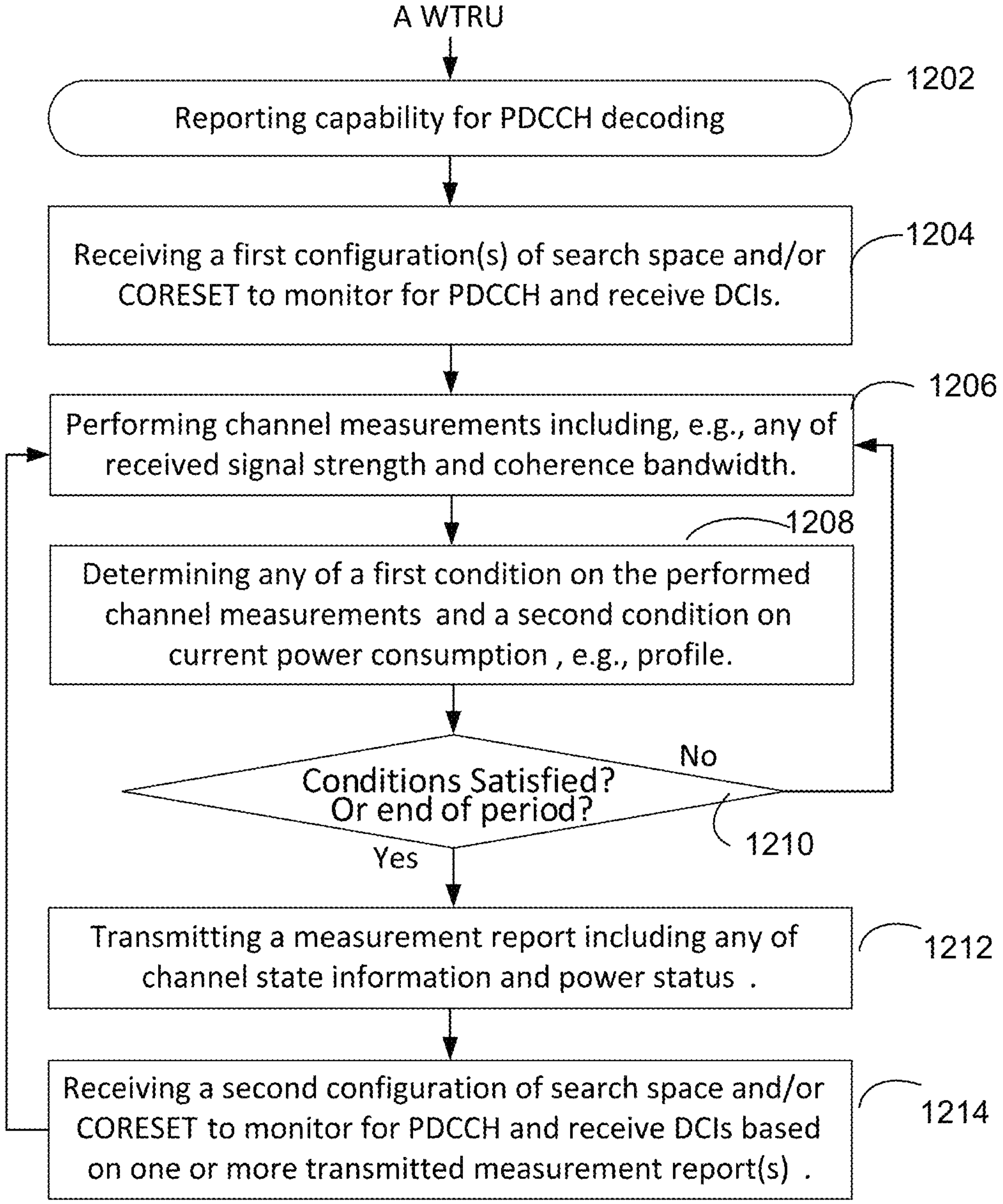
FIG. 12 is a flow chart illustrating WTRU actions to assist in dynamic adaptation of configuration for proper decoding of PDCCH candidates.

DL control channel configuration may include WTRU-Assisted CORESET configuration adaptation. With reference to the discussion above, in embodiments such as that shown in FIG. 12, a WTRU may dynamically determine configuration for proper decoding of PDCCH candidates, including, e.g., the DCI in the PDCCH. The dynamic determination may include considering code domain multiplexing. At 1202, the WTRU may report the WTRU capability for PDCCH decoding, for example, including supported number of DFT modules and size(s). At 1204, the WTRU may receive a PDCCH configuration as a search space and CORESET configuration. The search space and CORESET configuration may include a CCE size, a spreading factor (or an orthogonal code length), a number of FRGs (e.g., DFTs) and associated sizes, an indication of code domain multiplexing, and/or a CORESET format. At 1206, the WTRU may determine RG size(s) and number of RGs per CCE based on one or more of the configured spreading factor, CCE size, and/or FRG size. At 1208, the WTRU may determine the CDM RG set size and association between RGs and orthogonal cover codes (OCCs) per FRG & OFDM symbol based on the configured spreading factor, the pre-configured list of OCCs and the preconfigured or known mapping for the RG size to the OOCs; and (c) an RG allocation pattern, i.e., across OFDM symbols and FRGs, and CCE indices corresponding to each PDCCH candidate based on an aggregation level, the spreading factor, a CORESET format, and a pre-configured hash function. At 1210, if the conditions set are not satisfied, the WTRU again performs channel measurements, such as at 1206. If the conditions are satisfied or the measurement period has ended, the WTRU may, at 1214, transmit a measurement report including any of the channel state information and power status. At 1216, the WTRU may receive a second configuration of search space and/or CORESET to monitor for PDCCH and received DCI's based on one or more transmitted measurement reports. Once received, the WTRU may again perform channel measurements, such as at 1206.

The WTRU capability may further include a maximum supported number of PDCCH candidates and maximum number of non-overlapped CCEs supported per slot per serving cell. The WTRU may determine the RG size of a CCE as the ratio between the configured FRG size and the configured spreading factor. The WTRU may further determine the number of RGs per CCE as the ratio between the configured CCE size and the determined RG size. Further, the WTRU may determine the aggregation level according to an indicated maximum aggregation level in the configured search space and the pre-configured hash function may be defined in accordance with Equation (D) herein. The CORESET configuration may include a CORESET format indicating any of a number of OFDM symbols for DCI, a number of OFDM symbols for DMRS, a total number of OFDM symbols for DCI and DMRS, OFDM symbol indices for DCI, and OFDM symbol indices for DMRS. The CORESET format may further include frequency domain configuration indicating RE/RB mapping pattern for DMRSs and DMRS sequence parameters. Still further, the CORESET format may include an indication of any of a time domain interleaving, a frequency domain interleaving, a time domain interleaving size, and a frequency domain interleaving size. The CORESET format may also include a precoding granularity as any of FRG-level granularity or CORESET-level granularity. The WTRU may determine the RG interleaving pattern, i.e., across OFDM symbols and FRGs, based on any of the number of code-domain multiplexed RGs per FRG, the number of OFDM symbols for DCI, the number of FRGs, the time domain interleaving size, and the frequency domain interleaving size.

What is claimed is:

1. A wireless transmit/receive unit (WTRU) comprising:

a processor configured to:

receive first configuration information indicating a control channel element (CCE) size, a spreading factor, and an indication of code domain multiplexing (CDM);

determine second configuration information based on the received first configuration information, wherein the second configuration information comprises a resource group (RG) size and a correspondence between the RG size for a CDM RG set and one or more orthogonal cover codes (OCCs);

determine a CDM RG set allocation pattern across one or more discrete Fourier transform spread orthogonal frequency division multiplexing (DFT-s-OFDM) symbols and frequency resource groups (FRGs) based on the determined second configuration information;

receive a PDCCH transmission;

perform an inverse discrete Fourier transform (IDFT), based on the CDM RG set allocation pattern, on a plurality of FRGs and DFT-s-OFDM symbols associated with the PDCCH transmission;

de-spread a set of RGs corresponding to the PDCCH transmission based on the correspondence of RGs per CDM RG set to one or more OCCs; and decode a downlink control information (DCI) in the PDCCH transmission based on the de-spread set of RGs.

2. The WTRU of claim 1, wherein the first configuration information is static or semi-static, and wherein the second configuration information comprises dynamic adaptation of configuration for decoding of the DCI in the PDCCH transmission.

3. The WTRU of claim 1, wherein the processor is further configured to:

demodulate the DFT-s-OFDM symbols received over one or more RGs associated with the PDCCH transmission to determine DL resource scheduling information; and receive a physical downlink shared channel (PDSCH) transmission based on the DL resource scheduling information.

4. The WTRU of claim 1, wherein the first configuration information comprises a search space configuration or a control resource set (CORESET) format.

5. The WTRU of claim 1, wherein the first configuration information comprises a number and size of one or more frequency resource groups (FRGs).

6. The WTRU of claim 5, wherein the one or more FRGs are associated with a single DFT module.

7. The WTRU of claim 1, wherein the second configuration information further comprises a number of RGs per control channel element (CCE) and a plurality of CDM RG sets.

8. The WTRU of claim 1, wherein the processor is configured to further determine the second configuration information based on a correspondence of the RGs per CDM RG set to OCCs, a preconfigured list of OCCs, and a preconfigured mapping for the RG size to the OCCs.

9. The WTRU of claim 1, wherein the processor is configured to:

determine CCE indices for each PDCCH candidate of the PDCCH transmission based on an aggregation level and a pre-configured hash function; and perform the IDFT on the plurality of FRGs and the DFT-s-OFDM symbols associated with the PDCCH transmission based on determined CCE indices, a number of RGs per CCE, and the CDM RG set allocation pattern.

10. The WTRU of claim 1, wherein the processor is configured to:

demodulate the DFT-s-OFDM symbols received over all RGs associated with the PDCCH transmission;

detect a DCI format associated with the PDCCH transmission; and decode the DCI based on the detected DCI format.

11. A method performed by a wireless transmit/receive unit (WTRU), the method comprising:

receiving first configuration information indicating a control channel element (CCE) size, a spreading factor, and an indication of code domain multiplexing (CDM);

determine second configuration information based on the received first configuration information, wherein the second configuration information comprises a resource group (RG) size and a correspondence between the RG size for a CDM RG set and one or more orthogonal cover codes (OCCs);

determining a CDM RG set allocation pattern across one or more discrete Fourier transform spread orthogonal frequency division multiplexing (DFT-s-OFDM) symbols and frequency resource groups (FRGs) based on the determined second configuration information;

receiving a PDCCH transmission;

performing an inverse discrete Fourier transform (IDFT), based on the CDM RG set allocation pattern, on a plurality of FRGs and DFT-s-OFDM symbols associated with the PDCCH transmission;

de-spreading a set of RGs corresponding to the PDCCH transmission based on the correspondence of RGs per CDM RG set to one or more OCCs; and decoding a downlink control information (DCI) in the PDCCH transmission based on the de-spread set of RGs.

12. The method of claim 11, wherein the first configuration information is static or semi-static, and wherein the second configuration information comprises dynamic adaptation of configuration for decoding of the DCI in the PDCCH transmission.

13. The method of claim 11, further comprising:

demodulating the DFT-s-OFDM symbols received over one or more RGs associated with the PDCCH transmission to determine DL resource scheduling information; and receiving a physical downlink shared channel (PDSCH) transmission based on the DL resource scheduling information.

14. The method of claim 11, wherein the first configuration information comprises a search space configuration or a control resource set (CORESET) format.

15. The method of claim 11, wherein the second configuration information further comprises a number of RGs per control channel element (CCE) and a plurality of CDM RG sets.

16. The method of claim 11, further comprising determining the second configuration information based on a correspondence of the RGs per CDM RG set to OCCs, a preconfigured list of OCCs, and a preconfigured mapping for the RG size to the OCCs.

17. The method of claim 11, further comprising:

determining CCE indices for each PDCCH candidate of the PDCCH transmission based on an aggregation level and a pre-configured hash function; and performing the IDFT on the plurality of FRGs and the DFT-s-OFDM symbols associated with the PDCCH transmission based on determined CCE indices, a number of RGs per CCE, and the CDM RG set allocation pattern.

18. The method of claim 11, further comprising:

demodulating the DFT-s-OFDM symbols received over all RGs associated with the PDCCH transmission;

detecting a DCI format associated with the PDCCH transmission; and decoding the DCI based on the detected DCI format.

* * * * *